(12) United States Patent
Aoki et al.

(10) Patent No.: US 7,163,192 B2
(45) Date of Patent: Jan. 16, 2007

(54) ACTUATOR FOR VALVE

(75) Inventors: Kazuhiro Aoki, Yamanashi (JP); Yasuo Minai, Yamanashi (JP); Yoshikazu Yokochi, Yamanashi (JP); Masahiro Kazama, Yamanashi (JP)

(73) Assignee: Kitz Corporation, Chiba (JP)

( * ) Notice: Subject to any disclaimer, the term of this patent is extended or adjusted under 35 U.S.C. 154(b) by 113 days.

(21) Appl. No.: 10/515,383

(22) PCT Filed: Jun. 20, 2003

(86) PCT No.: PCT/JP03/07877

§ 371 (c)(1),
(2), (4) Date: Nov. 23, 2004

(87) PCT Pub. No.: WO04/001262

PCT Pub. Date: Dec. 31, 2003

(65) Prior Publication Data

US 2005/0184265 A1    Aug. 25, 2005

(30) Foreign Application Priority Data

| Jun. 20, 2002 | (JP) | 2002-180482 |
| Jun. 20, 2002 | (JP) | 2002-180483 |
| Jun. 20, 2002 | (JP) | 2002-180484 |
| Jun. 28, 2002 | (JP) | 2002-190024 |

(51) Int. Cl.
*F16K 31/04* (2006.01)
(52) U.S. Cl. .................................................. 251/248
(58) Field of Classification Search ................. 251/248
See application file for complete search history.

(56) References Cited

U.S. PATENT DOCUMENTS 3,976,101 A * 8/1976 Bassett .................... 137/624.2

FOREIGN PATENT DOCUMENTS

| JP | 59-150629 | 8/1984 |
| JP | 60-104875 | 6/1985 |

(Continued)

OTHER PUBLICATIONS

Microfilm of the specification and drawings annexed to the request of Japanese Utility Model Application No. 132634/1984 (Laid-open No. 50671/1986) (Fujitsu Ltd.), Apr. 5, 1986.

Primary Examiner—J. Casimer Jacyna
(74) Attorney, Agent, or Firm—Wenderoth, Lind & Ponack, L.L.P.

(57) ABSTRACT

An actuator for a valve serving to transfer turning power from a motor to an output shaft through an inner gearing planet gear speed reducing mechanism that is imposed in a casing and adapted to effect speed reduction of the turning power, and utilize rotation of the output shaft to open and close a valve by rotation. The gear speed reduction mechanism includes an eccentric body rotated in consequence of transfer of the turning power from the motor, an outer gear disposed so as to generate a vibrating rotation through the eccentric body, an inner gear meshed in an inscribing manner with the outer gear, a rotation transferring mechanism for extracting rotation from the vibrating rotation of the outer gear and transferring the extracted rotation to the output shaft, and an output shaft connected through the rotation transferring mechanism. The gear speed reducing mechanism is furnished with an angular positioning part that is a stopper part or an engaging region for controlling the rotation of the output shaft in a prescribed angle.

15 Claims, 27 Drawing Sheets

FOREIGN PATENT DOCUMENTS

| | | |
|---|---|---|
| JP | 3-9576 | 3/1991 |
| JP | 7-36219 | 8/1995 |
| JP | 7-42890 | 8/1995 |
| JP | 9-329259 | 12/1997 |
| JP | 10-311453 | 11/1998 |
| JP | 2997910 | 1/2000 |
| JP | 2000-65231 | 3/2000 |
| JP | 2000-110963 | 4/2000 |
| JP | 2001-159429 | 6/2001 |
| JP | 2002-84732 | 3/2002 |
| JP | 2002-115748 | 4/2002 |

* cited by examiner

ACTUATOR FOR VALVE

BACKGROUND OF THE INVENTION

1. Technical Field of the Invention

This invention relates to an actuator for a valve to be loaded in a rotary valve, such as a ball valve or a butterfly valve, and more particularly to an actuator so constructed as to use an electric motor as a power source and effect rotary operation of the valve shaft of a rotary valve, such as a ball valve or a butterfly valve, through a speed-reducing mechanism.

2. Description of the Related Art

The conventional actuator for a valve is furnished with a speed-reducing mechanism having a train of spur gears disposed as meshed and connected in a multiplicity of stages between an output shaft and the rotary shaft of a motor with a view to reducing the turning force of the motor and transmitting the reduced force to the output shaft and, by resorting to this medium of the speed-reducing mechanism, enabled to reduce the turning force from the motor and transmit the reduced force to the output shaft and then to the valve shaft connected to the output shaft and accomplish a switching operation of the ball or disc as the valve body. Since the actuator for the valve which has the aforementioned built-in speed-reducing mechanism requires to secure a wide space between the output shaft and the rotary shaft of the motor because of the construction having numerous spur gears disposed as meshed and connected in numerous stages, it entails such problems as incurring a large addition to the size of actuator, complicating the construction, increasing the number of component parts and boosting the cost.

As a solution to these problems, JP-A 2002-115748 has been proposed. JP-A 2002-115748 discloses an actuator having a built-in speed-reducing mechanism that is capable of acquiring a large reduction ratio with a small number of toothed wheels.

The speed-reducing mechanism incorporates therein a speed-reducing mechanism and comprises an eccentric body disposed coaxially around an output shaft serving to transmit rotation to the exterior of the housing, enabled by a motor to rotate relative to the output shaft and possessed of an outer peripheral circle eccentric relative to the rotary shaft, an annular inner sun gear adapted to have the outer and inner peripheries thereof disposed coaxially with the output shaft, furnished along the inner peripheral surface thereof with an internal gear and enabled to rotate around the output shaft relative to the housing, an external planet gear possessed of an internally bored circle coaxial with the outer peripheral circle of the eccentric body and an external gear disposed on the outer periphery, disposed as extrapolated rotatably relative to the eccentric body and enabled by having the outer gear thereof partially meshed with the annular inner sun gear to produce a revolving motion along the inner periphery of the inner sun gear, a rotation-transmitting mechanism for transmitting the rotation of the external planet gear to the output shaft, and a rotation-interrupting mechanism for restraining and releasing the rotation of the annular sun gear relative to the housing. It allows the actuator to be miniaturized.

The actuator incorporating therein the conventional speed-reducing mechanism which is capable of acquiring a large reduction ratio with a small number of toothed wheels (as disclosed in JP-A 2002-115748, for example) lacks a mechanical means to control the rotation of the output shaft in the prescribed range of angle when the turning force from the motor is transmitted to the output shaft through the speed-reducing mechanism. In the ON or OFF operation effected by depressing the point of contact of a limit switch by means of a cam, for example, when the relation of relative positions of the cam and the limit switch produces a deviation or when the limit switch produces a malfunction, the actuator possibly fails to switch the valve body within the prescribed range of valve opening and induces erroneous supply of a fluid. The actuator entails the same problem when it is manually operated during a power failure.

Incidentally, the rotation-interrupting mechanism of this conventional operating principle is aimed at restraining and releasing the rotation of an annual inner sun gear relative to the housing and is not intended to control the range of angle of rotation of the output shaft during the motor operation or the manual operation.

The actuator incorporating therein the conventional speed-reducing mechanism which is capable of acquiring a large reduction ratio with a small number of toothed wheels (as disclosed in JP-A 2002-115748, for example), in changing the turning force from the motor, namely the magnitude of the output torque, encounters such problems in terms of operation and economy as requiring to change the diameter of the output shaft in conformity with the magnitude of the output torque and, at the same time, replace the aperture-detecting members of the valve body, such as cam members and limit switches and other component parts mounted on the actuator, or vary the positions of their disposition, and prepare the parts and the component parts mentioned above and fitting plates for fixing and disposing these parts and component parts in the actuator for each output torque and assemble them.

Further, when the actuator in the process of replacing the aperture-detecting members of the valve body, such as limit switches and other mounted parts, or altering the positions of disposition thereof produces a deviation in the sites of attachment or the positions of disposition, it encounters the problem of giving rise to a minute deviation in the relation of relative positions of the cam member and the limit switch particularly during the ON or OFF operation effected by depressing the point of contact of the limit switch by means of the cam member attached to the output shaft and disabling the switching position of the value from being accurately detected.

The conventional actuator, for the sake of disposing the cam member as fixed to the outer peripheral site of the output shaft through a fitting member, such as screws, requires the diameter of the output shaft and the diameter of the hole in the cam member to be finished with high accuracy and, for fear that the tightening of the fixing member, such as screws, during the attachment of the cam member will produce a deviation in the fixing position of the cam member or induce the output shaft to yield to plastic deformation, requires the fixing work to use highly advanced adjusting and fixing techniques.

When the actuator, in consequence of the continued use thereof, suffers the fixing position of the cam member to deviate particularly under the influence of the vibration peculiar to the electric motor, the ON or OFF operation effected by depressing the point of contact of the limit switch encounters such problems as giving rise to deviation in the relation of relative positions of the cam member and the limit switch, preventing the switching position of the valve from being accurately detected and forcing the actuator to develop a fault.

The occurrence of an excessive torque constitutes one main cause for the fault of the actuator. When an extraneous substance is caught in the train of gears forming a motive power transmitting mechanism in the course of an electric operation (conducting period), the gears which are disposed as fixed in a manner incapable of generating a relative rotation with the motive power transmitting shaft by key coupling or pin coupling result in developing an unduly large load by biting the extraneous substance and possibly suffering the electric motor to incur a trouble, such as burning.

Similarly during the course of a manual operation (period of power failure), when an extraneous substance is caught in the train of gears forming the motive power transmitting mechanism, the output torque generated in excess of the prescribed range, namely the excess torque, by the manual operation gives rise to such problems as exerting an unduly large load on the gears forming the gear unit, eventually inflicting damage on the gear unit and preventing the motive power transmission by the manual operation from being effected and the switching operation of the valve body from being executed.

Further, since the actuator disclosed in JP-A 2002-115748 has the manually operated shaft disposed coaxially with the output shaft, it requires the whole of itself including the manually operated shaft to change their sizes whenever the diameter of the output shaft is varied by the diameter of the valve.

Moreover, for the purpose of enabling the torque to be effectively transmitted from the manually operated shaft to the valve body, the manually operated shaft is required to have a diameter large enough to withstand the torque. When the position-detecting device is adapted to be disposed on the shaft of this large diameter, it will possibly result in adding to the whole size of the actuator.

The speed-reducing mechanism of this actuator incurs an addition to the number of component parts because it is provided with the rotation-interrupting mechanism. This rotation-interrupting mechanism retains the inner sun gear as fixed through the engagement between the clutch gear and a rotation-stopping groove. Thus, these mechanisms entail the problem of durability because the torque load is concentrated thereon during the normal electric operation of the actuator.

When this actuator is provided with a valve opening-indicator, the valve opening-indicator is fated structurally to be disposed coaxially with the manually operated axis. During the course of the manual operation, therefore, the valve opening-indicator will possibly approximate closely to the manual operation part and become difficult to read. Further, since the ordinary valve opening-indicator is adapted to be covered as by a clear acrylic sheet which is flush with the upper surface or lateral surface of the actuator and consequently enabled to show the indicating part thereof on the actuator interior side through this acrylic sheet to the observer outside, it generates directionality during the visual observation and becomes difficult to see unless it is looked at in a specific direction and renders the manual operation inconvenient.

When the accuracy of rotation of the output shaft is warped by the backlash of the gears, this malfunction results in affecting the indication of the valve opening-indicator and rendering the accurate indication of the valve opening difficult.

Further, in the conventional actuator that is furnished with a built-in planet gear mechanism (as disclosed in JP-A 2002-115748, for example), the outer gear is meshed in an inscribing manner with the inner gear so that the rotating output to the outer shaft may be derived from the vibrating motion of the outer gear. When the carrier that is an eccentric rotating body is rotated to push the annular inner sun gear, the radial load originating in the vibrating motion is exerted on the anchoring part of the output shaft, and the output shaft is structurally exposed to the force vibrating perpendicularly to the direction of the axis thereof.

When the output shaft is anchored with a bush that is liable to impart a gap to the anchoring part, therefore, the output shaft possibly incurs the phenomenon of emitting vibration, namely the so-called shaft run-out.

When the output shaft produces a shaft run-out, the plate, for example, that is disposed on the extended part of the output shaft is made to vibrate. With this plate, it becomes difficult to effect accurately the ON or OFF operation of the control switch. The run-out of the output shaft brings such problems as rendering accurate detection of the state of rotation of the output shaft difficult, suffering the output shaft to develop a malfunction and preventing the valve body from being accurately controlled in the state of opening, closing and a prescribed intermediate opening during the course of switching the valve.

This invention, which has been developed with a view to solving the conventional problems, is aimed at providing an actuator for a valve to be mounted in a rotary valve, such as a ball valve or a butterfly valve, and more particularly an actuator so constructed as to effect a rotating operation of the valve shaft of a ball valve or a butterfly valve through an inner planet gear speed reducing mechanism which uses an electric motor, for example, as the source of motive power and is capable of obtaining a large reduction ratio with a small number of gears, thereby making it possible to control the angle of the valve accurately, detect the open-close position of the valve accurately and materialize reduction of size and weight and saving of cost owing to the simplification of structure. This invention is aimed further at providing a compact and economically excellent actuator for a valve which enables valve opening-detecting members, such as limit switches and potentiometers and other component members to be put to common use without reference to the size of the output torque and ensures accurate detection of the open-close position of the valve.

SUMMARY OF THE INVENTION

To attain the above objects, according to first aspect of the invention, there is provided an actuator for a valve serving to transfer turning power from a motor to an output shaft through an inner gearing planet gear speed reducing mechanism that is imposed in a casing and adapted to effect speed reduction of the turning power, and utilize rotation of the output shaft to open and close a valve by rotation, wherein the gear speed reduction mechanism comprises an eccentric body rotated in consequence of transfer of the turning power from the motor, an outer gear disposed so as to generate a vibrating rotation through the eccentric body, an inner gear meshed in an inscribing manner with the outer gear, a rotation transferring mechanism for extracting rotation from the vibrating rotation of the outer gear and transferring the extracted rotation to the output shaft, and an output shaft connected through the rotation transferring mechanism. The gear speed reducing mechanism is furnished with an angular positioning part that is a stopper part or an engaging region for controlling the rotation of the output shaft in a prescribed angle.

The rotation transferring mechanism comprises a base body, an inner pinhole formed in the outer gear, an inner pin inserted idly in the inner pinhole, and a pin flange having the inner pin formed integrally or separately therein, the pin flange has the angular positioning part that is the stopper part or engaging region formed therein, and the base body is furnished with a rotation regulating part allowing the angular positioning part to be stopped by collision therewith.

The angular positioning part that is the stopper part or engaging region may be formed on the output shaft, with the base body furnished with the rotation regulating part allowing the angular position fixing part to be stopped by collision therewith.

The first aspect of this invention forms, as a means to lower the speed of the turning force from an electric motor and transmit the reduced rotating power to an output shaft, an inner gearing planet gear speed reducing mechanism which comprises of an eccentric body possessed of an eccentric part, an outer gear disposed in a shakable manner through the eccentric body, an inner gear meshed in an inscribing manner with the outer gear, a rotation-transmitting mechanism adapted to extract rotation from the shaking rotation of the outer gear and transmit the rotation to an outer shaft connected via the rotation-transmitting mechanism and which is disposed coaxially with the output shaft. Thus, it allows an actuator incorporating the speed-reducing mechanism therein to be miniaturized. Since the gear speed reducing mechanism is provided in the interior thereof with an angle position fixing part for controlling the rotation of the output shaft within a prescribed angle, the actuator enjoys further miniaturization and simplification of structure and materializes reduction of weight and saving of cost.

In the ON or OFF operation effected by depressing the point of contact of the limit switch by means of a cam during the electric operation, when the relation of relative positions of the cam and the limit switch produces a deviation or when the limit switch is suffered to malfunction, the switch of the valve body cannot be stopped within the prescribed range of valve opening and the supply of a fluid is possibly impaired. Owing to the provision of the angle position fixing part, the problem just mentioned can be eliminated because the rotation is no longer allowed to deviate from the prescribed range.

Further, when the manual operation is resorted to during the course of the power failure, the angle position fixing part provided as described above enables the valve opening to be accurately controlled and the switching position of the valve to be accurately detected.

According to the second aspect of the invention, there is provided an actuator for a valve using a speed reducing gear mechanism capable of regulating vibration rotation of an outer gear that produces the vibration rotation in response to eccentric rotation from an eccentric body synchronized with a rotary drive source including a motor to produce the eccentric rotation, and emitting a component of rotation of the outer gear from an output shaft, wherein the speed reducing mechanism is incorporated in a base body to which a supporting plate for bearing a controlling shaft extended from the output shaft is anchored, the supporting plate has a bearing region for the controlling shaft, in which region a valve opening-detecting part is disposed, and has a fitting plate carrying a valve opening-detecting member including a limit switch fixed in position thereto.

The actuator for a valve can further comprise a planar mounting part formed above the base body, wherein the supporting plate is fixed in position on the planar mounting part.

The fitting plate can also be fixed in position on the supporting plate by using a roller bearing for the valve opening-detecting part and, at the same time, fitting an inner periphery of a controlling shaft inserting hole of the fitting plate on an outer periphery of the roller bearing.

According to the second aspect of this invention, the run-out of the controlling shaft disposed as extended from the output shaft can be directly suppressed, the control shaft and the valve opening-detecting member can be fixed as relatively positioned, and the valve opening-detecting member can be infallibly actuated and utilized for control of high accuracy.

Even when the output of the actuator is variable, the actuator can be controlled with high accuracy because the control shaft and the valve opening-detecting member can be fixed as relatively positioned in addition to the fact that the group of parts for controlling the actuator can be put to common use as a unit and enabled to contribute to the saving of the cost.

The accuracy of the controlling shaft can be further exalted because the bearing position for pivotally supporting the control shaft can be immobilized and, moreover, because the relation of relative positions of the bearing position and the valve opening-detecting member can be fixed.

The effect of suppressing the run-out of the controlling shaft under the radial load generated during the rotation of the controlling shaft can be fully manifested and, moreover, the regulation of the vibration can be attained at a low cost.

The vibration of the controlling shaft can be further suppressed very slightly and the adverse effect exerted on the valve opening-detecting member can be suppressed.

By suppressing the vibration of the output shaft, it is made possible to suppress the vibration of the controlling shaft on the leading terminal side and prevent the rotation of the controlling shaft from causing the valve opening-detecting member to malfunction due to defective contact, for example.

The vibration of the controlling shaft caused by the vibration of the inner gearing planet gear speed reducing mechanism can be suppressed because the controlling shaft is supported by a vibration controlling part disposed on the supporting plate and the supporting plate is firmly fixed on the planar mounting part of the base body.

Particularly by causing the shape of the planar mounting part disposed in the neighborhood of the upper edge part of the base to assume an increased wall thickness toward the inner gearing planet gear speed reducing mechanism relative to the position of the fitting bolt of the supporting plate, the least necessary addition to the wall thickness of the planar mounting part is enabled to suppress the increase of weight of the actuator and prevent the controlling shaft from emitting vibration even when the vibration of the planet gear speed reducing mechanism may be transmitted via the controlling shaft and the vibration controlling part to the supporting plate.

The valve opening-detecting members grouped as a unit can be fixed as aligned to the supporting plate.

According to the third aspect of the present invention, there is provided an actuator for a valve serving to transfer turning power from a motor to an output shaft through an inner gearing planet gear speed reducing mechanism that is imposed in a casing and adapted to effect speed reduction of the turning power, and utilize rotation of the output shaft to open and close a valve by rotation, wherein the gear speed reducing mechanism comprises an eccentric body rotating in response to the turning power transmitted from the motor, an outer gear disposed to produce vibrating rotation through the eccentric body, an inner gear meshed in an inscribing matter with the outer gear, a rotation transmitting mechanism for extracting a component of rotation from the vibrating rotation of the outer gear and transferring the extracted rotation to the output shaft, and an output shaft connected through the rotation transmitting mechanism; a controlling shaft having a smaller diameter than the output shaft is extended above the output shaft; and various valve opening-detecting members are disposed above the gear speed reducing mechanism.

It is better to dispose the valve opening-detecting members within a surface area in planometric view of the gear speed reducing mechanism.

The valve opening-detecting members comprise limit switches, potentiometers or other component parts and the valve opening-detecting members are disposed on a common fitting plate and completed as a unit.

The valve opening-detecting members can be bound to a terminal base for connecting an electric cable from a power source through a freely detachable inserting connector.

The gear speed reducing mechanism can be provided outside a surface area in planometric view thereof with a part for varying a size of the motor in accordance with an output of the actuator.

The third aspect of this invention forms, as a means to lower the speed of the turning force from an electric motor and transmit the reduced rotating power to an output shaft, an inner gearing planet gear speed reducing mechanism which composes an eccentric body possessed of an eccentric part, an outer gear disposed in a shakable manner through the eccentric body, an inner gear meshed in an inscribing manner with the outer gear, a rotation-transmitting mechanism adapted to extract rotation from the shaking rotation of the outer gear and transmit the rotation to an outer shaft connected via the rotation-transmitting mechanism and which is disposed coaxially with the output shaft. Thus, it allows an actuator incorporating the speed-reducing mechanism therein to be miniaturized.

Further, since the reduction ratio can be varied within the same inner volume of the speed-reducing mechanism, the parts and the members which have been hitherto necessary for each output torque can be omitted and the efficiency of operation and the economy can be enhanced, let alone the miniaturization of the actuator.

By causing the controlling shaft having a smaller diameter than the output shaft to be disposed as extended above the output shaft and to be given a fixed diameter without reference to the magnitude of the output torque, it is made possible to use the cam members disposed on the controlling shaft as common parts.

By causing the valve opening-detecting members, such as limit switches and potentiometers, to be disposed above the gear speed reducing mechanism and within the surface area in planometric view of the wear speed-reducing mechanism, it is made possible to maintain the relative positions of the cam members disposed on the controlling shaft and the valve opening-detecting members as fixed and allow the valve opening-detecting members, such as limit switches and potentiometers, to be used as common parts.

Further, by causing the aforementioned valve opening-detecting members, such as limit switches and potentiometers, to be disposed as a unit on a common fitting plate, it is made possible to position the individual members with the common fitting plate, maintain the relation of relative positions of the cam members and the limit switches in particular, and attain accurate detection of the switching position of the valve body.

The actuator is allowed to secure the space available therefor by causing parts, such as the motor, which have the sizes thereof varied by the output of the actuator to be disposed outside the surface area in planometric view of the gear speed reducing mechanism.

The actuator can further comprise a terminal box incorporating therein a terminal base to which electric cables of electric parts including the motor disposed on the base body and cables of external electric sources are electrically connected, which terminal box is disposed on the lower side of the base body and at a position below the motor.

Thus, by causing the terminal box to be disposed in the space beneath the base body, such as the position underlying the motor, it is made possible to miniaturize the whole actuator or allow various actuators to form modules according to their sizes.

Since the actuator is not denuded of its cover during the course of the wiring work, it is prevented from being exposed to the worker's careless contact and ceasing to offer an accurate switching operation of the valve and enabled to further enhance the efficiency of the wiring work.

Further, various actuators can be formed as modules in conformity with their individual sizes without impairing the efficiency of the work of mutual fitting of the actuator and the valve while reconciling the efficiency of the wiring work and the efficiency of the work of fitting the valve.

According to the fourth aspect of the invention, there is provided an actuator for a valve serving to transfer turning power from a motor to an output shaft through a motive power transmitting mechanism disposed in a casing and utilize rotation of the output shaft to open and close a valve by rotation, wherein the output shaft has an outer peripheral region to which a limit switch actuating cam member is attached and, interposed between the output shaft and the cam member is an annular spring member having resilient force energized in a radial direction.

The output shaft may have a plurality of angle adjusting grooves formed in a circumferential direction in an outer peripheral region thereof and, at the same time, the annular spring member may have formed in an inner peripheral region thereof projecting parts destined to be meshed with the angle adjusting grooves.

There is also provided an actuator for a valve serving to transfer turning power from a motor to an output shaft through a motive power transmitting mechanism imposed in a casing and utilize rotation of the output shaft to open and close a valve by rotation, wherein the motive power transmitting mechanism comprises a gear unit laid onto the output shaft, and further comprising an annular spring member having resilient force energized in a radial direction and interposed between at least one gear of the gear unit and a motive power transmitting shaft having the at least one gear disposed as attached thereto.

The at least one gear is an intermediate gear meshed with a pinion gear disposed as attached onto a drive shaft of the motor.

There is also provided an actuator for a valve serving to transfer turning power generated by a manual operation to an output shaft through a motive force transmitting mechanism imposed in a casing and utilize rotation of the output shaft to open and close by rotation a valve body, wherein the motive power transmitting mechanism comprises a gear unit laid onto the output shaft, and further comprising an annular spring member having resilient force energized in a radial direction and interposed between at least one gear of the gear unit and a motive power transmitting shaft having the at least one gear disposed as attached thereto.

The at least one gear is a manual operation transmitting gear disposed as attached to a manual operation shaft.

The fourth aspect of this invention, by causing an annular spring member possessed of a resilient force energized in the radial direction to be interposed between the output shaft and the limit switch-actuating cam member disposed as fixed on the outer peripheral region of the output shaft, is enabled to prevent the valve opening-detecting members from being broken by an excessive load and make the cam members perform the angle adjusting work and the fitting work accurately without requiring advanced adjusting technique and fitting technique.

Further, the fitting position of the cam can be infallibly retained, the relation of relative positions of the cam and the limit switch maintained, and the switching position of the valve detected accurately without being affected by the vibration peculiar to the electric motor.

By forming a plurality of angle-adjusting grooves in the circumferential direction in the outer peripheral region of the output shaft and, at the same time, forming projecting parts adapted to be coupled with the angle-adjusting grooves at proper positions in the inner peripheral region of the annular spring member, it is made possible to facilitate the alignment of the limit switch actuating cam members during the course of the adjustment of angles.

During the conducting period, owing to the construction of the torque limiter function in the motive power transmitting mechanism which comprises gear units so disposed as to transmit the turning force generated by the driving of a motor till the output shaft, it is made possible to prevent an excessive torque from being transmitted and effect the electric operation safely without exerting any undue load on the component members, such as the gear units and the motor.

During the period of power failure, owing to the construction of the torque limiter function in the motive power transmitting mechanism which comprises gear units so disposed as to transmit the turning force generated by the manual operation till the output shaft, it is made possible to prevent an excessive torque from being transmitted and effect the manual operation safely without exerting any undue load on the component members, such as the gear units.

According to the fifth aspect of the invention, there is provided an actuator for a valve furnished with a manual operation mechanism, wherein the actuator is provided in a cover with a rotary drive source, a speed reducing gear mechanism reducing speed of rotation from the rotary drive source and transmitting the reduced rotation and an output shaft emitting the reduced rotation from the speed reducing gear mechanism to open and close a valve body by rotation through the output shaft and a valve stem, and is provided on the cover with a manual operation shaft capable of manually operating the valve body and a valve opening-indicator synchronized with the manual operation shaft as projected on the cover; wherein the valve opening-indicator is disposed at a lower position than a manual operation part of the manual operation shaft.

The speed reducing gear mechanism comprises an input gear producing rotation synchronously with the rotary drive source, an intermediate gear meshed with the input gear, an eccentric body producing eccentric rotation synchronously with the rotation of the input gear, an outer gear producing a vibrating rotation in response to the eccentric rotation from the eccentric body, a frame body meshed or engaged with the outer gear and regulating the vibrating rotation of the outer gear, and the output shaft that is synchronized with the outer gear and enabled to emit a component of rotation of the outer gear.

The speed reducing gear mechanism has a part in which backlash is minimized and which is manually operated.

The eccentric body and the input gear admitting the rotation from the rotary drive source are integrally formed and the input gear is capable of being manually operated.

The manual operation shaft can be disposed coaxially with a rotating shaft of the intermediate gear.

The present invention further provides an actuator for a valve furnished with a manual operation mechanism, wherein the actuator is provided in a cover with a rotary drive source, a speed reducing gear mechanism reducing speed of rotation from the rotary drive source and transmitting the reduced rotation and an output shaft emitting the reduced rotation from the speed reducing gear mechanism to open and close a valve body by rotation through the output shaft and a valve stem, a controlling shaft for controlling a detection mechanism including a micro switch or a potentiometer is disposed coaxially with the output shaft, a valve opening-indicator is detachably fitted by insertion to an upper terminal of the controlling shaft to allow variation of a direction of display in conformity with a fitting angle of the valve to a pipe.

An upper terminal of the controlling shaft and the valve opening-indicator can be joined through union between cross grooves and ridge parts.

The fifth aspect of this invention, by disposing the output shaft and the manual operation shaft in different axes and adapting the manual operation shaft to be operated manually and by further keeping the manual operation part from being concealed by the valve opening-indicator while it is manipulated with a tool, such as a wrench, is enabled to excel in efficiency of the operation, allow the actuator to be formed with a small number of component parts and manufactured at a low cost.

The actuator for a valve contemplated by this fifth aspect of the invention is furnished with a manual operation mechanism that can be operated while the confirmation of the accurate state of the valve during the course of the manual operation is continued.

Since the actuator is capable of containing the speed reducing gear mechanism within the same inner volume thereof, it can effect the speed reduction at a necessary reduction ratio even when the rotary drive source to be used has a varied output.

The actuator for a valve is further furnished with a manual operation mechanism which can be miniaturized even when the valve has a large size without requiring a design change of the combination of gears and the positions of disposition of the individual gears or without adding to the number of gears or complicating the inner construction of the train of speed-reducing gears.

The actuator for a valve is furnished with a manual operation mechanism which is capable of exalting the accuracy of the valve switching and minimizing the error of the manual operation.

The actuator for a valve is furnished with a manual operation mechanism that suppresses the torque generated during the manual operation and excels in the efficiency of operation.

The actuator for a valve is furnished with a manual operation mechanism that is capable of freely setting the running torque necessary for the manual operation by changing the number of intermediate gears unable to affect the reduction ratio of the reducing gear mechanism.

The actuator for a valve is furnished with a manual operation mechanism which permits easy change of the direction of indication of the valve opening-indicator in conformity with the direction of the valve even when the fitting direction of the valve may be varied, promotes the formation of the component parts of the valve opening-indicator for common use, and allows easy assemblage.

Owing to the free telescopic motion derived from the snap mechanism, the direction of the valve opening-indicator can be easily changed in conformity with the direction of the valve. This valve opening-indicator can be formed of a resin. When it is worn by repeated attachment and detachment, it can be replaced with a new supply at a low cost.

DETAILED DESCRIPTION OF THE INVENTION

In the actuator of this invention for a valve, the embodiment of the actuator for a valve that is contemplated by the first aspect of this invention will be described.

Figure 1:
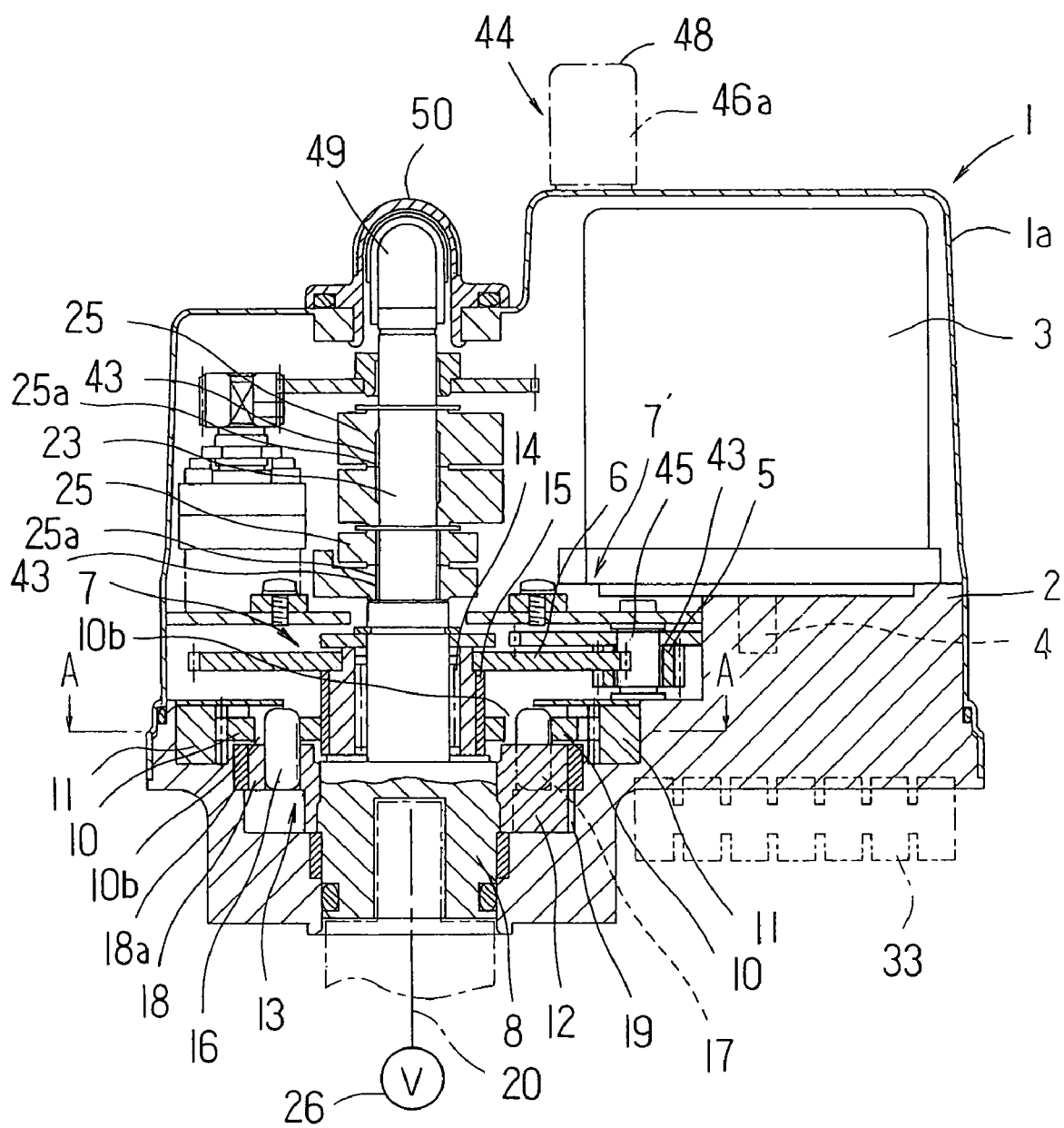
FIG. 1 is a front cross section of an actuator for a valve contemplated by this invention.
Figure 2:
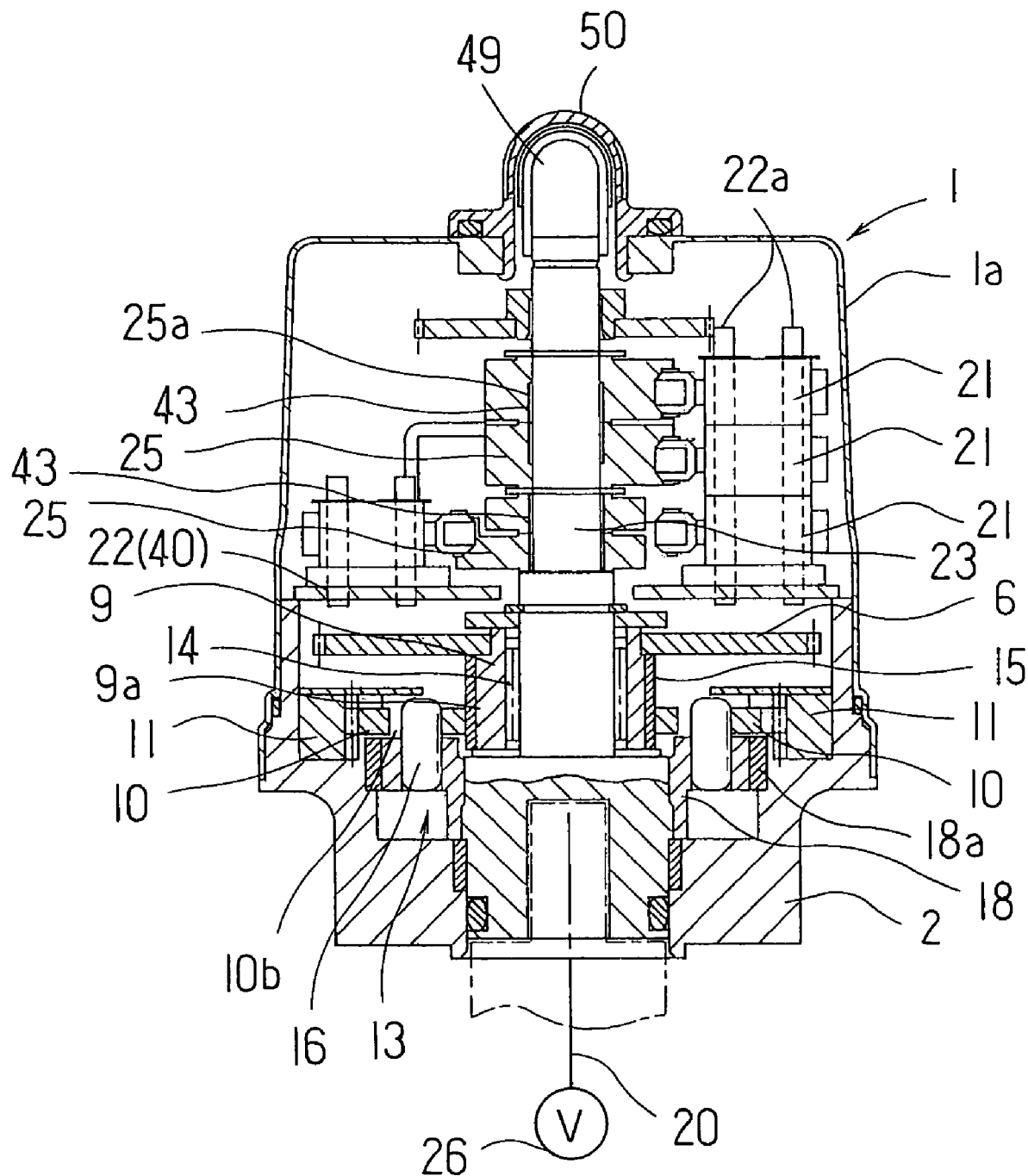
FIG. 2 is a cross section of an actuator for a valve contemplated by this invention.
Figure 3:
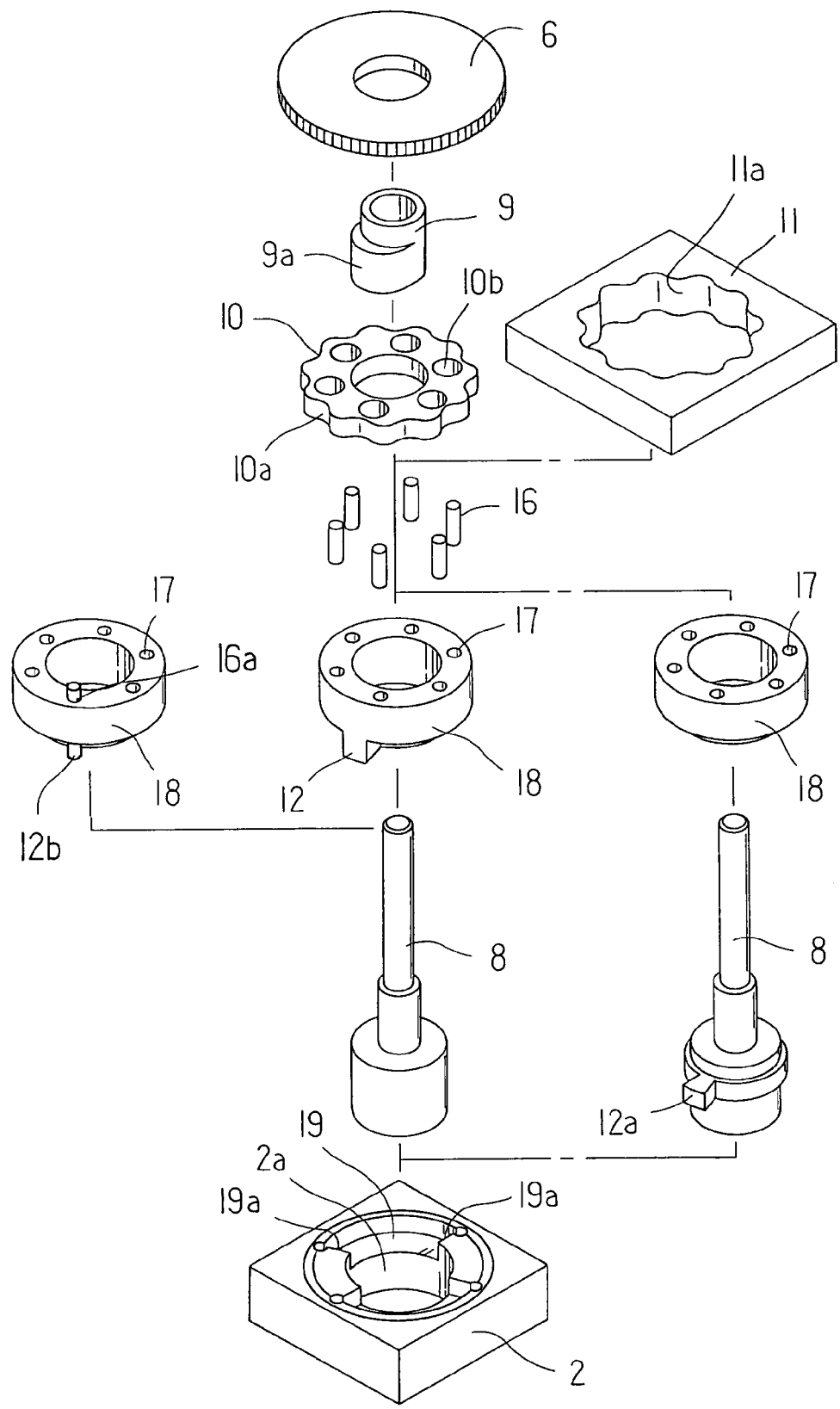
FIG. 3 is an exploded perspective view of an inner gearing planet gear speed reducing mechanism incorporated in an actuator for a valve according to this invention.

As illustrated in FIG. 1 through FIG. 3, an actuator 1 for a valve according to this invention comprises a casing 1*a*, an electric motor 3 disposed in the casing 1*a* (on a base body 2 in the present embodiment), an intermediate gear 5 meshed with a pinion gear 4 disposed on the rotating shaft of the electric motor 3, an input gear 6 meshed with the intermediate gear 5 and disposed coaxially on the output shaft, an inner gearing planet gear speed reducing mechanism 7 to which the turning force from the electric motor is transmitted via the intermediate gear and the input gear 6, and an output shaft 8 rotated by the turning force treated for speed reduction by the gear speed reducing mechanism 7.

The gear speed reducing mechanism is disposed coaxially on the output shaft 8 and comprises an eccentric body 9 having the input gear 6 inserted and fixed therein, an outer gear 10 disposed rotatably through the eccentric body 9, an inner gear 11 fixed on the fixing side of the base body and meshed in an inscribing manner with the outer gear 10, a rotation-transmitting mechanism 13 adapted to extract a rotation from the vibrating rotation of the outer gear 10 and transmitting the rotation to the output shaft 8 and furnished with stopper part (angle-positioning part) 12 for controlling the rotation of the output shaft 8 within a prescribed angle, and the output shaft 8 connected through the rotation transmitting mechanism 13.

The rotation-transmitting mechanism 13 may be furnished with a depressed engaging region (angle-positioning part) not shown in the diagram as a means to control the rotation of the output shaft 8 within a prescribed angle.

The eccentric body 9 is disposed rotatably relative to the output shaft 8 through a bearing 14. The center of a deviating eccentric part 9*a* is deviated by an amount of eccentricity, e, from the output shaft 8.

A bearing 15 is disposed in the outer peripheral region of the eccentric part 9*a* of the eccentric body 9 and the outer gear 10 is disposed freely rotatably through the bearing 15.

The outer gear 10 is furnished on the outer periphery thereof with a trochoidal tooth profile 10*a*, and the inner gear 11 meshed in an inscribing manner with the outer gear 10 is fixed to the base body 2 and is furnished on the inner periphery thereof adjoining the outer gear 10 with an arcuate tooth profile 11a. The inner gear 11 may be formed integrally with the base body 2.

In the present embodiment, the outer gear 10 furnished on the outer periphery thereof with the trochoidal tooth profile 10a and the inner gear 11 meshed in a scribing manner with the outer gear 10 are provided on the mutually adjoining inner peripheries thereof with the arcuate tooth profile 11a. This arrangement is not exclusively required. The union may be formed of the outer gear 10 furnished with the trichoidal tooth profile 10a and the inner gear which has an outer pin equivalent to an inner gear provided on the inner periphery thereof meshed in an inscribing manner with the outer gear. Further, other outer gearing planet gear mechanism may be used instead.

The rotation-transmitting mechanism 13 comprises a plurality of inner pinholes 10b formed in the outer gear 10, as many inner pins 16 inserted idly in the inner pinholes 10b, and a pin flange 18 serving to fix the inner pins 16 inserted in inserting holes 17.

The inner pins 18 may be formed integrally on the upper surface of the pin flange 18.

The pin flange 18 is fixed as fitted to the output shaft 8 and is furnished in the outer peripheral region thereof with a bearing 18a.

The pin flange 18 is furnished on the lower surface thereof either integrally or separately with the stopper part 12 adapted to control the rotation of the output shaft 8 in a prescribed angle.

In the present embodiment, the stopper part 12 is disposed on the lower surface of the pin flange 18. This disposition is not required exclusively. They may be disposed at other suitable positions.

In the upper terminal peripheral region of an output shaft inserting hole 2a formed on the base body 2, a rotation regulating part 19 adapted to collide against and engage with the stopper part 12 is formed in a notched form.

Figure 5:
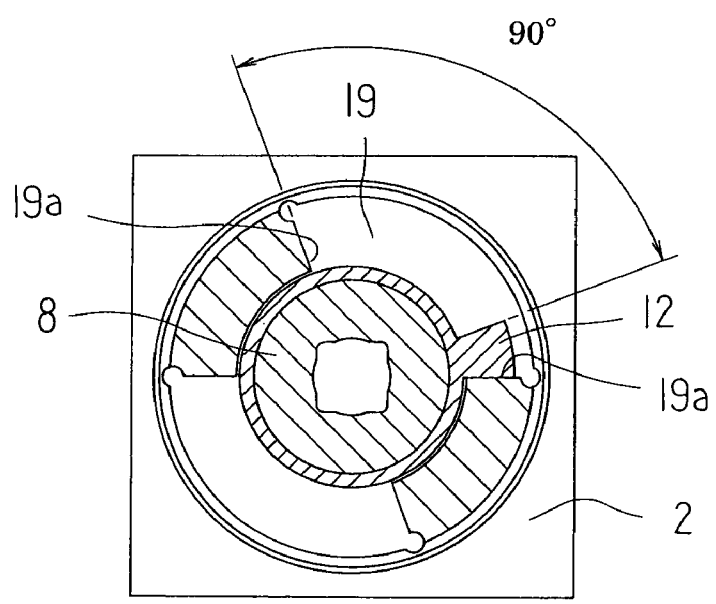
FIG. 5 is a diagram for illustrating the operation of a stopper part (angle-positioning part) and a rotation-regulating part.

In the present embodiment, the rotation-regulating part 19 has the shape of a fan in the plan view including 90° and an angle equivalent to the thickness of the stopper part formed in the pattern of a notch as illustrated in FIG. 5. The rotation-regulating part 19 has the stopper part 12 inserted and mounted therein and has it disposed rotatably within the range of rotation of the rotation-regulating member 19 (90° in the present embodiment), namely between the engaging surface (engaging part) 19a and the engaging surface (engaging part) 19a. During the course of rotation, the rotation of the output shaft 8 is controlled within the prescribed angle by causing the stopper part 12 to collide against and engage with the stopper part 12.

In the present embodiment, the range of rotation is set at 90°. Optionally, it may be set at 180°.

The rotation-regulating part 19 does not need to be limited to the present embodiment. It may be properly constructed (in the form of an arcuate groove, for example) so as to suit the disposition and the shape (in the form of a pin, for example) of the stopper part 12. It may be otherwise so constructed that the position of collision between the engaging surface 19a and the stopper part 12 will be adjusted by adopting the end face of the bolt inserted in the base as the engaging surface 19a and adjusting the position of this bolt.

As a means to control the rotation of the output shaft 8 in the prescribed angle, the stopper part (angle-positioning part) 12 is formed in the pin flange 18 as described above. As a means to control the rotation of the output shaft 8 in the prescribed angle, it is permissible to provide a depressed engaging region (angle-positioning part) at a proper position, such as the lower surface of the pin flange 18, or in the outer peripheral region, though not shown in the diagram.

In this case, in the upper terminal peripheral region of the output shaft inserting hole 2a formed in the base body 2, a projected rotation regulating part for stopping by collision the engaging surface (engaging part) formed in the aforementioned depressed engaging region is formed.

The depressed engaging region is formed of a depression in the lower surface of the pin flange 18 which results from forming in the pattern of a notch the shape of a fan in the plan view including 90° (the range of rotation) and an angle equivalent to the thickness of the projected rotation regulating part. In the engaging region, the projected rotation regulating part is inserted and disposed and adapted so as to rotate in the range of rotation (90°). During the course of rotation, the rotation of the output shaft 8 is regulated in the prescribed angle by causing the engaging surface (engaging part) of the depressed engaging region to collide against and engage with the projected rotation regulating part. The range of rotation may be set at 90° or at 180°.

The depressed engaging region does not need to be limited to the structure described above. It may be formed in a proper construction (the arcuate groove, for example) to suit the disposition and the shape (the form of a pin, for example) of the rotation-regulating part.

As another example, the rotation of the output shaft 8 may be controlled within the prescribed angle by having the stopper part 12a formed integrally or separately in the outer peripheral region of the output shaft 8 and having this stopper part 12a inserted and disposed in the rotation-regulating part 19 which results from causing the upper terminal peripheral region of the output shaft inserting hole 21 in the base body 2 to be formed in the pattern of a notch of the shape of a fan as illustrated in FIG. 3.

As still another example of the invention, it is permissible to have a depressed engaging region (angle-positioning part) disposed in the outer peripheral region of the output shaft 8, though not illustrated in the diagram, as a means to control the rotation of the output shaft 8 in the prescribed angle. It is also permissible to form at a suitable position such as the upper terminal peripheral region of the output shaft inserting hole 2a in the base body 2 as projected in the inner peripheral direction the projected rotation regulating part serving to stop by collision the engaging surface (engaging part) formed in the aforementioned depressed engaging region during the course of rotation.

As yet another example of the invention, it is permissible to obtain an angle-positioning part 12b by extending one of the inner pins 16 and using it as an inner pin 16a and inserting this inner pin 16a through the inserting hole 17 till it protrudes downwardly as illustrated in FIG. 3.

When the electric motor 3 disposed on the base body 2 is set in motion, the pinion gear 4 disposed on the rotating shaft of the electric motor 3 is rotated and, at the same time, the input gear 6 disposed coaxially with the output shaft 8 is rotated through the intermediate gear 5 meshed with the pinion gear 4. The input gear 6 is attached to and fixed on the eccentric body disposed coaxially with the output shaft 8. Thus, the eccentric body 9 is rotated by means of the turning force transmitted to the input gear 6.

In consequence of the rotation of the eccentric body 9, the outer gear 10 tends to generate a vibrating rotation around the output shaft 8. With this rotation restrained by the inner gear 11 fixed on the fixing side of the base body 2, for example, the outer gear 10 is vibrated as meshed in an inscribing manner with the inner gear 11.

Let N stand for the number of the teeth of the outer gear 10 and N+1 for the number of the teeth of the inner gear 11, then the difference of the numbers of teeth will be 1. For each rotation of the eccentric body 9, the outer gear 10 is deviated by one tooth from the inner gear 11 fixed on the fixing side of the base body 2. That is, a rotation arises consequently. As a result, one rotation of the eccentric body 9 will be reduced to a rotation of –1/N of the outer gear 10.

The rotation of the outer gear 10 has the vibrating component thereof absorbed by the gap formed in the outer gap between the inner pin hole 10b and the inner pin 16 and the resultant rotation is transmitted via the aforementioned pin 16 to the pin flange 18 and further to the output shaft 8 which is connected to the pin flange 18.

It follows that the rotation –1/N of the rotation of the outer gear 10 is eventually transmitted to the outer shaft 8 and consequently enabled to set the valve shaft 20 connected to the outer shaft 8 rotating.

In the present embodiment formed in the gear speed reducing mechanism 7, the base body 2 is provided with the stopper part 12 disposed integrally or separately on the lower surface of the pin flange 8 and the rotation-regulating part 19 adapted to stop the stopper part 12 by collision. Particularly during the course of manual operation, when the output shaft 8 is rotated through a manual operation mechanism 44 disposed as projected in the upper part of the actuator cover, for example, the rotation of the output shaft 8 is controlled in the prescribed angle (90° in the present embodiment) by causing the stopper part 12 to collide against and engage with the engaging surface (engaging part) 19a of the rotation-regulating part 19.

The output shaft 8 is extended upwardly and the cam member 25 and the valve opening-detecting member 21, such as a limit switch 21, are disposed in the upper region of the output shaft 8 as illustrated in FIG. 2.

Naturally the actuator 1 of this invention for a valve can be retained at a position of an intermediate opening.

Now, the operation of the first aspect of the invention will be specifically described below.

The actuator 1 of this invention for a valve forms, as a means to reduce the turning force from the electric motor 3 disposed on the base body 2 and transmit the reduced turning force to the output shaft 8, the inner gearing planet gear speed reducing mechanism 7 which comprises the eccentric body 9 having the eccentric part 9a, the outer gear 10 disposed rotatably through the eccentric body, the inner gear 11 meshed in an inscribing manner with the outer gear 10, the rotation-transmitting mechanism 13 serving to extract a rotation from the vibrating rotation of the outer gear 10 and transmitting this rotation to the output shaft 8 and the output shaft 8 connected through the rotation-transmitting mechanism 13, and which is disposed coaxially with the output shaft 8, so that the actuator can acquire a large reduction ratio in a small space and further secure an available space for incorporating other electronic parts therein.

The rotation-transmitting mechanism 13 is further provided with the stopper part (angle positioning part) 12 serving to control the rotation of the output shaft 8 in the prescribed angle. Particularly during the course of manual operation, when the output shaft 8 is rotated through the manual operation mechanism 44 disposed as projected on the actuator cover, the accurate switching operation of a valve body 26 is materialized because the stopper part 12 collides against and engages with the engaging surface (engaging part) 19a of the rotation-regulating part 19 and results in controlling the rotation of the output shaft 8 in the prescribed angle.

Since the rotation of the output shaft of the speed-reducing mechanism is directly controlled as described above, the accurate valve switching operation is materialized without entailing any deviation from the controlling angle.

Further, the gear speed reducing mechanism 7 of the actuator 1 of this invention for a valve has a very high reducing ratio, and the construction thereof does not easily produce a reverse rotation in response to a load from the output shaft 8. Thus, by the reverse rotation preventing function formed by the stopper mechanism and the gear speed reducing mechanism 7, it is enabled to retain the valve body 26 at the position of stop by collision through the output shaft 8.

The angle-positioning part can be disposed on the lower surface of the pin flange 18 or in the outer peripheral region of the output shaft 8 as described above, and further the inner pin 16a can be projected to the lower side of the pin flange 18 and adapted as an angle-positioning part. By forming after the pattern of a notch in the upper terminal peripheral region of the output shaft inserting hole 2a formed in the base body 2 the rotation-regulating part 19 which allows engagement therewith by collision of the angle-positioning part during the rotation of the output shaft 8, the gear speed reducing mechanism 7 is furnished with a stopper mechanism within the span of the outside diameter. Thus, the necessity for securing a space anew for the installation of the stopper mechanism is eliminated.

Particularly, the stopper part 12 disposed integrally on the lower surface of the pin flange 18 as illustrated in FIG. 3 is suitable for controlling the rotation of the output shaft 8 destined to produce a high output because the stopper part 12 is reinforced by the pin flange 18.

Now, the preferred embodiment of the actuator for a valve contemplated by the second aspect of this invention will be described below. The same component parts as used in the embodiment contemplated by the first aspect of the invention will be denoted by the same reference numerals and the description thereof will be omitted.

Figure 6:
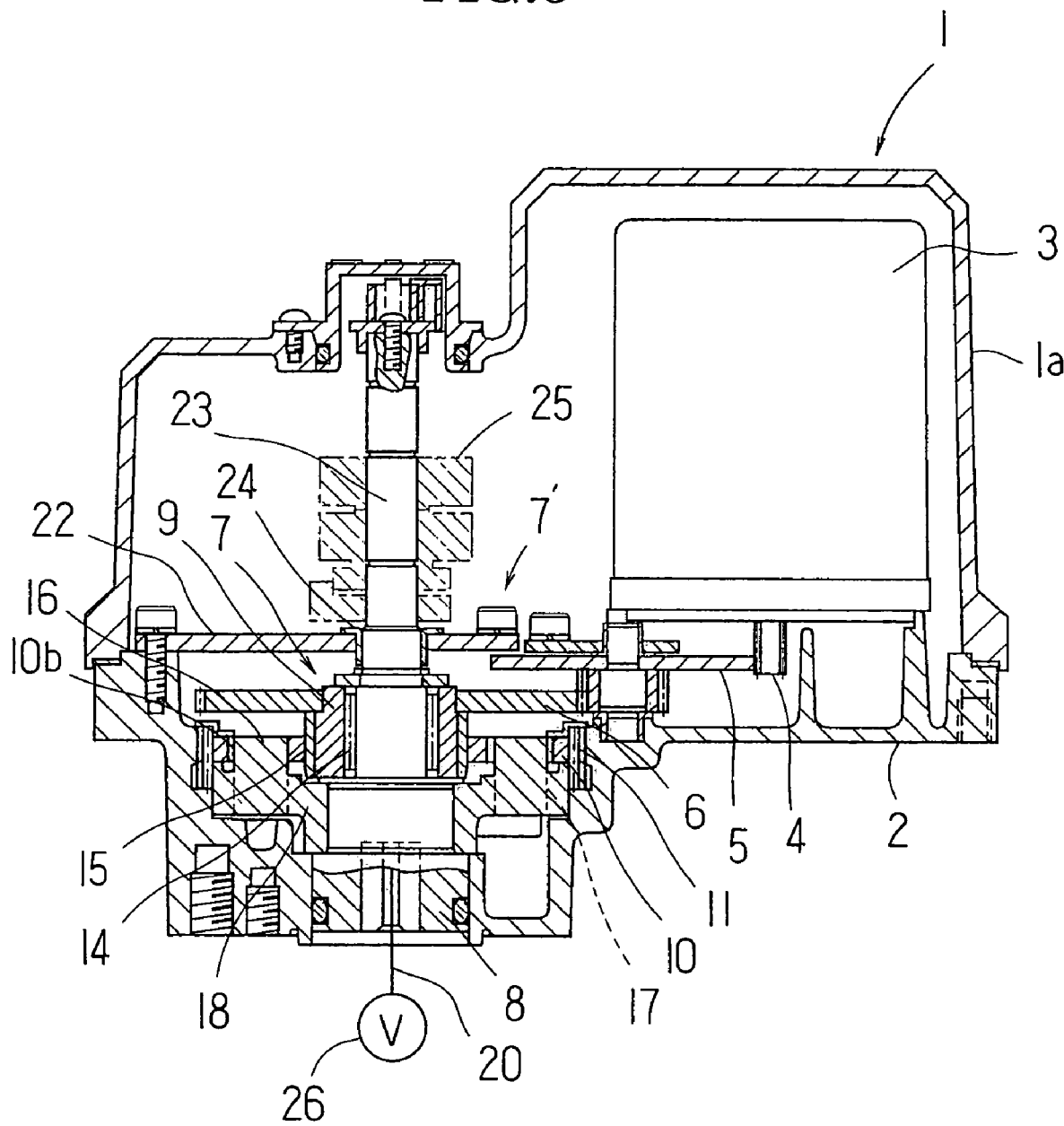
FIG. 6 is a front cross section of an actuator for a valve contemplated by this invention.
Figure 7:
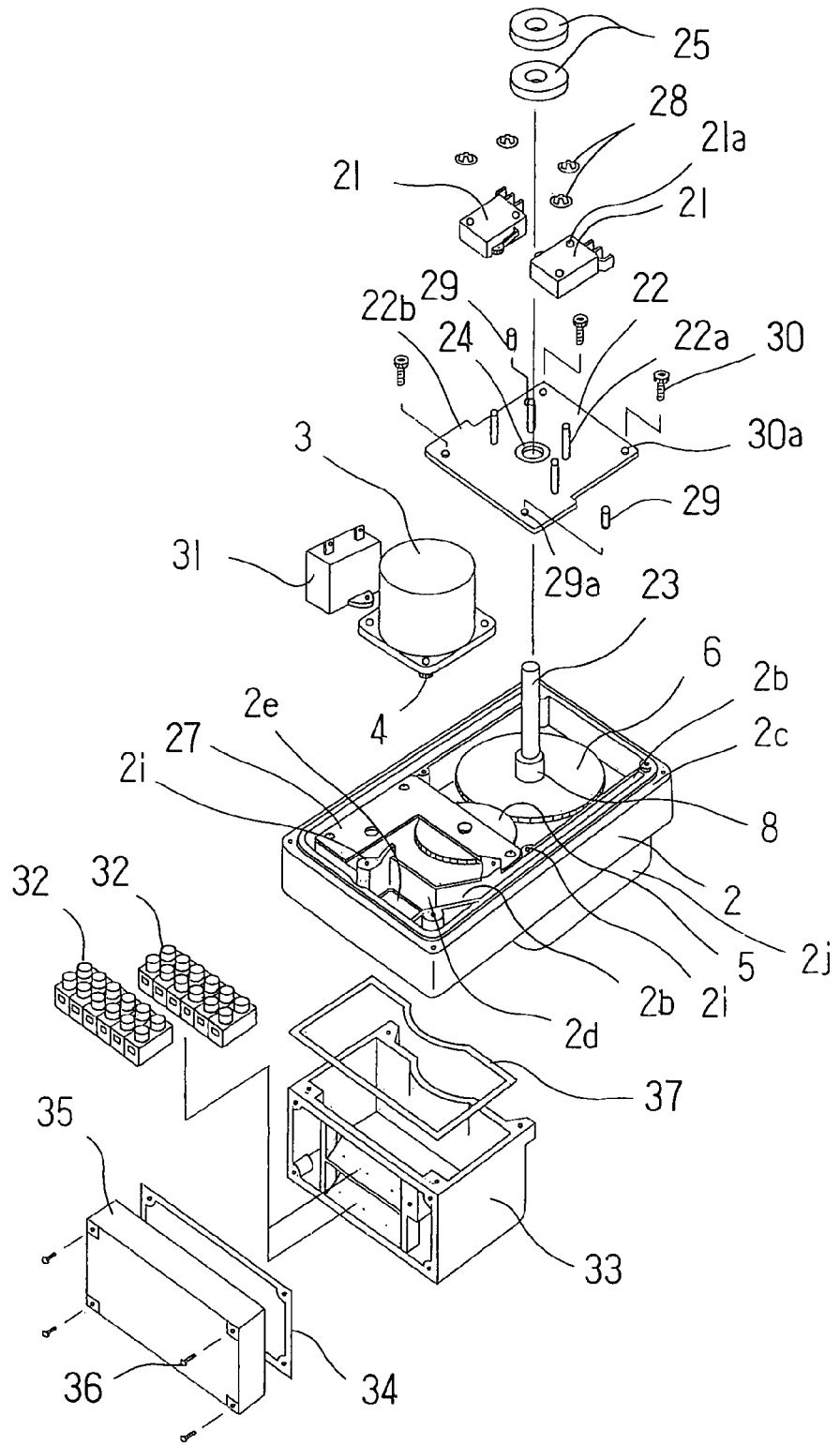
FIG. 7 is an exploded perspective view of FIG. 6.

FIG. 6 is a cross section illustrating an actuator 1 of this invention for a valve and FIG. 7 is an exploded perspective view. As illustrated, reference numeral 3 denotes a rotary drive source, such as a motor, capable of rotating in both directions or in one direction. This rotary drive source 3 is fixed on the upper surface side of the base body 2 with a fixing means, such as bolts that are not shown in the diagram. Then, reference numeral 4 denotes a driving shaft (pinion gear) of the rotary drive source 3. This driving shaft 4 is meshed with an intermediate gear 5 and consequently enabled to transmit the motive power from the rotary drive source 3. The intermediate gear 5 is meshed with an input gear 6 disposed coaxially with the output shaft 8. The rotation from the rotary drive source 3 is subjected to speed reduction through a drive shaft 4 and the intermediate gear 5 and subsequently fed into the input gear 6.

Reference numeral 7' denotes a speed reducing gear mechanism. This speed reducing gear mechanism 7' comprises an input gear 6, an eccentric body 9, an outer gear 10, a frame body 11, an output shaft 8 and an intermediate gear 5 meshed with the inner gear 6. The eccentric body 9 is fixed integrally with the input gear 6, provided in the lower part thereof with the eccentric part 9a tending to be deviated by an amount of eccentricity, e, from the axis of the outer shaft 8, and enabled to dispose the main body of the eccentric body 9 eccentrically rotatably as interlocked with the input gear 6 which is rotating synchronously with the rotation from the rotary drive source 3.

The actuator 1 of this invention for a valve utilizes in a version thereof the speed reducing gear mechanism 7' which is capable of regulating the vibrating rotation of the outer gear 10 which is producing the vibrating rotation in response to the eccentric rotation from the eccentric body 9 eccentrically rotating synchronously with the rotary drive source 3 and emitting the component of rotation of the outer gear 10 from the output shaft 8. In this version, a fitting plate 22 carrying a valve opening-detecting member 21, such as a limit switch, is fixed on the base body 2 incorporating the speed reducing gear mechanism 7' therein and, on this fitting plate 22, a valve opening-detecting part 24 is disposed in the bearing region of a controlling shaft 24 extended from the output shaft 8.

The valve opening-detecting part 21 has the point of contact thereof is disposed to produce an ON or OFF motion in conformity with the rotation of a limit switch cam 25 fixed coaxially with a controlling shaft 23 extended from the output shaft 8 and consequently enabled to detect the switching state or the intermediate opening of the valve body 26. Reference numeral 22a denotes a fitting part. This fitting part 22a is disposed in the projected state on the fitting plate 22. The attachment of the valve opening-detecting member 21 to the fitting plate 22 is implemented by causing the fitting part 22a to be inserted into the fitting hole 21a disposed in the valve opening-detecting member 21 and the valve opening-detecting member 31 is fixed as fastened from above by a retaining ring 28.

The valve opening-detecting part 24 is a bearing bush and is only required to regulate the vibration of either or both of a supporting plate 27 and a fitting plate 22. In the present embodiment, it regulates the vibration of the fitting plate 22. Preferably, the bearing bush 24 is formed as a one-piece type flat bearing with a material, such as PTFE, that has a small frictional resistance. It is permissible to use a roller bearing instead.

Even when the position of the axis of the controlling shaft 23 of the actuator is varied by a variation of the output, the valve opening-detecting member 21 can be disposed at a proper position commensurately with the variation of the position of the controlling shaft 23 by varying the fitting position of the fitting plate 22 with a pin 29 and a fixing member 30 which will be described more specifically herein below. Thus, the fitting plate 22 provided with the valve opening-detecting member 21 fits utilization. Since the unit formed of a plurality of such fitting plates 22 can be used as shared by actuators having different outputs, it obviates the necessity for changing the design of all the actuators involved.

After the fitting plate 22 has been fitted, the valve opening-detecting part 24 can eliminate the accidental contact between the output shaft 8 and the fitting plate 22 and the valve opening-detecting member 21 fitted to the fitting plate 22 can accurately detect the state of rotation of the controlling shaft 23. Further, the fitting plate 22 fulfills the function of retaining the controlling shaft 23 from above.

As the valve opening-detecting part, a radial bearing not shown in the diagram may be installed beneath the vibrating region in addition to the bearing bush 24. The suppression of the accidental contact may be enhanced through having such bearing members, one each on the upper side and the lower side of the vibrating region.

Reference numeral 29 denotes a pin. When the fitting plate 22 is to be fixed on the base body 2, first the fitting plate 22 is positioned as fixed provisionally in a diagonal direction with the pin 29 as illustrated in FIG. 7 and subsequently it is tightened and fixed with the fixing member 30, such as bolts. As a result, the optimum bearing position incurring the accidental contact only scarcely can be fixed even when the position of the controlling shaft is varied by an addition to the size of the actuator. When the fitting plate is to be disposed on a different actuator, this fitting plate 22 can be fitted and fixed at a position arbitrarily selected by changing the positions respectively of a pinhole 29a and a female screw 30a that are disposed on the base body 2.

Figure 8:
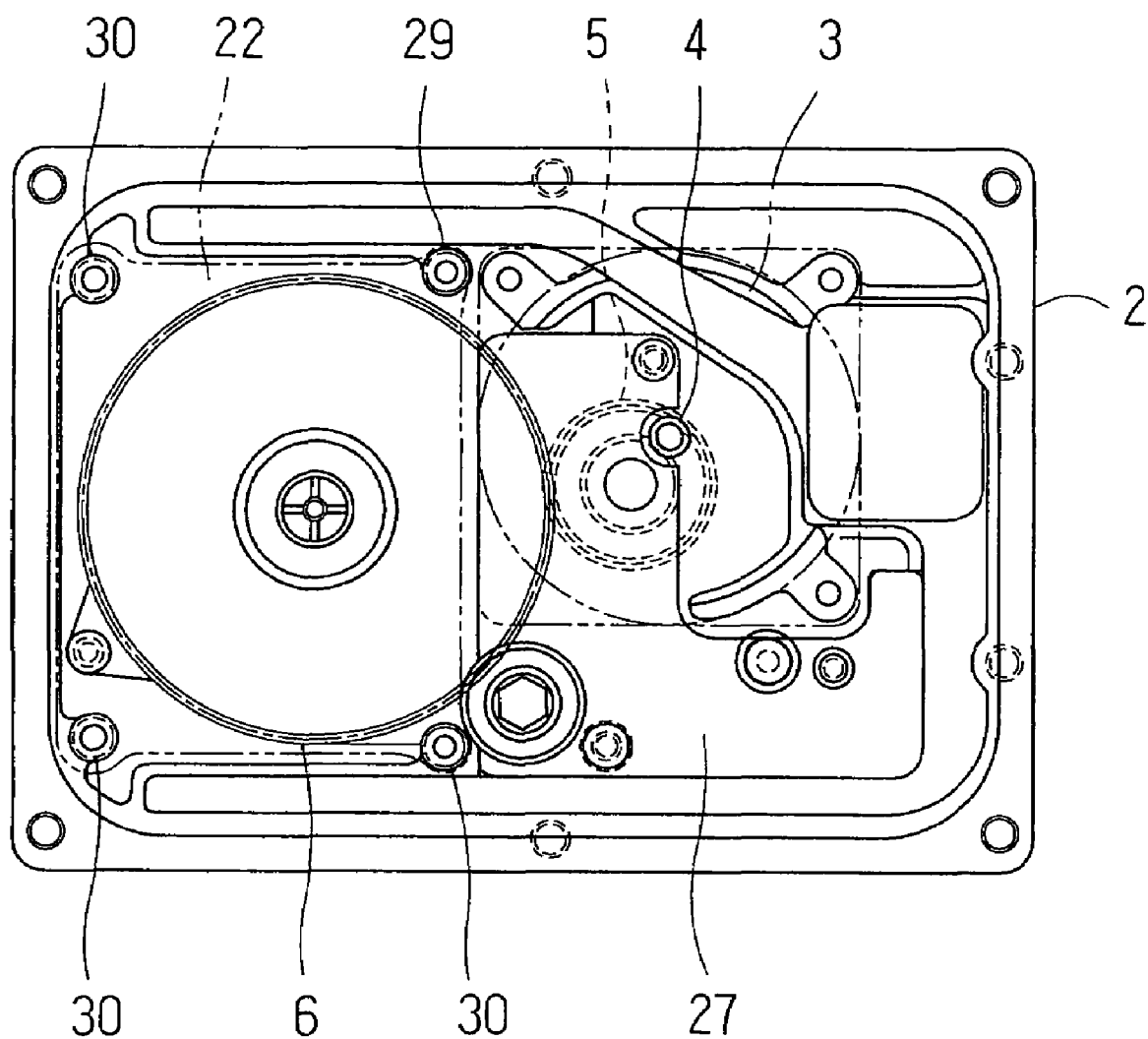
FIG. 8 is a schematic plan view illustrating an actuator for a valve contemplated by this invention.
Figure 27:
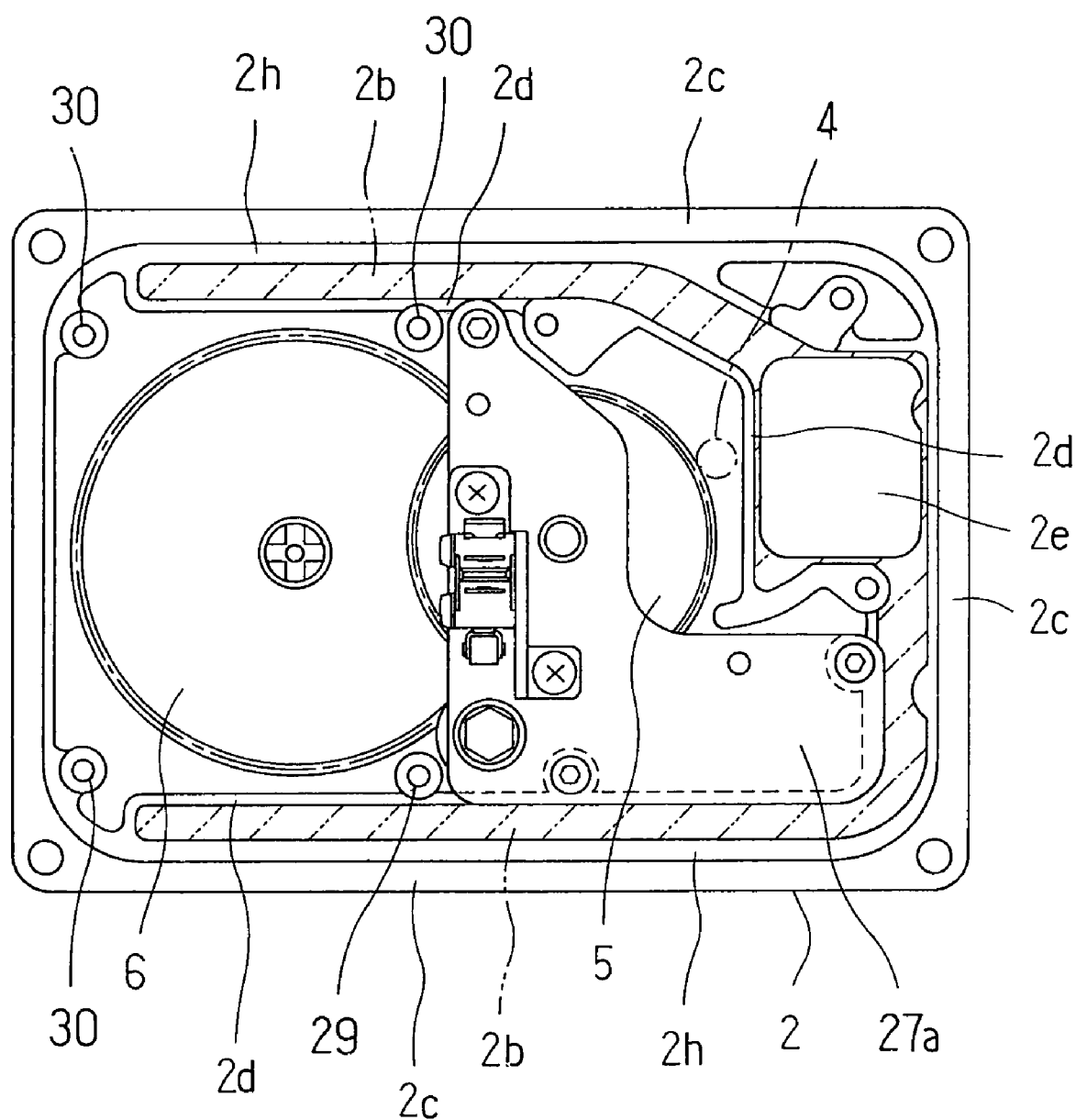
FIG. 27 is a plan view illustrating wire-containing grooves formed in the base body.

FIG. 8 is a schematic plan view of an actuator 1 of this invention for a valve. The supporting plate may be deformed into a supporting plate 27a to suit the position for fitting the rotary drive source 3 as shown in FIG. 27 which will be specifically described herein below. When the combination of gears and the volume of the gears are varied by the change of the reduction ratio of the speed reducing gear mechanism 7' and the position of the intermediate gear 5 is consequently varied, the rotary drive source 3 can be fixed at an expected position by means of the supporting plate 17a so modified in shape that the rotary drive source 3 may assume a position enabling the driving shaft 4 to be meshed therewith in conformity with the position of the intermediate gear 5.

Then, reference numeral 31 denotes a condenser, numeral 32 a terminal base, and numeral 33 a terminal box for containing the terminal base 32. After the terminal base 32 is contained in the terminal box 33, a terminal box cover 35 is fastened in position with a bolt 36, with a tightly sealable gasket 34 nipped between the terminal box 33 and the terminal box cover 35. Further, this terminal box 33 is attached to the base body 2 while it is tightly sealed with a gasket 37.

Here, the main component elements of which the speed reducing gear mechanism 7' is formed will be described. The outer gear 10 is joined to the outer peripheral surface side of the eccentric body 9 through the bearing 15. The outer gear 10 is so disposed as to eccentrically rotate in response to the eccentric rotation from the eccentric body 9. The tooth profile of this outer gear 10 is formed in a curve that consists of epitrochoid parallel curves The frame body 11 is formed in a proper shape, such as a circular shape or a rectangular shape. It is formed integrally with the base body 2 serving to contain the speed reducing gear mechanism 7'. In the present embodiment, this frame body 11 is finished as an inner gear having an inner gear tooth 11a of an arcuate tooth profile formed on the inner peripheral side. The frame body 11 has the inner gear tooth 11a thereof meshed with the outer gear 10 so as to regulate the eccentric rotation of the outer gear 10 and enable the outer gear 10 to generate a vibrating rotation.

The outer shaft 8 has the flange part 18 integrally fixed thereto in a rotatable manner. Reference numeral 17 denotes an inserting hole disposed in the flange part 18. One side of the inner pin 16 formed in the shape of a bar is inserted in this inserting hole 17.

The other side of the inner pin 16 is inserted idly in the through hole 10b formed in the outer gear 10 so as to join the outer gear 10 and the flange part 18 in a superposed state.

The rotating motion of the outer gear 10 is converted into a rotary motion of the outer shaft 8 fixed to the flange part 18 through the function of tending to roll the inner pin 16 inside the through hole 10b. The outer shaft 8 is so disposed as to be interlocked with the outer gear 10 and consequently enabled to make the outer gear 10 emit a component of rotation.

Reference numeral 20 denotes a valve stem. The outer shaft 8 enables the valve body 26 to be rotatably connected thereto through this valve stem 20.

During the course of switching motion of the valve, the eccentric body 9 that is integral with the input gear 6 is rotated when the rotation from the rotary drive source 3 is transmitted via the intermediate gear 5 to the inlet gear 6.

When the eccentric body 9 rotates, the eccentric part 9a is eccentrically rotated. This eccentric rotation is transmitted via the bearing 15 to the outer gear 10 and the outer gear 10 is made to start producing an eccentric rotation.

The outer gear 10 is caused by the rotation of the eccentric body 9 to revolve at a high speed around the axis of the outer shaft 8 as the center and, at the same time, tend to rotate at a low speed. Owing to the combination between the frame body 11 meshed with the outer gear 10 and the inner gear tooth 11a, this rotation is controlled, the outer gear 10 is made to produce a vibrating rotary motion apparently contiguous internally to the inner gear tooth 11a, and only the speed-reduced component of rotation of the outer gear 10 is extracted and transmitted to the output side.

When the outer gear 10 produces a vibrating rotation, then the inner pin 16 tends to roll inside the inner pinhole 10b. Through this inner pin 16, the outer gear 10 is enabled to transmit the rotation thereof to the outer shaft 8 that is interlocked with the outer gear 10 and the output shaft 8 is enabled to produce a rotation of a reduced speed.

At this time, the outer shaft 8 is exposed to the force tending to vibrate it by dint of the vibrating rotation of the outer gear 10. The vibration is suppressed and turned into rotation by the controlling shaft 23 that has been axially fixed in a state of a decreased gap by the bearing bush 24.

Now, the operation of the second aspect of this invention described above will be explained specifically below.

The actuator 1 of this invention for a valve causes the fitting plate 22 carrying the valve opening-detecting member 21, such as a limit switch, to be positioned and fixed on the base body 2 incorporating the speed reducing gear mechanism 7' therein. On this fitting plate 22, the valve opening-detecting part 24 is disposed at the bearing region of the controlling shaft 23 extended from the output shaft 8. Thus, it is made possible to minimize the gap between the controlling shaft 23 and the valve opening-detecting part 24 and preclude the axial deviation, to enable the valve opening-detecting member 21 to detect accurately the state of rotation of the control shaft 23 extended from the output shaft 8, and to effect accurate control of the rotating operation of the valve body 26 without entailing malfunction.

Figure 9:
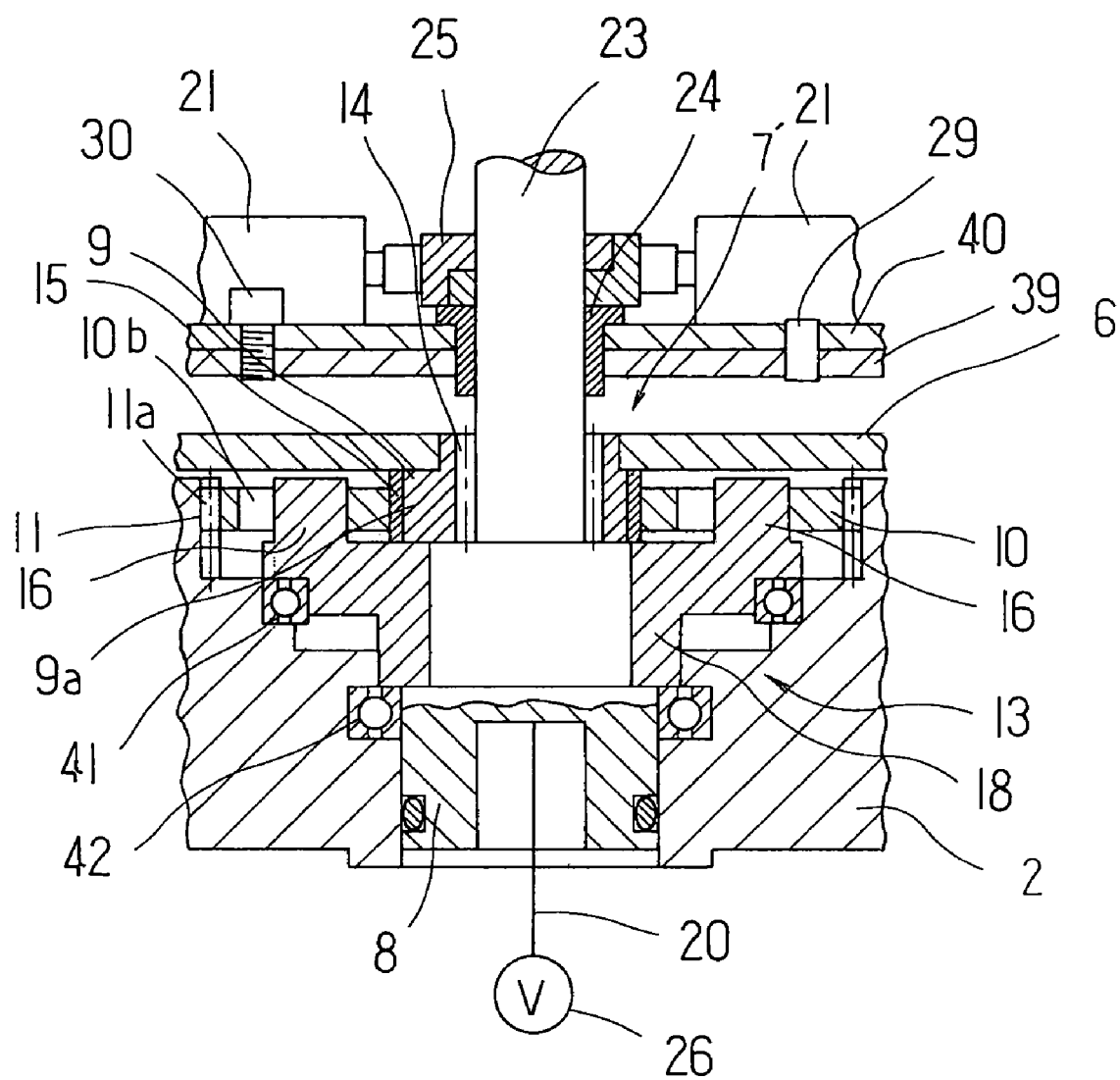
FIG. 9 is a partially magnified cross section illustrating another embodiment of this invention.
Figure 10:
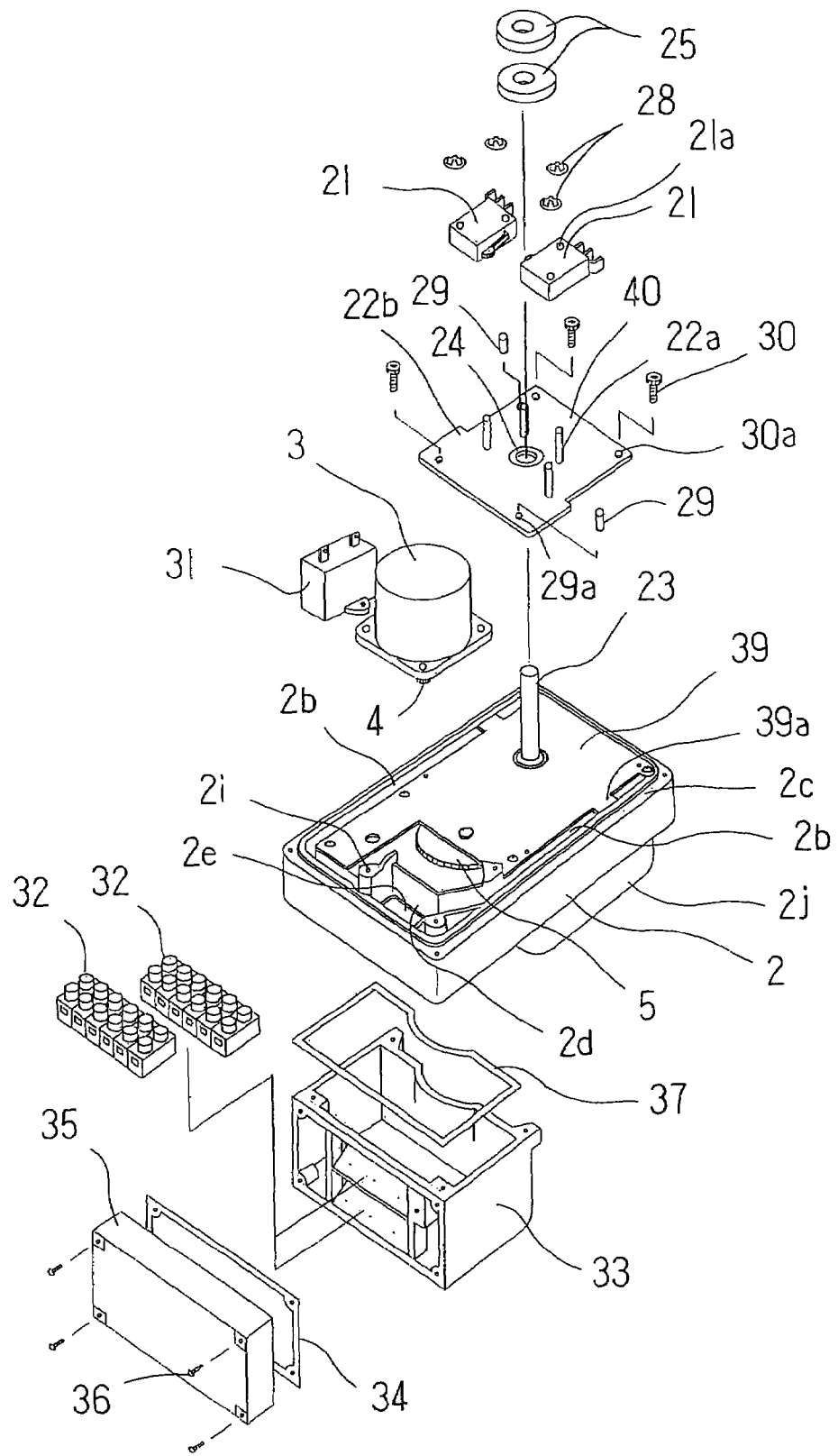
FIG. 10 is an exploded perspective view of FIG. 9.
Figure 11:
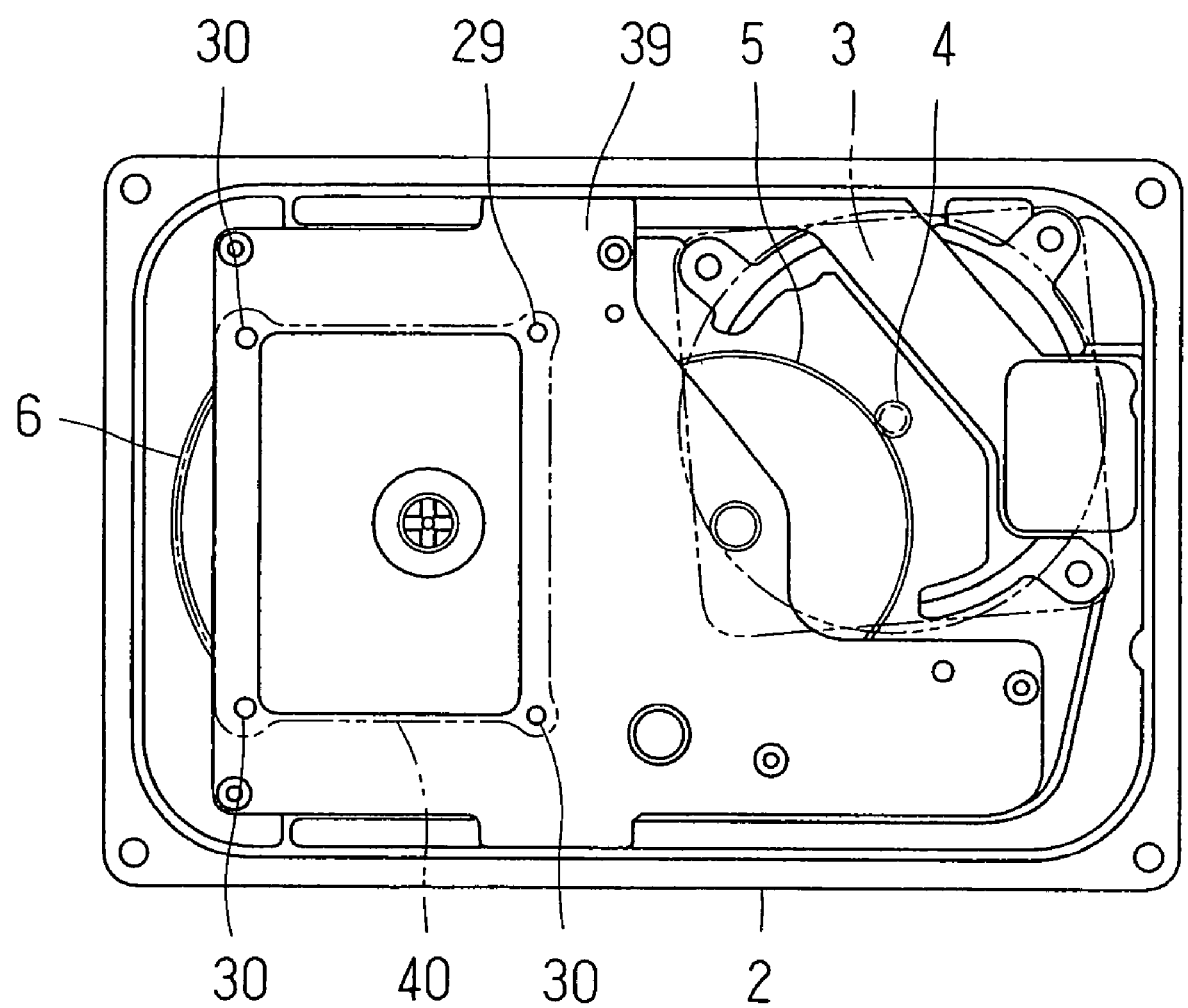
FIG. 11 is a schematic plan view illustrating still another embodiment of this invention.

FIG. 9 is a partially magnified cross section illustrating another embodiment of the actuator contemplated by this invention for a valve, FIG. 10 is an exploded perspective view thereof and FIG. 11 is a schematic plan view thereof. The same portions as used in the foregoing embodiment will be denoted by the same reference numerals and the explanation thereof will be omitted.

The actuator 1 for a valve utilizes in a version thereof the speed reducing gear mechanism 7' which is capable of controlling the vibrating rotation of the outer gear 10 producing this vibrating rotation in response to the eccentric rotation from the eccentric body 9 eccentrically rotating synchronously with the rotary drive source 3, such as a motor, and extracting the component of rotation of the outer gear 10 from the outer shaft 8. In this version, a supporting plate 39 bearing the controlling shaft 23 extended from the output shaft 8 is fixed on the base body 2 incorporating the speed reducing gear mechanism 7' therein, a fitting plate 40 carrying the valve opening-detecting member 21, such as a limit switch, is fixed in place on the supporting plate 39, and the valve opening-detecting part is disposed on the fitting plate 40 in the bearing region of the controlling shaft 23 extended from the output shaft 8.

This actuator 1 is what results from fixing on the supporting plate 27 shown in FIG. 6 the fitting plate 2 having attached thereto the valve opening-detecting member 21. It has the vibration thereof controlled by the valve opening-detecting part 24. Thus, it is made possible to ensure the positioning of the controlling shaft 23 and the valve opening-detecting member 21 and enable the valve opening-detecting part 24 to suppress the deviation of the controlling shaft 23 and the valve opening-detecting member 21.

The bearing bush 24 is fitted so as to pierce the supporting plate 39 and the fitting plate 40, and this bearing bush 24 is enabled to suppress the mutual vibration of the supporting plate 39 and the fitting plate 40. Thus, it is made possible to fix the valve opening-detecting member 31 at any necessary position with the relation of positions of the valve opening-detecting member 21 and the output shaft 8 retained in a proper state.

This actuator, therefore, is particularly effective when it has a large output of rotation and has a large size.

Figure 14:
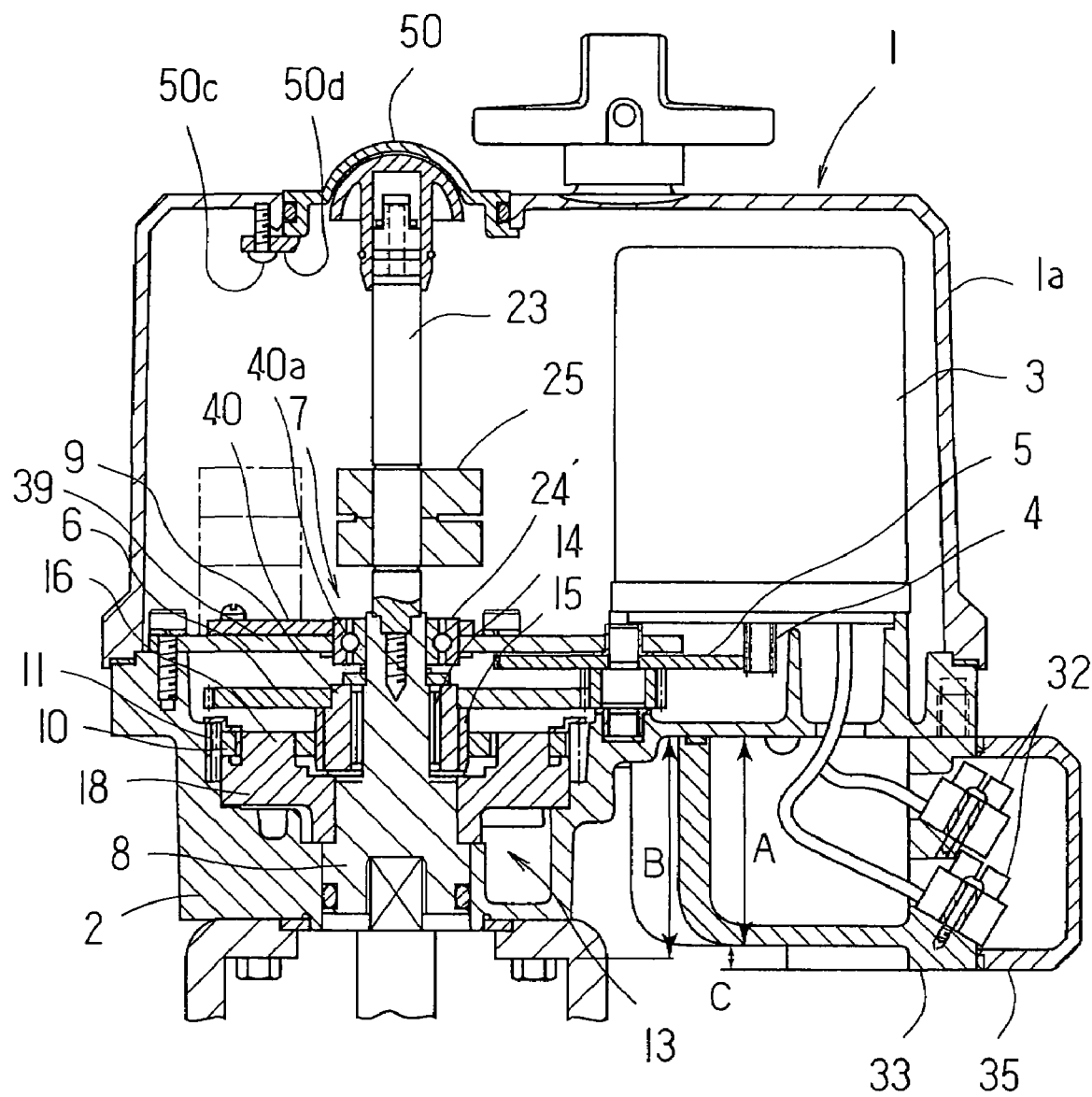
FIG. 14 is a front schematic diagram of an actuator for a valve contemplated by this invention.
Figure 15:
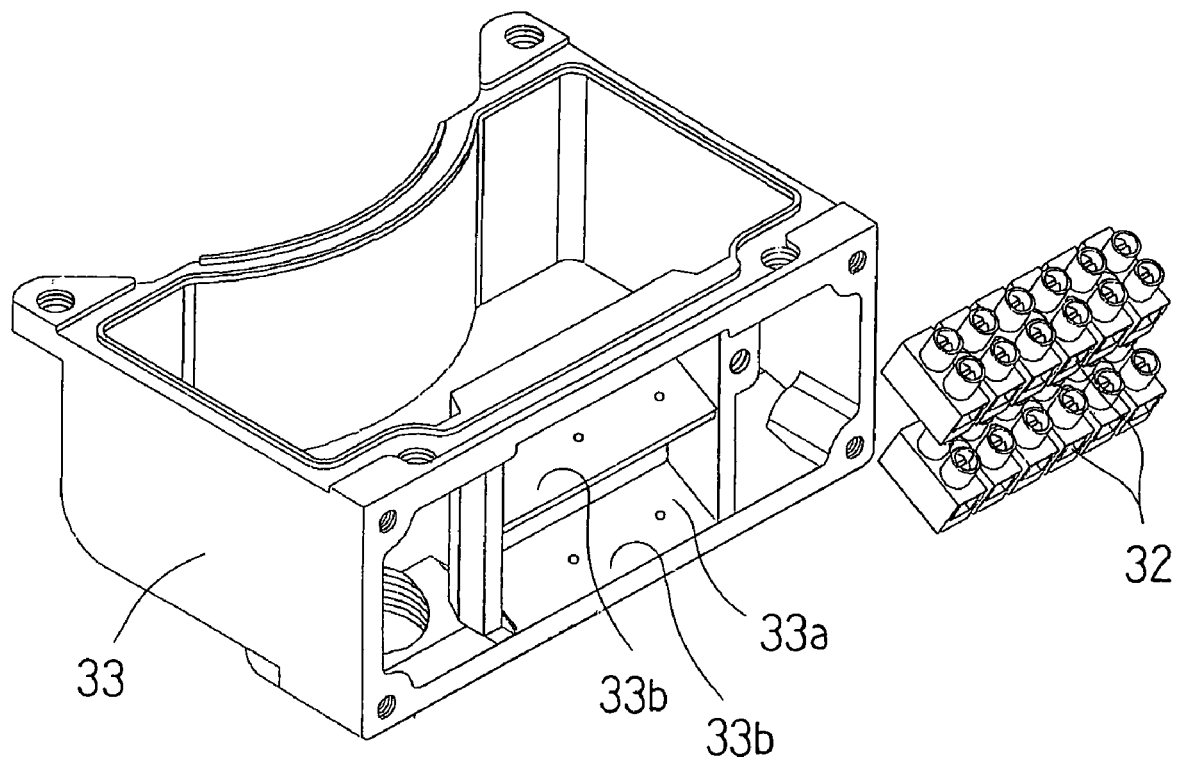
FIG. 15 is an exploded perspective view of a terminal box and a terminal base.

Further, in the case of a large actuator having a large output of rotation, it is permissible to adopt a bearing bush in the place of the valve opening-detecting part 24 and use such a roller bearing 24' as shown in FIG. 14. The roller bearing 24' is attached to the supporting plate 39 and the inner periphery of the controlling shaft inserting hole 40a of the fitting plate 40 is fitted to the outer periphery of the roller bearing 24'.

In the present example, the vibration of the controlling shaft 23 is controlled by the supporting plate 39 through the roller bearing 24' and is prevented from being transmitted to the fitting plate 40 by setting the fitting of the roller bearing 24' and the supporting plate 39 intensely and setting the fitting of the roller bearing 24' and the fitting plate 40 more loosely than the fitting with the supporting plate 39.

According to the actuator of this invention, therefore, the deviation of the relative position of the cam member 25 attached to the controlling shaft 23 and the valve opening-detecting member 21 fixed to the fitting plate 40 can be decreased and the degree of opening of the valve can be accurately detected because the vibration of the controlling shaft 23 is controlled by the supporting plate 39 through the valve opening-detecting part 24 and, at the same time, the positioning of the valve opening-detecting member 21 is effected by the fitting plate 40 positioned on the supporting plate 39.

The valve opening-detecting part may be enabled to suppress the axial deviation effectively by being provided with the bearing bush 14 and further provided below the vibrating region of the speed reducing gear mechanism 7' with radial bearings 41 and 42.

The actuator utilizes in another version thereof the speed reducing gear mechanism which is capable of suppressing the vibrating rotation of the outer gear producing the vibrating rotation in response to the eccentric rotation from the eccentric body eccentrically rotating synchronously with the rotary drive source, such as a motor, and extracting the component of rotation of the outer gear from the output shaft. In this version, the valve opening-detecting member, such as a limit switch, is mounted on the base body incorporating the speed reducing gear mechanism therein, the supporting plate bearing the controlling shaft extended from the outer shaft is fixed in position, and the valve opening-detecting part is disposed on the supporting plate in the bearing region of the controlling shaft. In this case, the controlling shaft is attached to the supporting plate at the fixing position.

Figure 12:
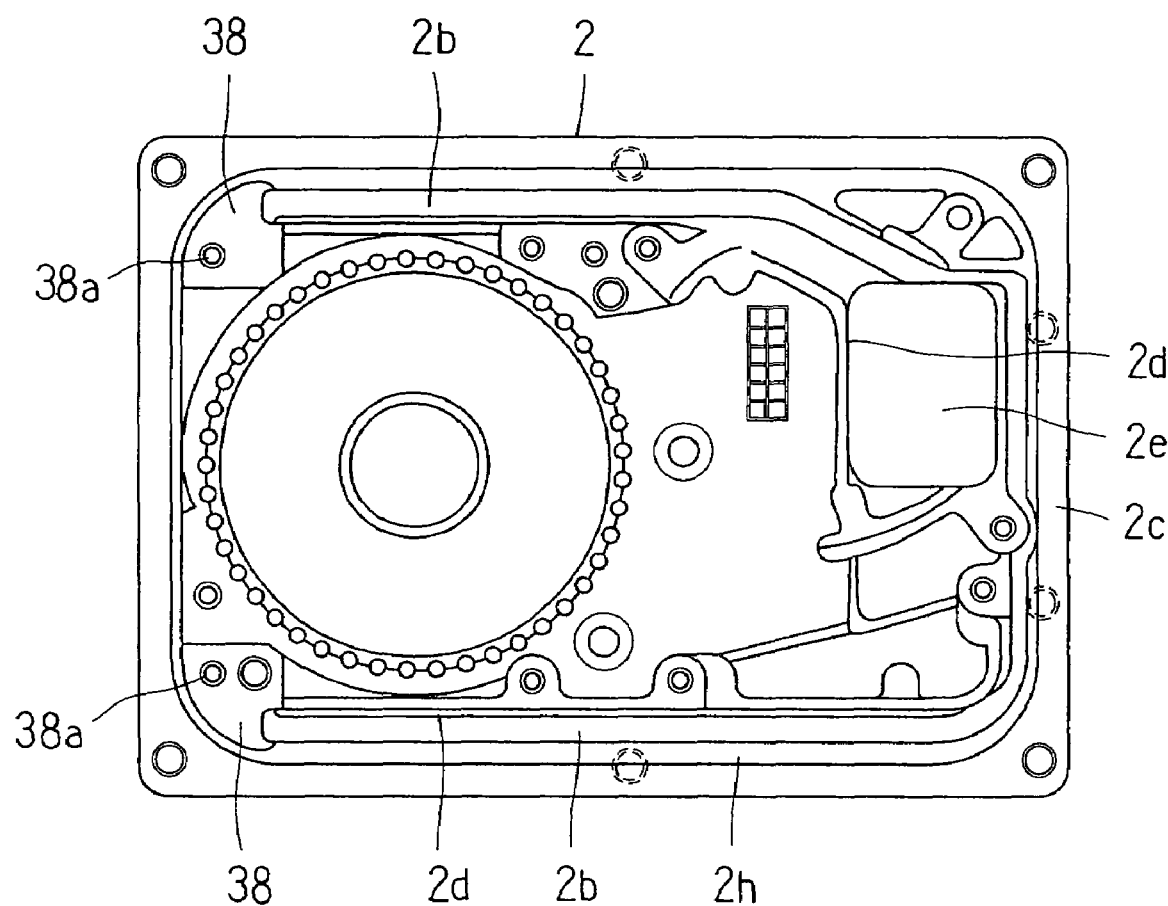
FIG. 12 is a schematic plan view illustrating a planar supporting part.

It is permissible to form the planar-mounting part 38 in the upper part of the base body and fix in position the supporting plate 39 or the fitting plate 22 to the planar-mounting part 38 as illustrated in FIG. 12.

The vibration of the controlling shaft 23 originating in the inner gearing planet gear speed reducing mechanism can be suppressed because the controlling shaft 23 is supported by the valve opening-detecting part 24 disposed on the supporting plate 39 and the supporting plate 39 is fixed strongly to the planar-mounting part 38 of the base body 2. Particularly, by causing the shape of the planar-mounting part 38 disposed in the neighborhood of the edge part in the upper part of the base to acquire an increased wall thickness toward the inner gearing planet gear speed reducing mechanism relative to the female screw position 38a allowing helical insertion of the supporting plate fitting bolt, it is made possible to control the vibration of the controlling shaft 23 while suppressing the increase of weight of the actuator by the least necessary addition to the wall thickness of the planar-mounting part 38 even when the vibration mentioned above is transmitted to the supporting plate 39 via the controlling shaft 23 and the valve opening-detecting part 24.

Now, one embodiment of the actuator for a valve that is contemplated by the third aspect of this invention will be described. The same component parts as used in the aforementioned first and second aspects of this invention will be denoted by the same reference numerals and the explanation thereof will be omitted.

The actuator 1 of this invention for a valve, as illustrated in FIG. 1 and FIG. 2, comprises a casing 1a, an electric motor 3 directly disposed in the casing 1a (on the base body 2 in the present embodiment), an intermediate gear 5 meshed with a pinion gear 4 disposed on the rotating shaft of the electric motor 3, an inner gear 6 meshed with the intermediate gear 5 and disposed coaxially with the outlet shaft, an inner gearing planet gear speed reducing mechanism 7 to which the turning force from the electric motor 3 is transmitted through the intermediate gear 5 and the inlet gear 6, an output shaft 8 rotated by the turning force having the speed thereof reduced through the gear speed reducing mechanism 7, a controlling shaft 23 extended upwardly from the outlet shaft 8, and a valve opening-detecting member 21 disposed above the gear speed reducing mechanism 7.

Incidentally, the construction of the gear speed reducing mechanism 7 has been described in detail with respect to the aforementioned first aspect of the invention and the explanation thereof will be omitted here.

In the upper part of the output shaft 8, the controlling shaft 23 having a smaller diameter than the output shaft 8 is disposed either integrally or separately as extended into an independent body.

The controlling shaft 23 is provided with a cam member 25 adapted to effect an ON or OFF operation of the limit switch (valve opening-detecting member) 21 by depression. In the present embodiment, the cam member 25 is disposed so as to permit adjustment of the angle thereof through a tolerance ring 43.

Figure 13:
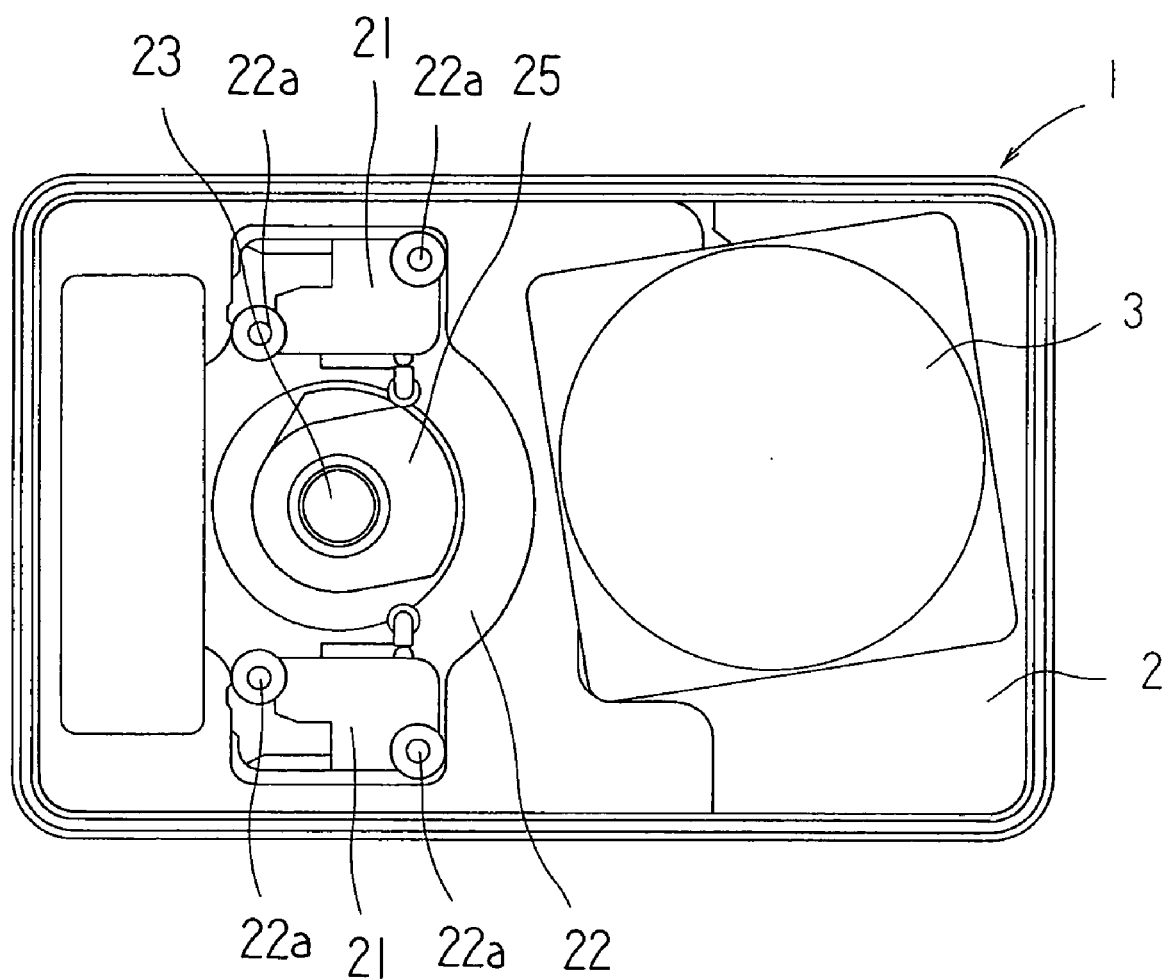
FIG. 13 is a plan view of an actuator for a valve contemplated by this invention in a state divested of a casing (actuator cover).

Further, the valve opening-detecting member 21 formed of a limit switch or a potentiometer, for example, is positioned above the gear speed reducing mechanism 7 and, at the same time, disposed within the area in planometric view of the gear speed reducing mechanism 7 as illustrated in FIG. 2 and FIG. 13.

Then, the valve opening-detecting member 21 is formed as a unit by being disposed on the fitting plate 22 (40) in common use and fixed to the base body 2 through the fitting plate 22 (40).

In the present embodiment, the valve opening-detecting member (such as a limit switch) 21 is disposed on the fitting plate 22 (40) through the fitting member 22a. Optionally, an auxiliary limit switch, for example, may be additionally disposed as superposed on the limit switch 21.

The motor 3 is disposed outside the surface area in planometric view of the gear speed reducing mechanism 7 and, in the present embodiment, the motor 3 is disposed as directly attached onto the base body 2 as illustrated in FIG. 1 and FIG. 13.

The terminal box 33 to which the electric wires for the motor 3 and the valve opening-detecting member 21 formed of a limit switch or a potentiometer are connected may be disposed outside the lower part of the base body 2.

To explain the terminal box 33, this terminal box is disposed in the space that constitutes the lower surface of the base body 2, the lower position of the electric motor 3, and at the same time, the lateral position of the gear speed reducing mechanism 7 as illustrated in FIG. 14. This terminal box 33 is adapted to serve as a module part that may fit actuators of different outputs in common.

The efficiency of the work of assembling the actuator and the main body (not shown) of the valve is secured by setting the condition, A<B, wherein A stands for the size from the lower surface of the base body 2 to the lower surface of the terminal box 33 and B for the size from the lower surface of the base body 2 to the bearing surface of the volt of the actuator fixing bracket as shown in FIG. 14.

In the opening part 33a of the terminal box main body 33 closed with the terminal box cover 35, terminal base fitting parts 33b and 33b having an inclining angle in the range of 15° to 45° (preferably about 30°) in the present example are formed. To the terminal base fitting parts 33b and 33b, two terminal bases 32 and 32 to which the electric cable from the electric parts, such as the electric motor 3, disposed on the base body 2 and the external electric cable, such as the power source, are electrically connected are fitted through fixing members, such as screws.

In the present example, the terminal base 32 attached to the terminal base fitting part 33b is disposed in an inclined state relative to the opening part 33a as illustrated.

The terminal fitting part 33b in this example is disposed on two stages and provided with two terminal bases 32 and 32, and these terminal bases 32 are provided, not exclusively, with six electric cable-inserting ports. The terminal base fitting part 33b may be disposed on one stage or on a plurality of stages, the number of terminal base 32 may be one or a plurality, and the electric cable-inserting ports may be disposed on a proper number of stages. These numbers may be properly decided to suit the actual installation.

In the present example, the terminal base 32 is disposed, not exclusively, on the platelike terminal base fitting part 33b that has an inclined angle For example, the construction in which the basement having the terminal base 32 deposited in advance thereon is so contained as to be slid in the horizontal direction, though not illustrated in the diagram, may be adopted.

The actuator for a valve that is shown in FIG. 14 suppresses the axial vibration of the controlling shaft 23 by the use of a roller bearing 24'. The roller bearing 24' is retained by the supporting plate 39 which is fixed with a bolt to the planar-mounting part 38 laid above the base 2. The fitting plate 40 is fixed in position by the outer periphery of the roller bearing 24'.

In the construction shown in FIG. 14, a valve opening cover 50 is inserted from the inner side of the actuator cover 1a and fixed with a bolt 50c and a retainer 50d. Since a bolt 50c does not protrude from the upper surface of the actuator cover, the bolt does not interfere with the manual operation of the actuator and the construction enjoys a good external appearance.

The construction in which the turning force from the electric motor 3 is subjected to speed reduction and then transmitted to the output shaft 8 has been already described in detail in the foregoing first aspect of the invention. The description of this construction will be omitted.

When the output shaft 8 is rotated, the controlling shaft 23 disposed integrally or separately as extended in the upper part of the output shaft 8 is rotated, and the limit switch (valve opening-detecting member) 21 disposed above the gear speed reducing mechanism 7 is turned on or off by the cam member 25 disposed on the controlling shaft 23 so as to impart a wholly opened state or a wholly closed state to the valve body 26 disposed at the leading terminal of the valve shaft 20.

Further, in the embodiment which is furnished for the aforementioned gear speed reducing mechanism 7, the stopper part 12 disposed integrally or separately on the lower surface of the pin flange 18 and the rotation-regulating part 19 with which the stopper part 12 collides and engages are disposed on the base body 2. Particularly during the course of manual operation, when the output shaft 8 is rotated through the manual operation mechanism 44 disposed as projected above the actuator cover, the stopper part 12 collides against and engages with the engaging surface (engaging part) 19a of the rotation-regulating part 19 so as to control the rotation of the output shaft 8 in the prescribed angle (90° or 180°).

The actuator 1 of this invention for a valve is naturally capable of retaining the valve at a position forming an intermediate degree of opening.

Now, the operation of the foregoing third aspect of the invention will be specifically described below.

The actuator 1 for a valve which is contemplated by this invention forms, as a means to impart speed reduction to the turning force from the electric motor 3 disposed on the base body 2 and transmit the resultant turning force to the output shaft 8, the inner gearing planet gear speed reducing mechanism 7 comprising an eccentric body 9 having an eccentric part 9a, an outer gear 10 disposed so as to be vibrated and rotated through the eccentric body 9, an inner gear meshed in an inscribing manner with the outer gear 10, a rotation-transmitting mechanism 13 extracting rotation from the vibrating rotation of the outer gear 10 and transmitting the rotation to the outer shaft 8 and an output shaft 8 joined through the rotation transmitting mechanism 13 and disposes this speed reducing mechanism 7 coaxially with the output shaft 8, so that the actuator can acquire a large reduction ratio with a small space and secure an available space for incorporating other electronic parts as well.

The controlling shaft 23 having a smaller diameter than the output shaft 8 is disposed either integrally or separately as extended on the output shaft 8. By giving to this controlling shaft 23 a fixed diameter irrespectively of the turning force from the motor 3, namely the magnitude of the output torque, the cam member 25 disposed in the controlling shaft 23 is enabled to serve as a common part.

When the output shaft 8 and the controlling shaft 23 are formed as separate components as shown in FIG. 14, since the controlling shaft 23 of a smaller diameter can be manufactured from a material of the least necessary diameter without requiring use of the material of the output shaft 8 of a larger diameter, it can lower the cost of material and fabrication. By fitting this controlling shaft 23 in advance with so many cam members 25 as suit the specification (two, four, or six limit switches, for example) of the actuator and preparing a plurality of kinds of controlling shafts 23, it is made possible to attain the assemblage of the actuator simply by connecting to the output shaft 8 the controlling shafts 23 fitted with the necessary number of cam members 25. Thus, the actuator conforming to the proper specification can be assembled in a short span of time.

Further, by disposing the valve opening-detecting member 21 formed of a limit switch or a potentiometer, for example, on the gear speed reducing mechanism 7 and within the surface area in planometric view of the gear speed reducing mechanism 7, it is made possible to retain the relative position of the cam member 25 disposed in the controlling shaft 23 and the valve opening-detecting member 21 constant and compact without reference to the turning force from the motor 3, namely the magnitude of output torque, allow the valve opening-detecting member 21 formed of a limit switch or a potentiometer, for example, to serve as a common component part, and miniaturize the actuator itself.

Particularly by disposing the valve opening-detecting member 21 within the surface area in planometric view of the gear speed reducing mechanism 7 having a large output torque, this valve opening-detecting member 21 is enabled to serve as a component part used concurrently with the actuator of a smaller output torque and disposed jointly therewith.

Then, by causing the valve opening-detecting member 21 formed of a limit switch or a potentiometer, for example, to be disposed on the common fixing plate 22 (40) in a fixed size and finished jointly as a unit without reference to the magnitude of the output torque, it is made possible to position the component members with the common fitting plate 22 (40).

Further, the available space can be secured by having the motor 3 disposed outside the surface area in planometric view of the gear speed reducing mechanism 7. When the motor 3 is disposed above the base body 2 laid obliquely above the gear speed reducing mechanism as shown in FIG. 1, for example, the terminal box 33 to which the electric cables of the motor 3 and the valve opening-detecting member 21 formed of a limit switch or a potentiometer, for example, are connected is enabled to be disposed outside the lower part of the base body 2.

Thus, the motor 3 and the terminal box 33 can be laid out while the horizontal dimension of the actuator is decreased.

Figure 16:
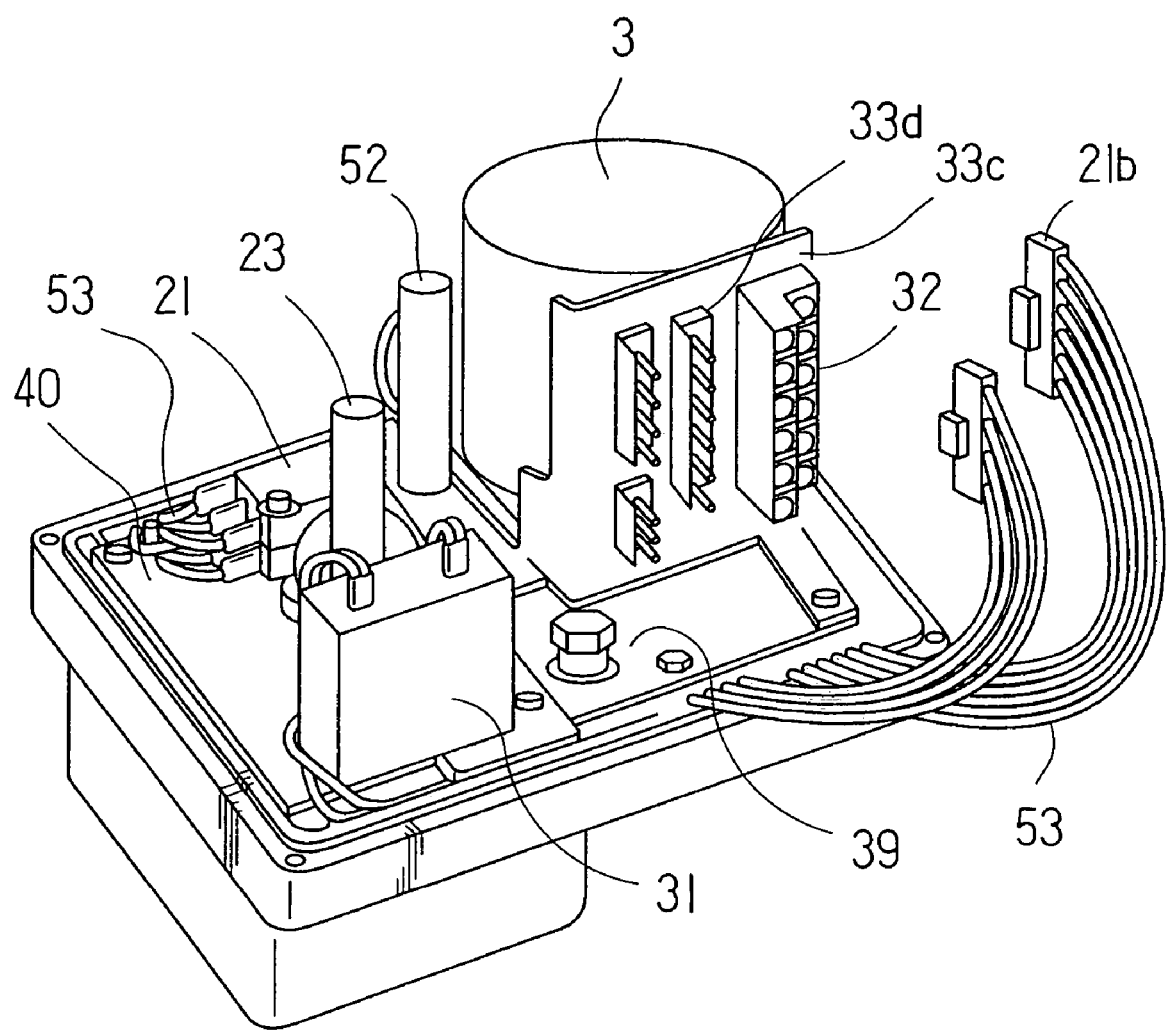
FIG. 16 is a perspective view illustrating yet another embodiment of this invention.

Further, the limit switch 21 to which the connecter retainer 21b is connected through a power source 53 is attached in advance to the fitting plate 40 and finished jointly as a unit as shown in FIG. 16. The number of limit switches 21 varies with the specification of the actuator. It is therefore commendable to prepare a plurality of kinds of fitting plates 40 as a unitized component.

During the course of the assemblage of the actuator, by attaching fitting plates 40 conforming with the expected specification to the supporting plate 39 and, at the same time, inserting the connecter retainer 21b into the connecter base 33d fixed in advance to the terminal base fitting plate 33c, it is made possible to connect the terminal base 32 on the terminal base fitting plate and the limit switch 21 in a communicable state and complete the work of imposing the limit switch 21 in the actuator.

Thus, it is made possible to construct the valve opening-detecting member 21 formed of a limit switch, for example, as a unitized part and enable the work of assembling the actuator to be effected accurately and easily.

Now, one embodying of the actuator for a valve according to the fourth aspect of this invention will be described below. The same component parts as used in the preceding embodiments of the first to three aspects of the invention will be denoted by the same reference numerals and the explanation thereof will be omitted.

Then, in the present embodiment, the inner gearing planet gear speed reducing mechanism is imposed as a speed-reducing mechanism that constitutes a motive power transmitting mechanism.

The actuator 1 for a valve according to this invention, as shown in FIG. 1 and FIG. 2, comprises a casing 1a, an electric motor 3 imposed as directly attached in the casing 1a (on the base body 2 in the present embodiment), an intermediate gear 5 meshed with a pinion gear 4 disposed on the driving shaft of the electric motor 3, an input gear 6 meshed with the intermediate gear 5 and disposed coaxially on the output shaft, an inner gearing planet gear speed reducing mechanism 7 to which the turning force from the electric motor is transmitted through the intermediate gear 5 and the input gear 6, an output shaft 8 rotated by the turning force subjected to speed reduction through the gear speed reducing mechanism 7, a limit switch actuating cam member 25 fixed in position in the upper outer peripheral region of the output shaft 8 through an annular spring member 43 having a resilient force energized in the radial direction, a limit switch (valve opening-detecting member) 21 disposed above the gear speed reducing mechanism 7 and a manual operation mechanism 44.

In the present embodiment, therefore, the motive power transmitting mechanism during the course of the electric operation (conducting period) comprises a gear unit including the inner gearing planet gear speed reducing mechanism 7 laid out till the turning force from the electric motor 3 is transmitted to the output shaft 8.

The construction of the gear speed reducing mechanism has been already described in detail in the preceding first aspect of the invention and the explanation thereof will be omitted here.

In the upper (controlling shaft 23) outer peripheral region of the output shaft 8, the limit switch actuating cam member 25 is disposed as attached through the annular spring member 43 having a resilient force energized in the radial direction (in the direction of the outside diameter in the present embodiment).

The cam member 25 is provided in the inner peripheral region thereof with a circumferential groove 25a formed in the circumferential direction and the aforementioned annular spring member 43 is imposed in the circumferential groove 25a.

Figure 17:
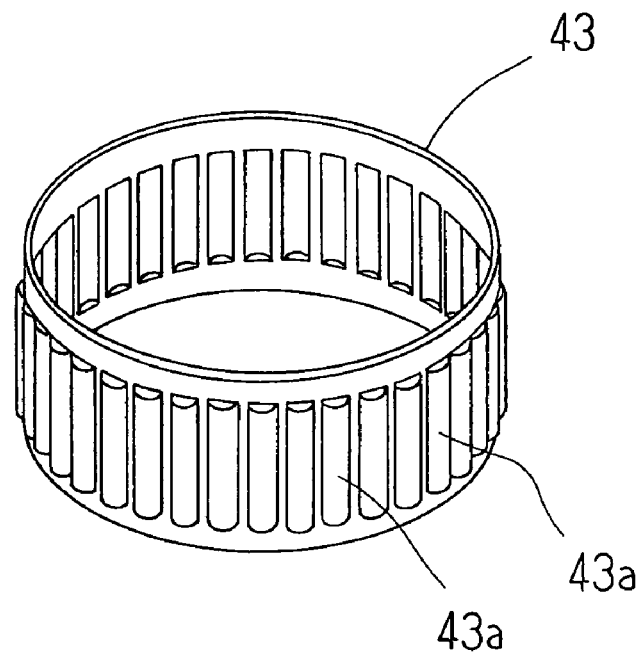
FIG. 17 is a perspective view of an annular spring member.
Figure 18:
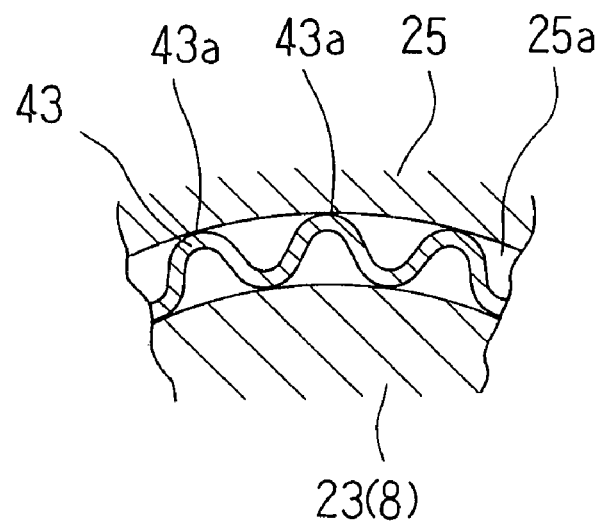
FIG. 18 is a partially magnified plan cross section illustrating an annular spring member in the fixed state.
Figure 19:
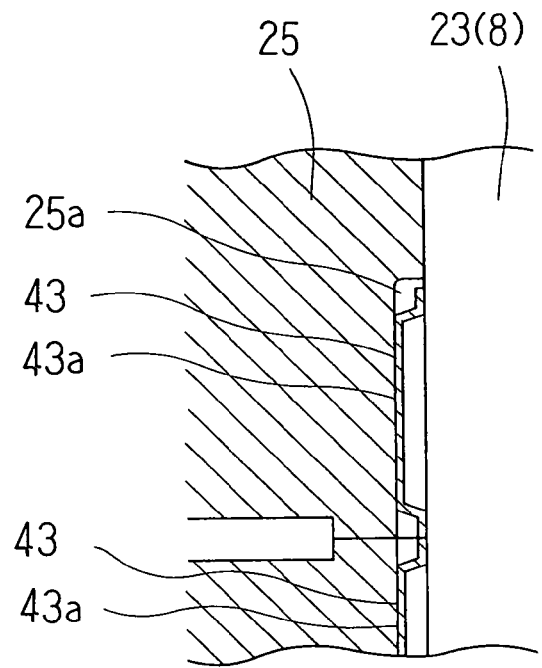
FIG. 19 is a partially magnified front cross section illustrating an annular spring member in the fixed state.

The annular spring member 43 is produced by press-working a thin-wall ribbon plate made of stainless steel (material for a spring) in a corrugated cross section and bending the worked plate in an annular shape as shown in FIG. 17 and FIG. 18. It is enabled to generate resilient force by causing the regularly spaced waves of the corrugated shape to be deformed in the radial direction. When the annular spring member 43 is disposed as interposed between the controlling shaft 23 (output shaft 8) and the cam member 25 as shown in FIG. 18 and FIG. 19, the annular spring member 43 is enabled to exert the resilient force (fixing force) in the radial direction on the controlling shaft 23 (output shaft 8) and on the cam member 25 in conformity with the amount of deformation in the radial direction and, at the same time, the cam member 25 is enabled to be fixed as energized in the concentric state to the controlling shaft 23 (output shaft 8).

The resilient force (fixing force) in the radial direction is proportional to the amount of protrusion of the annular spring member 43 in the radial direction in the corrugated shape 43a. It is, therefore, commendable to choose the annular spring member 43 having an amount of protrusion capable of securing such a resilient force in the radiant direction as retaining the fitted state at the output torque in the prescribed range and not retaining the fitted state at the excessive torque and paying due consideration to the depth of the circumferential groove 25a allowing insertion of the annular spring member 43 therein.

The annular spring member 43 is possessed of the function of not retaining the fixed state at the excessive torque, namely the function of a torque limiter. Thus, the annular spring member 43 is so constructed that the relative slippage infallibly occurs on the inner peripheral surface of the annular spring member 43 and on the bottom surface of the circumferential groove 25a during the occurrence of an excessive torque.

In the present embodiment, the annular spring member 43 having waves 43a protrude at equal intervals from the outer peripheral surface thereof is used, though not exclusively. Instead, an annular spring member (not shown) which is enabled to emit resilient force energized in the radiant direction (the direction of the inside diameter) by having waves 43a protrude at equal intervals from the inner peripheral surface may be used.

Further, in the present embodiment, the circumferential groove 25a is formed in the circumferential direction in the inner circumferential region of the cam member 25, though not exclusively. Instead, a circumferential groove (not shown) may be formed in the circumferential direction in the outer peripheral region of the control shaft 23 (the output shaft 8) and the annular spring member 43 may be imposed in the circumferential groove.

In another embodiment, a positioning function necessary during the adjustment of the angle of the cam member 25 may be obtained by forming a plurality of angle adjusting grooves (not shown) in the circumferential direction in the outer peripheral region of the controlling shaft 23 (output shaft 8) and, at the same time, forming projecting parts (not shown) fitting the angle adjusting grooves at proper positions in the inner peripheral region of the annular spring member 43.

Figure 20:
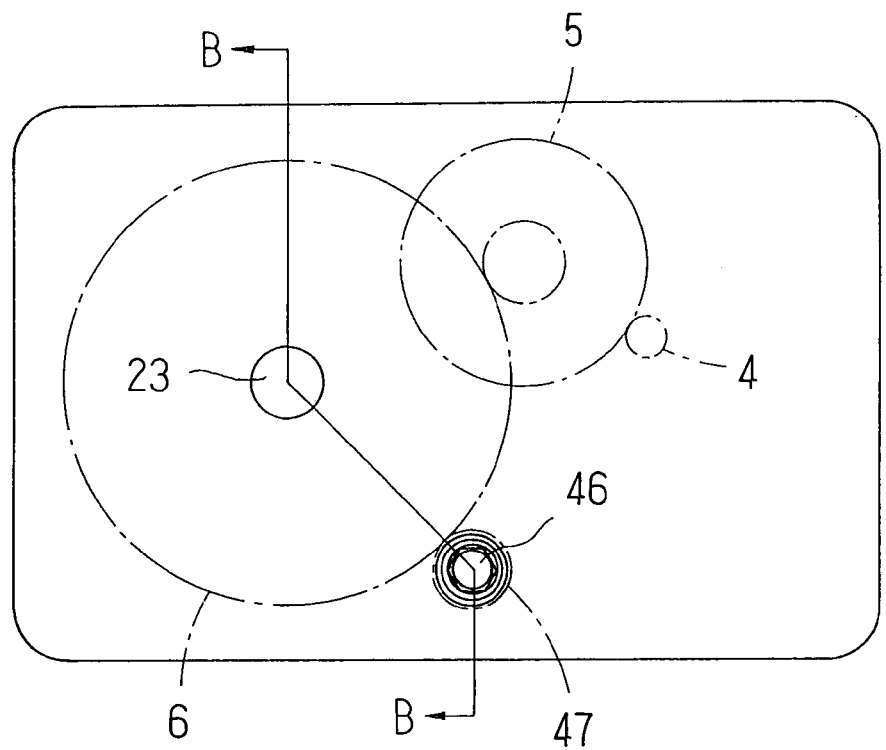
FIG. 20 is a partially omitted schematic plan view of FIG. 1.
Figure 21:
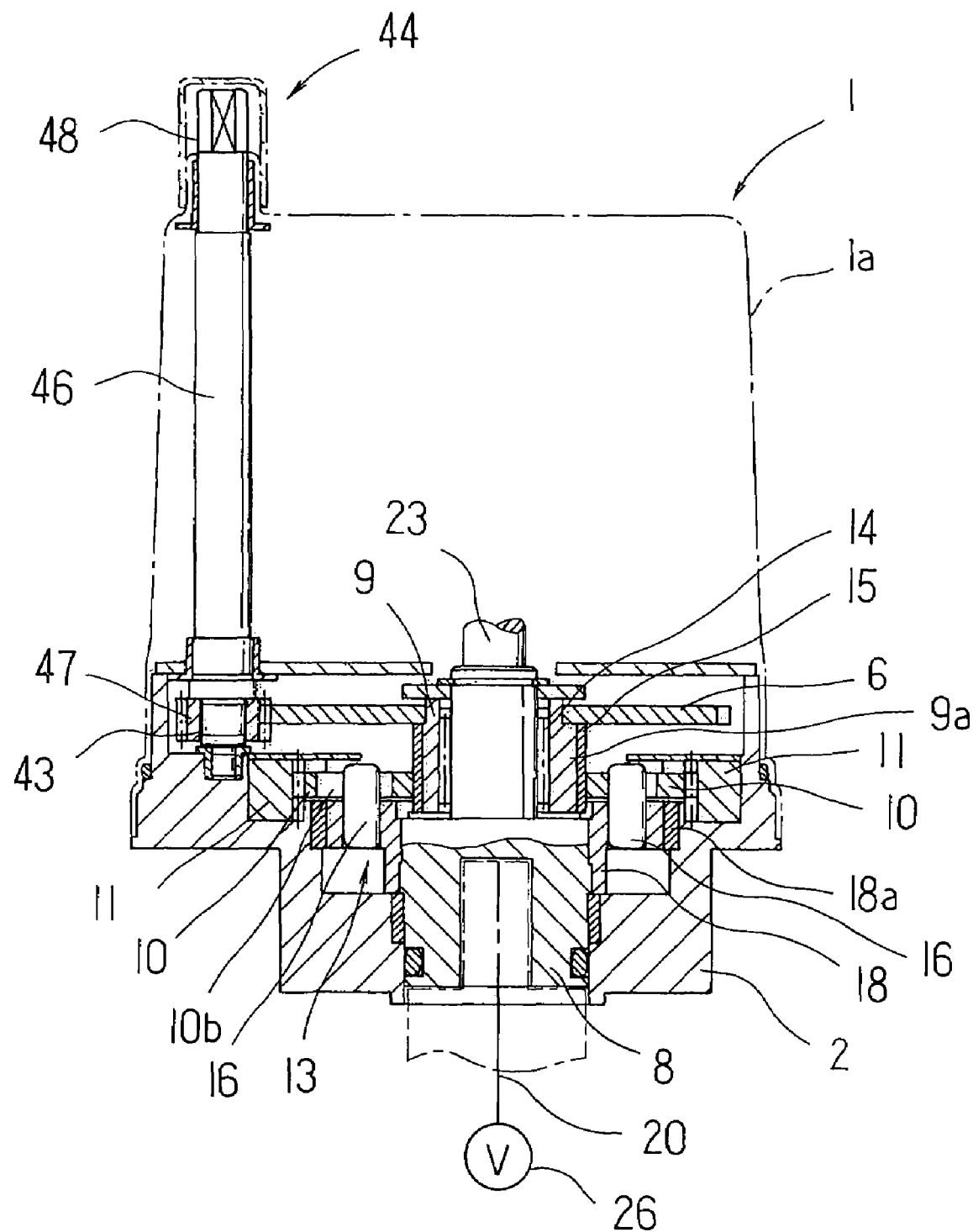
FIG. 21 is a cross section taken through FIG. 20 along line B—B.

FIG. 20 is a schematic plan view partly omitting FIG. 1 and FIG. 21 is a cross section taken through FIG. 20 along line B—B.

In the present embodiment, the annular spring member 43 is disposed as interposed between the intermediate gear 5 meshed with the pinion gear 4 disposed on the driving shaft of the motor 3 and the motive power transmitting shaft 45 allowing the intermediate gear 5 to be attached thereto as shown in FIG. 1 and further the annular spring member 43 is disposed as interposed between the manual operation shaft 46 forming the manual operation mechanism 44 and the manual operation transmitting gear 47 attached to the manual operation shaft 46 as shown in FIG. 21.

By interposing the annular spring member 43 between the inlet side of the motive power transmitting mechanism, namely the gear of a small transmission torque, and the shaft, it is made possible to acquire the torque limiter function while the diameter of the annular spring member is decreased and the size of the actuator is reduced, to permit easy adjustment of the fabricating tolerance of the annular spring member 43 and the circumferential grooves 25*a* and to facilitate the torque control.

In the present embodiment, the annular spring member 43 is interposed between the intermediate gear 5 and the motive power transmitting shaft 45 allowing attachment of the intermediate gear 5 thereto, and the annular spring member 43 is interposed between the manual operation shaft 46 and the manual operation transmitting gear 47 attached to the manual operation shaft 46, though not exclusively. Instead, it may be disposed at a proper region of the gear unit forming the individual motive power transmitting mechanism.

The construction for subjecting the turning force from the electric motor 3 to speed reduction and transmitting the resultant turning force to the output shaft 8 has been already described in detail in the foregoing first aspect of the invention. The explanation of this construction will be omitted here.

In the outer peripheral region of the upper part (controlling shaft 23) of the output shaft 8, the cam member 25 is disposed as fitted through the annular spring member 43 having resilient force energized in the radial direction (the direction of the outside diameter in the present embodiment). When the controlling shaft 23 (output shaft 8) is rotated, the limit switch (valve opening-detecting member) 21 disposed above the gear speed reducing mechanism 7 is turned ON or OFF by the cam member 25, and the valve body 26 disposed at the leading terminal of the valve shaft 20 is made to assume a wholly opened state or a wholly closed state.

The manual operation mechanism 44, as shown in FIG. 21, comprises a manual operation part 48 disposed as projected above the actuator cover, an annual operating shaft 46 having the manual operation part 48 formed at the upper terminal part thereof and a manual operation transmitting gear 47 disposed as attached in the lower terminal outer peripheral region of the manual operation shaft 46.

During the course of the manual operation (the period of power failure), when the manual operation shaft 46 is rotated through the manual operation part 48 disposed as projected above the actuator cover, the manual operation transmitting gear 47 disposed in the lower terminal outer peripheral region of the manual operation shaft 46 through the annular spring member 43 is rotated and made to transmit the turning force to the output shaft 8 through the manual operation transmitting gear 47, and the valve shaft 20 connected to the output shaft 8 is consequently 30 rotated.

In the present embodiment, therefore, the motive power transmitting mechanism necessary during the course of the manual operation (period of power failure) is formed of a gear unit containing the manual operation mechanism 44 disposed till the turning force generated by the manual operation is transmitted to the output shaft 8.

Now, the operation of the foregoing fourth aspect of this invention will be described specifically below.

The actuator 1 of this invention for a valve causes the annular spring member 43 having resilient force energized in the radial direction to intervene between the output shaft 8 and the limit switch operating cam member 25 disposed as attached in the upper (controlling shaft 23) outer peripheral region of the output shaft 8, exerts the resilient force (fixing force) in the radial direction on the controlling shaft 23 (output shaft 8) and the cam member 23 in conformity with the amount of deformation in the radial direction of the waves 43*a* formed at equal intervals on the outer peripheral surface of the annular spring member 43, and enables the cam member to be fixed as energized in the concentric state with the controlling shaft 23 (output shaft 8) through manifestation of an automatic aligning function.

When the output torque exceeding the resilient force (fixing force) in the radial direction, namely an excessive torque, is generated, the construction infallibly produces relative slippage on the inner peripheral surface of the annular spring member 43 and the bottom surface of the circumferential groove 25*a* allowing insertion of the annular spring member 43 therein. Thus, the torque limiter function is infallibly manifested.

By causing the annular spring member 43 having the torque limiter function and the automatic aligning function to intervene between the controlling shaft 23 (output shaft 8) and the cam member 25 as described above, the cam member is enabled to enjoy accurate adjustment of angle and ease of assemblage without requiring highly advanced adjusting technique or assembling technique.

When the adjustment of angle is required, the adjustment to a necessary angle can be attained through shifting of the positions of the cam member 25 and the controlling shaft 23 (output shaft 8) with the force greater than the resilient force (fixing force) in the radial direction that is retaining them in their fixed states. As regards the work of assemblage, the accurate attachment in the outer peripheral region of the output shaft can be attained by means of the resilient force in the radial direction that has the automatic aligning function.

As another embodiment, the work of assemblage can be further facilitated by forming a plurality of angle adjusting grooves (not shown) in the circumferential direction in the outer peripheral region of the controlling shaft 23 (output shaft 8) and, at the same time, forming projecting parts (not shown) fitting the angle adjusting groove at proper position in the inner peripheral region of the annular spring member 43, thereby giving rise to a positioning function necessary during the adjustment of the angle of the cam member 25.

The annular spring member 43 absorbs the vibration peculiar to the electric motor by the resilient force energized in the radial direction. Thus, it is made possible to retain infallibly the fitted state of the cam member 25, keep the relation of relative positions of the cam member 25 and the limit switch 21 intact, and attain accurate detection of the switching position of the valve.

Further, the motive power transmitting mechanism endowed with the torque limiter function results from interposing the annular spring member 43 between the intermediate gear 5 meshed with the pinion gear 4 imposed in the driving shaft of the motor 3 and the motive power transmitting shaft 45 attached to the intermediate gear 5. When an excessive torque occurs in the gear unit containing the gear speed reducing mechanism 7 laid out till the turning force from the electric motor 3 is transmitted to the output shaft 8, therefore, the torque limiter function of the annular spring member 43 is enabled to block the excessive torque from being further transmitted.

Further, the motive power transmitting mechanism endowed with the torque limiter function results from interposing the annular spring member 43 between the manual operation shaft 46 and the manual operation transmitting gear 47 attached to the manual operation shaft 46. When the excessive torque occurs in the gear unit containing the manual operation mechanism 44 laid out till the turning force generated by the manual operation is transmitted to the output shaft 8, therefore, the torque limiter function of the annular spring member 43 is enabled to block the excessive torque from being further transmitted.

The present embodiment has been described with respect to the application thereof to the inner gearing planetary speed reducing mechanism 7. This is no exclusive application. Of course, this embodiment is applicable to an actuator that incorporates a varying kind of speed reducing mechanism.

Now, one embodiment of the actuator for valve that is contemplated by the fifth aspect of the invention will be described below. The same component parts as used in the embodiments of the first to fourth aspects of the invention will be denoted by the same reference numerals and the explanation thereof will be omitted.

In the actuator 1 of FIG. 1, reference numeral 3 denotes a rotary drive source (electric motor) which is a rotary drive source capable of a bidirectional rotation or a unidirectional rotation, and this rotary drive source 3 is fixed on the upper surface side of the base body 2 with a fixing means, such as a bolt not shown in the diagram. Then, reference numeral 4 denotes a driving shaft (pinion gear) of the rotary drive source 3, and this driving shaft 4 is meshed with the intermediate spur gear 5 and is used for the purpose of transmitting the motive power from the rotary drive source 3. The intermediate spur gear 5 is meshed with the input gear 6 disposed coaxially relative to the output shaft 8. The rotation from the rotary drive source 3 is given necessary speed reduction through the driving shaft 4 and the intermediate spur gear 5 and then fed into the input gear 6.

Reference numeral 7' denotes a speed reducing gear mechanism that serves to give necessary speed reduction to the rotation from the rotary drive source 3 and transmit the resultant rotation. In the present embodiment, this speed reducing gear mechanism 7' comprises an input gear 6 which is a main speed reducing gear part (inner gearing planetary gear speed reducing mechanism) 7, an eccentric body 9, an outer gear 10, a frame body (inner gear) 11, an output shaft 8 and an intermediate spur gear 5 meshed with the input gear 6. The eccentric body 9 is formed integrally with the input gear 6, provided in the lower part thereof with an eccentric part 9a destined to be deviated by the amount of eccentricity, e, from the axis of the output shaft 8, and disposed so as to impart eccentric rotation to the eccentric body 9 synchronously with the input gear which is rotated as synchronized with the rotation from the rotary drive source 3.

The rotary drive source 3, the speed reducing gear mechanism 7' and the output shaft 8 are imposed in the actuator cover 1a.

The speed reducing gear mechanism 7' saves space because it is adapted to assemble the speed-reducing mechanism ranging from the eccentric body 9 rotating synchronously with the rotary drive source 3 through the output shaft 8 in the vertical direction in the bearings of the diagram. It is so disposed as to vary the reduction ratio without changing the whole volume of the speed reducing gear mechanism 7'.

The construction of the main speed reducing gear part (inner gearing planetary gear speed reducing mechanism) 7 has been already described in detail in the foregoing first aspect of the invention and the explanation thereof will be omitted here.

Figure 22:
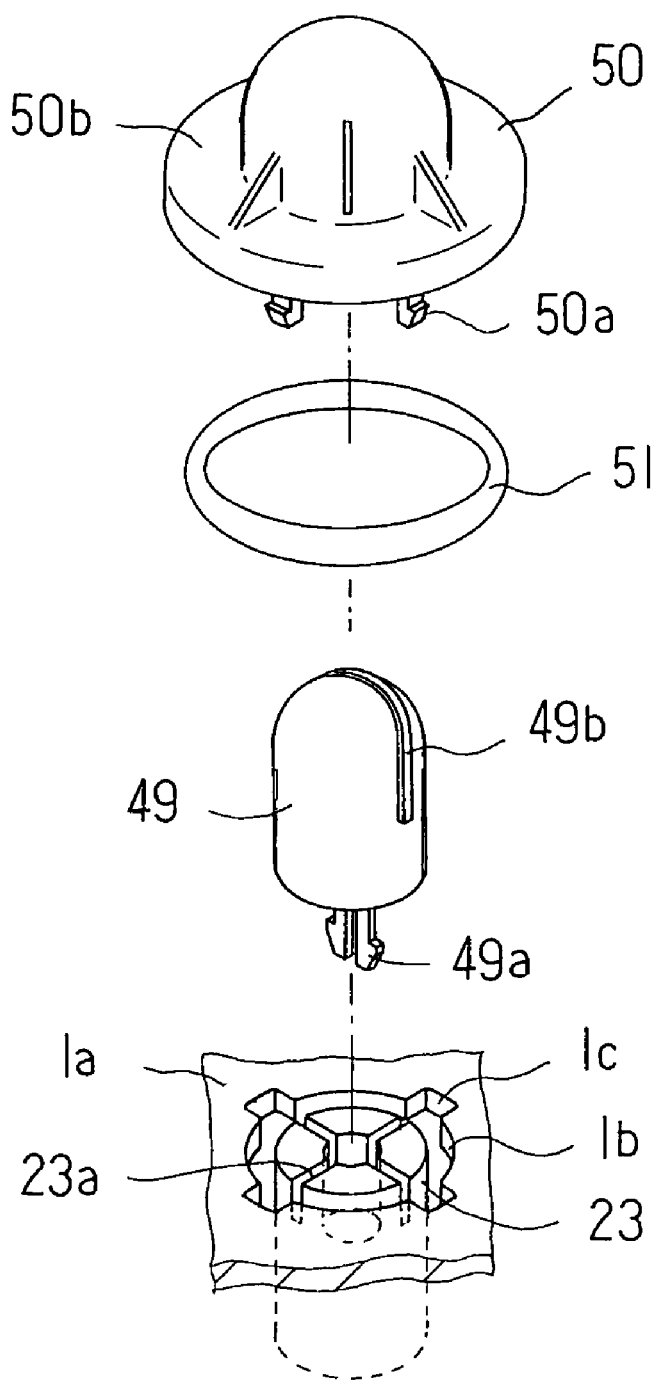
FIG. 22 is an exploded perspective view of a valve opening-indicator.

As shown in FIG. 1 and FIG. 22, reference numeral 49 denotes a valve opening-indicator made of a resin, such as ABS, and furnished with the valve opening-indicating part 49b and reference numeral 48 denotes a manual operation part provided with the speed reducing gear mechanism 7' disposed so as to be manually operated. This invention has the valve opening-indicator 49 and the manual operation part 48 disposed so as to protrude above the actuator cover and the valve opening-indicator 49 disposed at a position lower than the position of the manual operation part 48.

The valve opening-indicating part 49b is disposed above the controlling shaft 23. The controlling shaft 23 controls the detecting mechanism that conforms in position with the cam 25 disposed at the prescribed position and, therefore, is not varied in size by the output of the actuator. As a result, the valve opening-indicating part 49b has its position not varied by the output of the actuator.

Meanwhile, the manual operation part 48 is disposed above the rotary drive source 3 which has the size thereof varied by the output of the actuator.

The actuator 1 in this invention, therefore, does not need to be given any special construction for lowering the position of the valve opening-indicating part 49b below that of the manual operation part 48. The optimum layout of the valve opening-indicator 49 and the manual operation part 48 is accomplished by utilizing the shape of the actuator always assuming a position higher than the position of the valve opening-indicating part 49b even when the position of the manual operation part 48 is varied.

The valve opening-indicator 49 is disposed on the upper terminal of the controlling shaft 23 and a cross groove 23a and a raised ridge part 49a which fits the cross groove 23a are disposed respectively on the upper terminal of the controlling shaft 23 and the valve opening-indicator 49 as shown in FIG. 22 so that the valve opening-indicator 49 may be inserted in the raised ridge part 49a. The valve opening-indicator 49 can be inserted in the cross groove 23a, with the fixing direction thereof freely varied within an angle of 90°. Thus, the indicating direction of this valve opening-indicator 49 may be varied in conformity with the fitting angle of the valve to the pipe.

Figure 23:
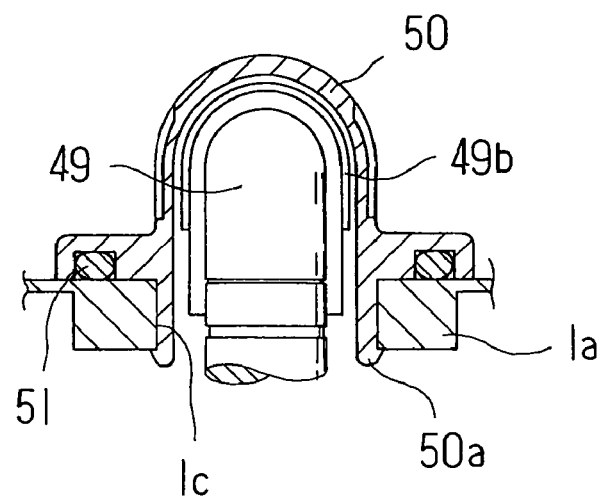
FIG. 23 is a partially magnified cross section of FIG. 1.
Figure 24:
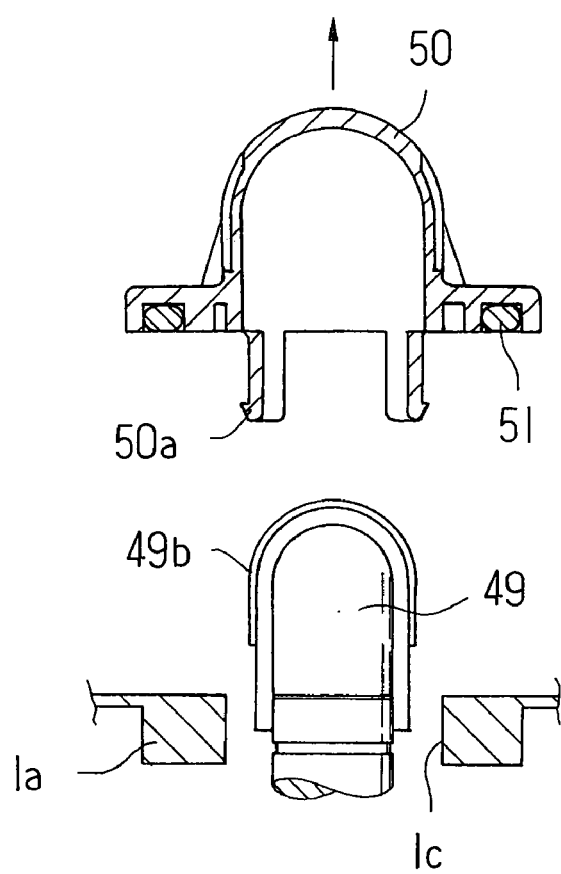
FIG. 24 is a cross section of FIG. 23 in the state divested of a valve opening-indicator cover.

Reference numeral 50 denotes a valve opening-indicator cover made of a transparent or translucent resin, such as ABS, so that the valve opening-indicator 49 may be seen through it from the outside. This valve opening-indicator cover 50, as shown in FIG. 23 and FIG. 24, can be attached from outside the actuator cover 1a.

Reference numeral 50a denotes a plurality of engaging parts disposed as projected from the lower part of the valve opening-indicator cover 50. The actuator cover 1a is provided at an inserting hole 1b thereof with an engaging groove 1c that is formed as notched at a position conforming to the position of the engaging part 50a.

Figure 25:
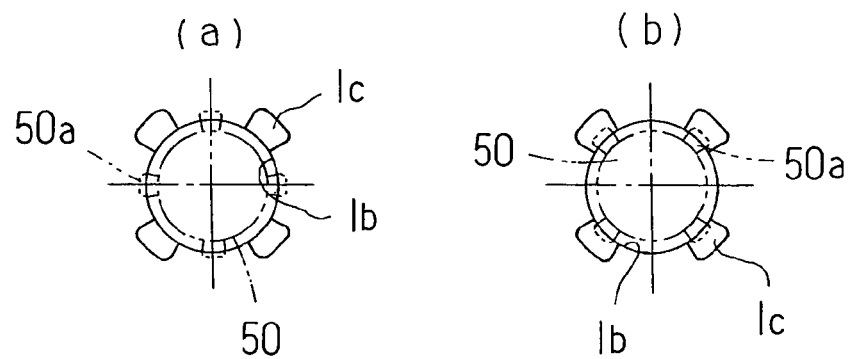
FIG. 25(*a*) or 25(*b*) is an explanatory diagram illustrating the state in which the valve opening-indicator cover is mounted.

In the case of attaching the valve opening-indicator cover 50, first the engaging part 50a of the valve opening-indicator cover 50 is directed toward the engaging hole 1b and inserted therein as shown in FIG. 25(*b*) and then the valve opening-indicator cover 50 is turned by 90° as shown in FIG. 25(*a*) so that the projected part of the engaging part 50a may be caught by the edge of the inserting hole 1b and retained in the ensuing state. Thus, the valve opening-indicator cover 50 can be inserted by one touch from above the actuator. Here, reference numeral 51 denotes an O-ring that seals the valve opening-indicator cover 50 and the actuator cover 1b.

The valve opening-indicator cover 50 is provided with a flange part 50b. This flange part 50b is formed to assume a larger size than the inserting hole 1b so that the main body of the valve opening-indicator cover 50 may not be pushed into the actuator even when the valve opening-indicator cover 50 is depressed from outside the actuator.

The manual operation mechanism 44 is provided in a manually operable manner with the main speed reducing gear part 7, namely a part in which the backlash of the speed reducing gear mechanism 7' is minimized. This manual operation mechanism is provided with the manual operation shaft 46 which protrudes outside the actuator coaxially with the rotating shaft of the intermediate gear 47 meshed with the input gear 6 so that the input gear 6 to which the rotation of reduced speed from the rotary drive source 3 is introduced through the intermediate spur gear 5 may be manually operated from the manual operation shaft 46.

Thus, the manual operation shaft 46 of the manual operation mechanism 4 constitutes a component part separated from the controlling gear 23 extended from the output shaft 8.

Incidentally, the manual operation shaft 46 may be disposed coaxially with the rotating shaft of the intermediate spur gear 5 to attain manual operation of the intermediate spur gear 5. By adopting the construction which, as found in the present example, enables the input gear 6 to be manually operated through the intermediate gear 47 as separated from the intermediate spur gear 5, the manual operation shaft 46 is enabled to be so disposed as to avoid the rotary drive source 3 and project above the actuator while the size of the actuator in the lateral direction is restrained.

The main speed reducing gear part 7 in this invention comprises a train of planet gears. The spur gear 11 that is the inner sun gear of this train of planet gears and the outer gear 10 that is the outer planet gear are meshed at an approximate range of ¼ to reduce the backlash. Further, this backlash is furnished for the purpose of correcting the ideal tooth profile capable of ideal meshing to the mesh profile actually enabling the gear to be rotated. In this invention, therefore, the outer gear 10 meshed with the inner gear 11 has the tooth profile thereof form an epitrochoid curve. This epitrochoid curve is capable of varying the tooth profile and adjusting the amount of backlash while retaining the state approximated closely to the ideal tooth profile. Thus, the outer gear 10 can retain the state of permitting transmission of the motive power and minimize the backlash.

In the case of correcting the backlash of the outer gear 10 and adjusting the amount of this backlash, the epitrochoid curves are formed as shifted in phase to the front and the rear of the curve of the outer gear so as to permit rotary displacement with a proper phase angle relative to the center of the gear of the outer gear curve which is fated to serve as an ideal. By combining these epitrpochoid curves, a new tooth profile is created.

At this time, the portion preceding the points at which the outer gear curve destined to serve as an ideal and the epitrochoid curves disposed before and after the outer gear curve intersect has substantially no influence on the transmission of the load during the rotation of the gear. In the case of combining these epitrochoid curves, the ridges and the gulches preceding the portions of intersection of the epitrochoid curves shifted in phase from the outer gear curve destined to for an ideal may be joined with proper smooth curves.

The new curves resulting from correcting the backlash as described above can be utilized as actual gear curves for the outer gears so as to vary properly the backlash and adjust it to the least possible backlash.

A ring 43 is interposed between the manual operation shaft 46 and the intermediate gear 47 and this ring 43 has the peripheral surface thereof form a wavy shape 43*a* manifesting springiness in the centripetal direction. Consequently, the transmission of torque from the manual operation shaft 46 to the input gear 6 can be infallibly effected, with the intermediate gear 47 depressed and pivotally supported as well.

Further, during the manual operation of the manual operation shaft 46, the ring 43 can be made to rotate idly relative to the intermediate gear 47 or the manual operation shaft 46 and prevented from exerting an operating torque any longer on the valve stem 20 when the input gear 6 rotates and completes the action of bringing the valve body 26 to an opened state or a closed state. Incidentally, reference numeral 46*a* denotes a cap for protecting the operating part of the manual operation shaft 46.

Now, the operation of the speed reducing gear mechanism 7' will be described in detail below.

During the operation of opening and closing the valve, when the rotation from the rotary drive source 3 is transmitted to the input gear 6 through the driving shaft 4 and the intermediate gear 5, the eccentric body 9 that is integral with the input gear 6 is rotated.

When the eccentric body 9 is rotated, the eccentric part 9*a* is eccentrically rotated and the eccentric rotation is transferred to the outer gear 10 through the bearing 15, with the result that the outer gear 10 will start eccentric rotation.

The outer gear 10 is caused, by the rotation of the eccentric body 9, to revolve at a high speed around the axis of the output shaft 8 as the center and, at the same time, tend to rotate at a low speed. This rotation, however, is regulated by the combination of the outer gear 10 and the inner gear 11 meshed therewith. The outer gear 10 produces a vibrating rotation apparently inscribing the inner gear 11 and extracts the speed-reduced component of rotation of the outer gear 10 and transmits this rotation to the output side. The amount of eccentricity of the outer gear 10 relative to the output shaft 8 is $2e$.

When the outer gear 10 produces a vibrating rotation, the inner pin 16 subsequently tends to roll inside the inner pinhole 10*b* that is formed at a distance equivalent to a difference, e, of axial direction. Thus, the output shaft 8 is enabled to rotate at a reduced speed by causing the rotation of the outer gear 10 to be transmitted to the output shaft 8 interlocked with the outer gear 10 through the inner pin 16.

Figure 4:
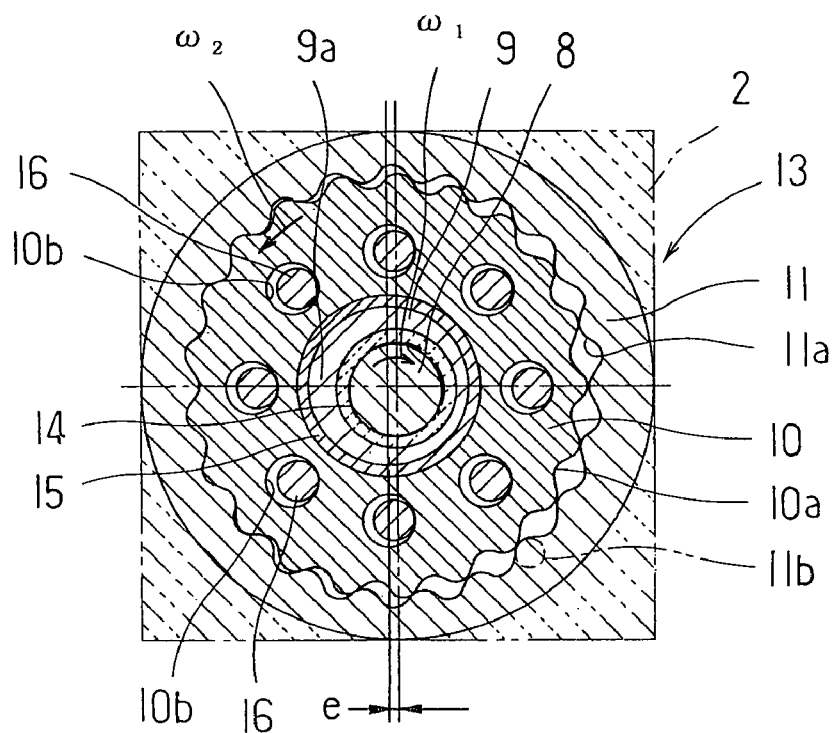
FIG. 4 is a cross section taken through FIG. 1 along line A—A

In FIG. 4, let $\omega_1$ stand for the angular speed of the input gear 6, $\omega_2$ for the angular speed of the outer gear 10, $z_a$ for the number of teeth of the outer gear 10 and $z_b$ for the number of teeth of the inner gear 11 which exist when the rotation having the speed thereof reduced by the vibrating rotation of the outer gear 10 centering around the output shaft 8 verges on emission, and the angular speed ratio $\omega_2/\omega_1$ will be $1-z_b/z_a$ and consequently the angular speed ratio $\omega_2/\omega_1$ will be $-(z_b-z_a)/z_a$.

Here, when the difference, $z_{b-z_a}$, is assumed to be 1 (the difference of numbers of teeth 1), then the angular speed ratio $\omega_2/\omega_1$ will be $-1/z_a$. Thus, the direction of rotation can be reversed and the reduction ratio can be maximized when the difference of numbers of teeth of the outer gear 10 and the inner gear 11 is set at 1.

As a result, by combining the numbers of teeth of the outer gear 10 and the inner gear 11 and adjusting the component of rotation of the outer gear 10, the rotation from the output shaft 8 can be emitted at an expected reduction ratio.

It is permissible to select properly the amount of eccentricity, e, of the eccentric body 9 or the surface roughness of the outer gear 10 and the inner gear tooth 11*a*. In this case, when the speed reducing gear mechanism 7' has substantially one and same volume, the torque thereof may be varied.

In the present embodiment, the number of outer gear 10 is assumed to be a singular. When this number is a plural, the individual eccentric bodies 9 are fixed in such directions that the directions of eccentricity, e in magnitude, may be opposed to the output shaft 8, and the outer gear 10 is so disposed as to be interlocked to these eccentric bodies 9. Consequently, the balance of the transmission of the motive power is enhanced because the individual outer gears 10 and the frame body 11 are meshed at once at a plurality of points so as to enlarge the power of transmission and, particularly when two outer gears 10 are employed, the combinations by meshing of the outer gears 10 and the frame body 11 are allowed to be located at the positions of symmetry across a point around the output shaft 8 as the center.

The frame body 11 constitutes the inner gear that is provided in the inner peripheral side thereof with the inner gear tooth 11a meshed with the outer gear 10. This is no exclusive requirement. This construction is only required to be capable of extracting the component of rotation of the outer gear 10 in combination with the epitrochoid curve of the outer gear 10 when the input gear 6 is rotated. For example, the construction may be manufactured by causing the outer pin 11b of the shape of a roller having a roughly identical curve with part of the inner gear tooth 11a indicated with a two-dot chain line in FIG. 4 to be rotatably disposed in the frame body 11 and allowing this outer pin 11b to be engaged with the outer gear 10.

Now, the operation of the foregoing fifth aspect of this invention will be specifically described below.

The actuator 1 of this invention for a valve which is provided with the manual operation mechanism is an actuator for a valve which is furnished with the speed reducing gear mechanism 7' and the output shaft 8 capable of emitting the rotation from the speed reducing gear mechanism 7' and is adapted to open and close by rotation the valve body 26 through the output shaft 8 and the valve steam 20. Since it has the manual operation shaft 46 for manually operating the valve body 26 and the valve opening-indicator 49 interlocked to the manual operation shaft 46 disposed as projected above the actuator cover, it is made possible to vary the dimensions of the manual operation shaft 46 separately of the output shaft 8 and obviate the necessity of varying the axial diameter of the manual operation shaft 46 in response to the difference of the output of the actuator and also obviate the necessity of varying the layout of the valve opening detecting mechanism.

As a result, the actuator does not suffer an addition to the size thereof because the whole dimensions of the actuator possibly stands in need of a change.

Moreover, since the speed reducing gear mechanism 7' is furnished with the manual operation shaft 46 which is manufactured by causing the intermediate gear 47 to be meshed with the input gear 6 and extending the rotating shaft of the intermediate gear 47, it can be operated both electrically and manually without requiring the speed reducing gear mechanism 7' to incorporate therein a switching mechanism for switching an electrical operation and a manual operation and can be used for a long time without inducing concentration of the torque load.

Since the manual operation shaft 46 and the valve opening-indicator 49 are separately disposed as projected from the actuator cover 1a and the valve opening-indicator 49 is fixed at a lower position than the manual operation part of the manual operation shaft 46, the efficiency of the manual operation is at an advantage in enabling the state of opening of the valve opening-indicator 49 to be visually recognized in all conceivable directions and the valve opening-indicator 49 does not obstruct the rotation with a wrench, for example, of the manual operation shaft during the course of the manual operation.

Since the degree of opening can be accurately indicated by minimizing the backlash and suppressing the influence of the accuracy of the rotation to the minimum during the manual operation and further since the input gear 6 which forms the first input side of the speed reducing gear mechanism 7' from the rotary drive source 3 is operated by rotation, the operation is enabled to be effected easily without incurring an addition to the operating torque.

By adopting two or more outer gears 10, it is made possible to decrease the backlash of the speed reducing gear mechanism 7', exalt the accuracy of indication of the degree of opening, and further enhance the accuracy of the switching operation of the valve body.

In addition to the preceding first through fifth aspects of this invention, the actuator 1 of this invention for a valve is enabled, by the speed reducing gear mechanism 7' comprising an input gear 6, an eccentric body 9, an outer gear 10, a frame body 11, an output shaft 8 and an intermediate gear meshed with the input gear 6, to convert the rotation from the rotary drive source 3 into an eccentric rotation and transmit the eccentric rotation to the outer gear 10 and impart a vibrating rotation to the outer gear 10, transmit the component of rotation of the outer gear 10 from the output shaft 8 to the valve body 26 through the valve stem 20 and set the valve body 26 in a freely rotating state, and cause the valve body 26 to be retained in the degree of intermediate opening by the position retaining function of the eccentric moment. Thus, the valve stem 20 has no possibility of producing a reversed rotation even when the fluid pressure is exerted on the valve body 26 in the ensuing state.

The actuator of this invention for a valve, therefore, is enabled to reduce the speed of the turning power from the rotary drive source with the speed reducing gear mechanism 7' of one form and manifest the reverse rotation preventing function sufficiently, contain this speed reducing gear mechanism 7' in the actuator and adopt the actuator for common use by the ball valve and the butterfly valve, and allow a great cut of the cost.

The speed reducing gear mechanism 7', when placed in the casing 2, can be contained in one and the same volume. Even when a plurality of rotary drive sources 3 having varied outputs are adopted, the speed reduction can be adjusted to a necessary reduction ratio by varying the numbers of teeth of the outer gear 10 and the frame body 11a to be combined without requiring to change the design regarding the combination of gears and the layout of individual gears and suffering the number of gears to increase, the inner construction of the train of reducing gears to grow in complexity and the actuator to gain in size even when the valve is large.

Further, the torque can be transmitted without varying the diameter of the output shaft.

Since the depth of meshing of the gears can be increased by enlarging the amount of eccentricity, e, of the outer gears 10 and since the mutual contact resistance of the gears can be increased by adding to the surface roughness of the gears, it is made possible to cope with different output shafts by making these variations and consequently varying the magnitude of torque to be transmitted and, at the same time, further exalt the reverse rotation preventing function by increasing the eccentric moment.

Incidentally, at this time, by adopting two outer gears 10, it is made possible to transmit the turning power smoothly even when the depth of meshing is increased.

When two or more outer gears 10 are adopted, it is made possible to lessen the backlash and exalt the efficiency of positioning control, heighten the accuracy of the switching motion of the valve body and enhancing the sealability.

Figure 26:
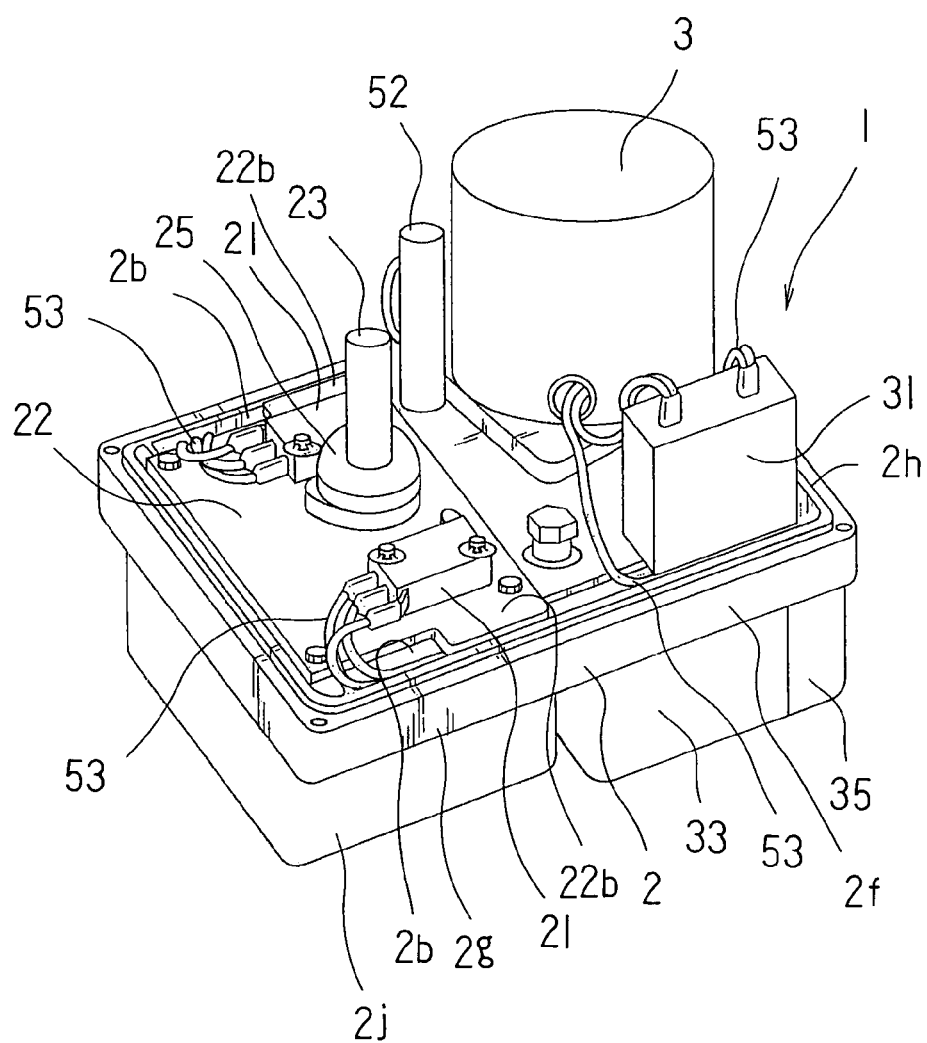
FIG. 26 is a perspective view of an actuator for a valve contemplated by this invention.

The electric cable-containing groove 2b can be integrally molded through casting in the peripheral region of the base body 2 as shown in FIG. 26 and FIG. 27.

Figure 28:
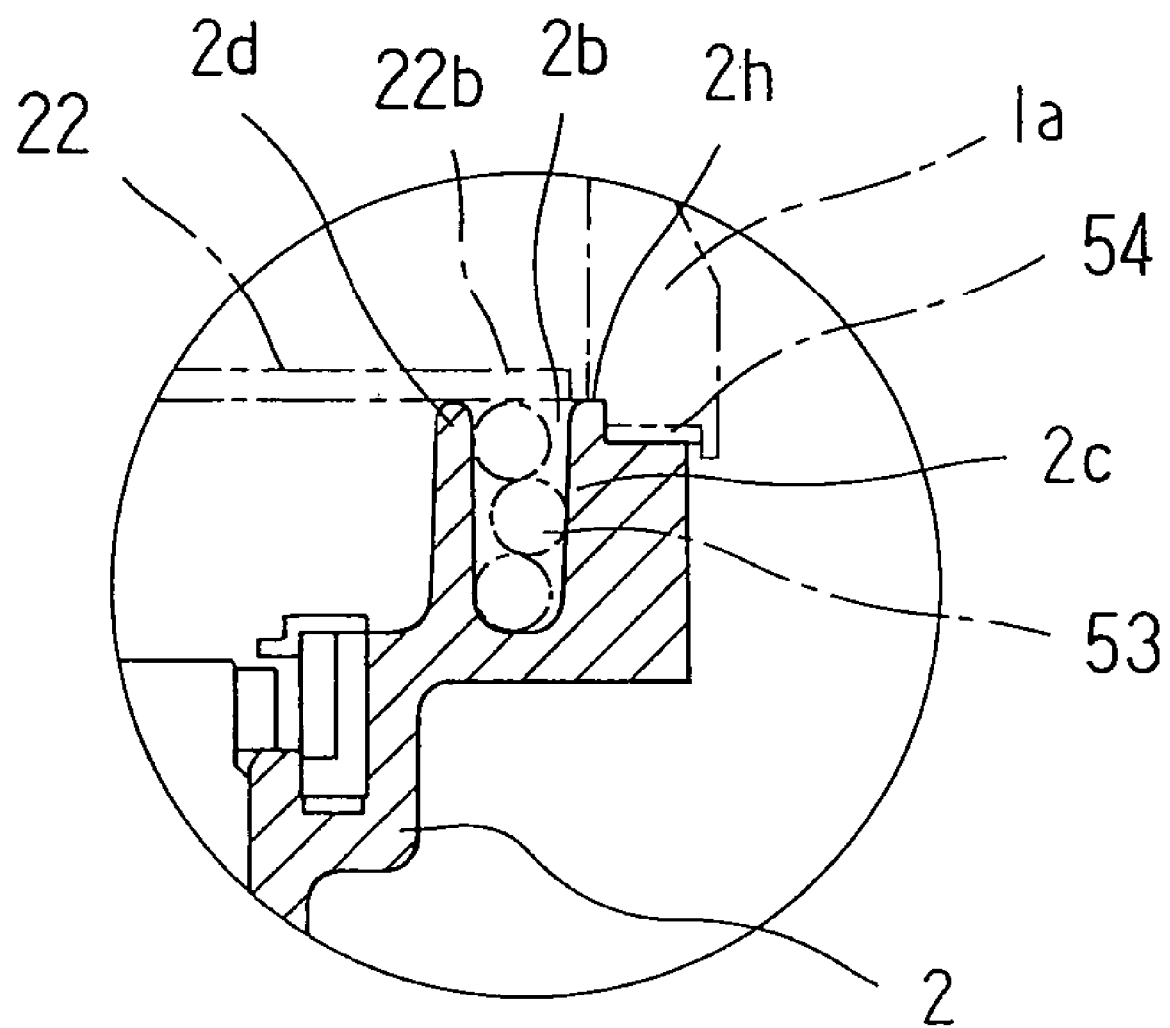
FIG. 28 is a partial cross section illustrating wire-containing grooves formed in the base body.

In the present embodiment, the electric cable-containing groove 2b is formed, as shown in FIG. 28, of an outer frame. 2c of the base body 2 and an erect wall 2d extended inwardly from the outer frame 2c. The electric cable-containing groove 2b contains the electric cables that are connected to electric parts, such as an electric motor 3, a limit switch 21, a condenser 31 and a space heater 52. Part of these electric cables 53 are sent through the electric cable outlet 2c formed in the base body 2 and connected to the terminal base 32 in the terminal box 33 forming the lower surface of the base body 2 and communicating with the electric cable outlet 2c.

Figure 29:
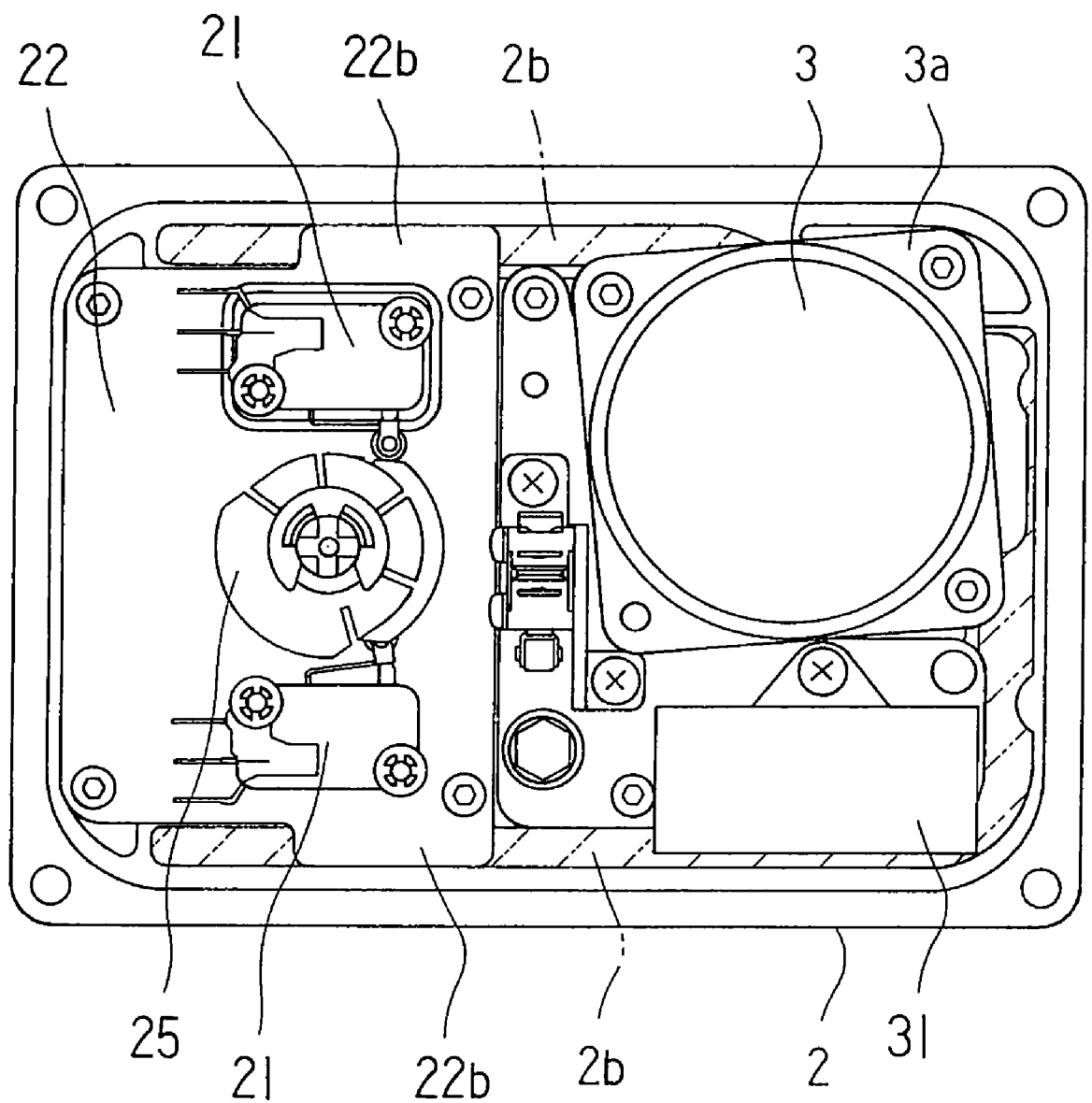
FIG. 29 is a plan view illustrating the state in which an electric motor, a limit switch, a condenser, etc. are distributed on the base body.

The electric cable-containing groove 2b, as shown in the diagram, is disposed as opened in the direction of installing electric parts, such as an electric motor, a limit switch 21, a condenser 31 and a space heater 52, namely on the upper side of the actuator 1. In FIG. 27 and FIG. 29, the bottom part of the electric cable-containing groove 2b is delineated with a two-dot oblique line for the purpose of clearly showing the region in which the electric cable-containing groove 2b is formed.

Thus, the electric cable-containing groove 2b is formed of a first space which is enclosed with a wall part of a closed loop comprising an outer frame 2c and an erect wall 2d and a bottom part furnished with the electric cable outlet 2e.

The electric cable-containing groove 2b, as illustrated in the diagram, is laid in a row starting from the electric cable outlet 2e, advancing through the peripheral region 2f of the base body 2 lying in the fitting region of the electric motor 3 and the terminal box 33, and terminating in the peripheral region 2g of the base body 2 lying in the containing region of the inner gearing planet gear speed reducing mechanism 7, with the terminal part reaching the side of the electric cable connecting part of the limit switch 21.

Incidentally, the base body 2 is provided, as shown in FIG. 28, in the periphery thereof with a ridged part 2h for retaining a fixed margin for the insertion of the actuator cover 1a and the depression of a gasket 54 interposed between the base body 2 and the actuator cover 1a.

Then, the width and the depth of the electric cable-containing groove 2b are fixed by the number of electric parts imposed in the base body 2, the number of the electric cables 53 connected to the electric parts and the thickness of the electric cables 53. They are given the smallest possible sizes with the object of permitting miniaturization of the actuator 1.

The aforementioned erect walls 2d are provided, as shown in FIG. 7, at varying positions thereof with bolt seats 2i for fixing mounting members, such as the electric motor fitting plate 3a and the condenser 31. The erect wall 2d has the reinforcing function as a rib for the bolt seat 2i.

Part of the erect wall 2d which is located near the electric cable outlet 2e, as shown in the diagram, manifests a function as a wall for preventing oils, such as the grease lubricating the gears, from being scattered. Oils, such as grease, are prevented from flowing from the electric cable outlet 2e into the terminal box 33.

That is, the second space enclosed with the other wall part of a closed loop formed of the outer frame 2c and the erect wall 2d and the bottom part for containing the speed reducing mechanism serves the purpose of preventing the grease in the speed reducing mechanism from flowing out of the electric cable outlet 2e into the terminal box 33.

Further, the erect wall 2d excluding the region that manifests the function as the scatter preventing wall is furnished with a notched part not shown in the diagram. By passing the electric cable 53 through the notched part and then containing it in the electric cable-containing groove 2b, it is made possible to retain the electric cable fast in position.

In the present embodiment, the electric cable-containing groove 2b is integrally formed in the peripheral region of the base body 2. The electric cable-containing groove 2b may be disposed at a proper position, depending on the position for laying the electric cable 53 and other working conditions.

Incidentally, in the present embodiment, the base body 2 is formed by die-casting aluminum. It may be made of a resin and then furnished with the electric cable-containing groove 2b that is formed by injection molding. While the electric cable-containing groove may be formed separately of the base body, it is preferably formed integrally from the viewpoint of the moldability and the decrease of the number of component parts.

Part of the mounting members, such as the electric motor fitting plate 3a and the condenser 31, which are disposed on the base body 2 are so disposed as to cover partly the upper surface of the electric cable-containing groove 2b as shown in FIG. 29. They serve the purpose of preventing the electric cable 53 contained in the electric cable-containing groove 2b from floating up.

The term "mounting members" as used herein means electric parts, such as the electric motor 3, the limit switch 21, the condenser 31 and the space heater 52 or the fitting plates integrally furnished for these electric parts.

Then, the fitting plate 22 (40) for supporting the valve opening-detecting member, such as a limit switch, which is anchored to the base body 2 is furnished with the extended parts 22b and 22b which are formed as projected on the side thereof as shown in the diagram. These extended parts 22b and 22b cover the upper surface of the electric cable-containing groove 2b and prevent the electric cable 53 contained in the electric cable-containing groove 2b from flowing up. The supporting plate 39 may be furnished with extended parts 39a and 39a as shown in the diagram.

As described above, the actuator 1 of this invention for a valve is enabled, by having the base body 2 furnished in the peripheral region thereof with the electric cable-containing groove 2b which is integrally formed by casting and containing the electric cable 53 connected to the electric parts, such as the electric motor 3, the limit switch 21, the condenser 31 and the space heater 52, in the electric cable-containing groove 2b, to prevent the electric cable 53 from being broken by the vibration peculiar to the electric motor 3, shun the possibility of contacting the rotating parts (such as the gears and the cams), and keep the electric cable 53 from being engulfed and broken.

Further, since the electric cable 53 is contained in the electric cable-containing groove 2b and, therefore, prevented from being distributed in various directions, the space inside the actuator 1 can be effectively utilized.

Since the necessity of using filler, such as silicone, with the object of precluding breakage of the electric cable is therefore obviated, it is made possible to avoid the possibility of the actuator inducing a malfunction due to defective contact caused by the gas of an insulating substance emitted from the filler, simplify the process of production and permit a cut of the cost.

Since the electric cable-containing groove 2b is disposed as opened on the upper side of the actuator, the mounting members, such as the electric motor fitting plate 3a, the limit switch 21 and the condenser 31, when imposed on the base body 2, are enabled to be lowered from above the actuator 1 and smoothly contained in the electric cable-containing groove 2b at the same time that the work of imposing the mounting members is carried out and the work of assembling the actuator 1 is enabled to be performed efficiently.

Further, since the outer frame 2c and the erect wall 2d form an integral wall part of a closed loop, the production of the erect wall 2d by casting or injection molding enjoys good formability.

The actuator 1 in the present embodiment is enabled, by causing the electric motor 3 to be disposed at a position displaced from the output shaft 8, to miniaturize the whole of the actuator 1 because the valve opening-detecting member, such as a limit switch, can be disposed above the inner gearing planet gear speed reducing mechanism 7 that is disposed coaxially with the output shaft and, at the same time, the terminal box 33 can be disposed as attached to the lower side of the base body 2 that is located below the electric motor 3.

Further, since the actuator 1 is fixed to the valve (not shown) with the valve-connecting part 2j which is located below the gear speed reducing mechanism 7, the base body 2 is exposed to the bending moment produced by the weight of the electric motor 3 or the terminal box 33 toward the downside of the actuator 1 and further exposed to the twisting moment produced by the rotation of the electric motor 3 or the gear toward the lateral side of the actuator 1.

Since this invention contemplates disposing the electric cable-containing groove 2b and particularly the erect wall 2d in the peripheral region of the base body 2 in the fitting zone for the electric motor 3 and the terminal box 33 and in the peripheral region of the base body in the containing zone for the gear speed reducing mechanism 7, the erect wall 2d functions as a beam, the base body 2 gains in stiffness, and the actuator 1 enjoys an enhanced strength.

Further, since the electric cable-containing groove 2b is extended to the side of the electric cable-connecting part of the limit switch 21, it is made possible to prevent the electric cable 53 connected to the limit switch 21 from being vibrated.

The electric cable 53 contained in the electric cable-containing groove 2b is prevented from floating up by causing part of the mounting members, such as the fitting plate 3s for the electric motor 3 and the condenser 31, to be deposited so as to cover the upper surface of the electric cable-containing groove 2b. Thus, there is no need of disposing a cover anew for preventing the floating.

The electric cable 53 contained in the electric cable-containing groove 2b may be otherwise prevented from floating up by furnishing the fitting plate for supporting the limit switch 21 with extended parts 22b and 22b and disposing these extended parts 22b and 22b in such a manner as to cover the upper surface of the electric cable-containing groove 2b.

Since at least part of the erect wall 2d located in the neighborhood of the electric cable outlet 2e manifests the function as a wall for preventing the grease lubricating the gear from being scattered and, at the same time, prevents the oil, such as grease, from flowing out of the electric cable outlet 1e into the terminal box 33, problems, such as defective contact and short circuit, which are caused by the adhesion of the grease to the current-carrying part, such as the terminal base 32, incorporated in the terminal box 33 are precluded.

Incidentally, the cam member 25 shown in FIG. 29 enables adjustment of the position of the cam by inserting the tip of a screwdriver into the groove part furnished for the cam member 25.

In addition to the preceding aspects of the invention, the actuator of this invention for a valve is capable of having the following functions.

Figure 30:
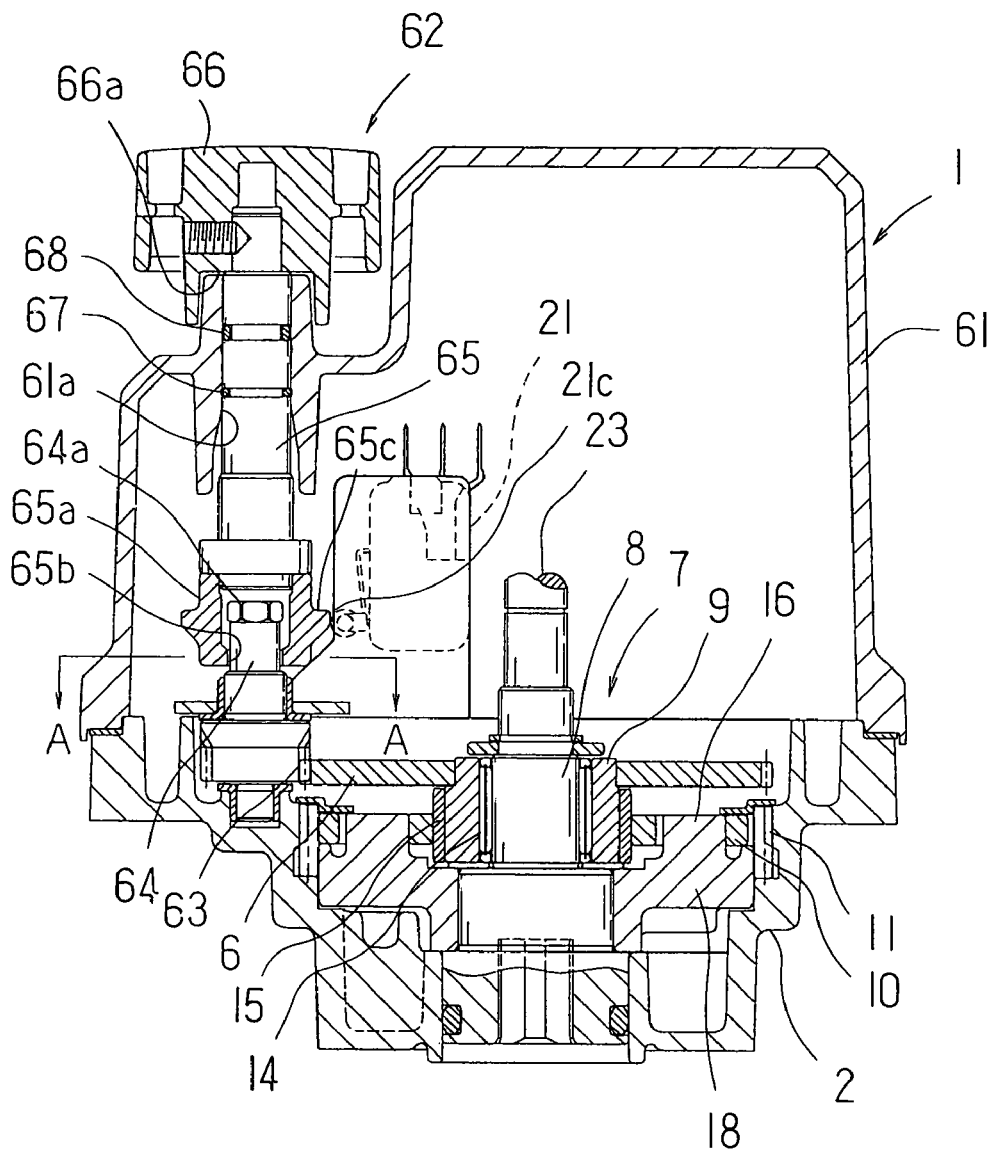
FIG. 30 is a cross section of an actuator for a valve contemplated by this invention as posed during the electric operation.

The manual operation mechanism 62 comprises, as shown in FIG. 30, a manual basic shaft 64 furnished with a gear part 63 meshed with the input gear 6, a manual operation shaft 65 supported vertically movably by an inserting hole 61a formed in the actuator cover 61, and a manual operation part 6 disposed on the upper terminal part of the manual operation shaft 64.

An engaging part 64a hexagonal in planometric view is formed on the upper terminal part of the manual basic shaft 64 and an inserting part (inserting hole in the present example) 65b dodecagon in planometric view is formed on the lower terminal part of a cylindrical part 65a formed either integrally or separately on the underside of the manual operation shaft 65.

Figure 31:
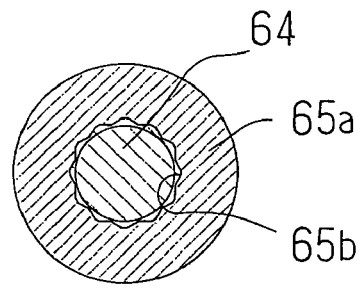
FIG. 31 is a magnified cross section taken through FIG. 30 along line A—A.

During the electric operation (automatic operation), the engaging part 44a of the manual basic shaft 64 and the inserting hole 65b of the manual operation shaft 65 are not joined by insertion, the manual basic shaft 64 is contained in the cylindrical part 65a formed in the lower part of the manual operation shaft 65, and the manual basic shaft 64 is caused to produce an idle rotation in the cylindrical part 65 by the turning power emitted from the electric motor 3 and transmitted thereto through the intermediate gear 5 and the input gear 6 as shown in FIG. 30 and FIG. 31.

Figure 32:
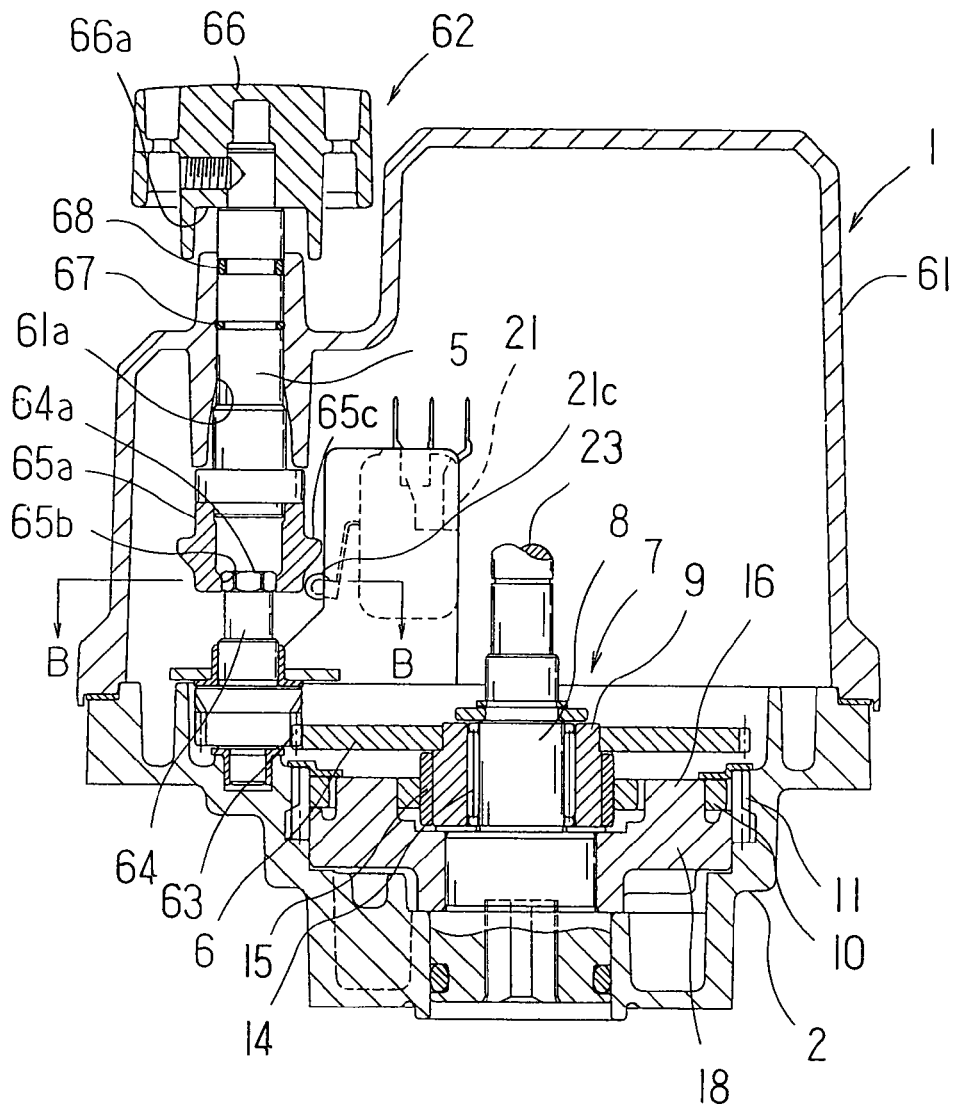
FIG. 32 is a cross section of an actuator for a valve contemplated by this invention as posed during the manual operation.
Figure 33:
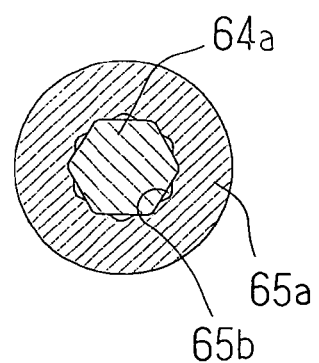
FIG. 33 is a magnified cross section taken through FIG. 32 alone line B—B.

During the manual operation, when the manual operation shaft 65 is pulled up through the manual operation part 66, the engaging part 64a of the manual basic shaft 44 and the inserting hole 65b of the manual operation shaft 65 are joined by insertion to effectuate the manual operation as shown in FIG. 32 and FIG. 33.

The present invention contemplates forming the engaging part 44a in a hexagonal shape in planometric view and the insertion hole 65b in a dodecagonal shape in planometric view. These shapes are not exclusively adopted. They are only required to have such shapes as to allow their union by insertion infallibly. In an alternative embodiment, the union by insertion may be attained through formation of an engaging part (not shown) in the manual operation shaft 65 and an inserting part (not shown) in the manual basic shaft 4.

Figure 34:
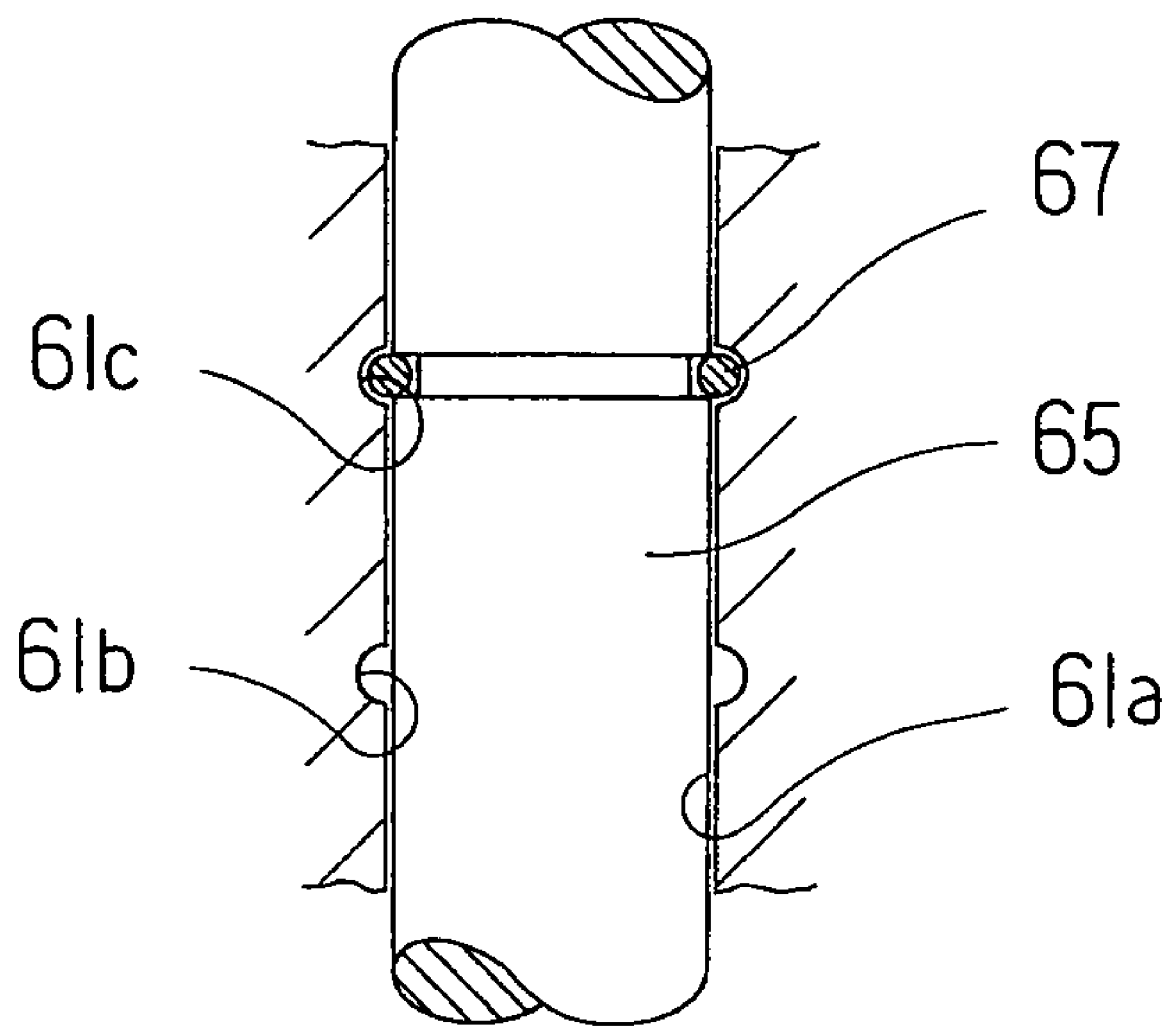
FIG. 34 is an explanatory diagram illustrating a manual operation shaft as posed in the state retaining the position.

Groove parts 61b and 61c are formed on the inner peripheral surfaces of the inserting hole 61a formed in the actuator cover 61 as shown in FIG. 34. By joining by insertion the groove part 62b and the C-shaped split ring 67, for example, in the present example that is disposed on the outer peripheral surface of the manual operation shaft 65, the manual operation shaft 65 can be retained in position during the electric operation. Then, by joining by insertion the groove part 61c and the split ring 67 disposed on the outer peripheral surface of the manual operation shaft 65, the retention of the manual operation shaft 65 is attained during the manual operation. Incidentally, reference numeral 68 denotes an O-ring.

In the actuator cover 61, the interlock switch (limit switch) 21 for imparting an ON or OFF motion to the power source (not shown) serving to supply electric power to the electric motor 3 is disposed. The interlock switch 21 is so adapted as to be actuated by the depression exerted on the operating lever 21c of the interlock switch 21 by a projected part 65c formed on the outer peripheral surface in the lower part of the manual operation shaft 65.

During the electric operation, the operating lever 21c of the interlock switch 21 is actuated by the depression exerted by the projected part 65c of the manual operation shaft 65 so as to induce supply of electric power from the power source to the electric motor 3, for example. During the manual operation, the suspension of the supply of electric power from the power source is attained through release of the depression.

Thus, the suspension of the supply of electric power is infallibly retained during the manual operation in which the projected part 65c of the manual operation shaft 65 and the operating lever 21c of the interlock switch remain in a separated state and when the actuator cover 61 remains in a detached state.

The actuator cover 61 is attached to the base body 2 through a fitting member (not shown), such as a bolt. In the case of removing the actuator cover 61, the fitting member is removed and the actuator cover is subsequently pulled up. As a result, the upper terminal region of the inserting hole 61a of the actuator cover 61 fits into the groove part 66a formed on the lower side of the manual operation part 66, the manual operation shaft 65 rises at the same time that the actuator cover 61 is pulled up, the state of union by insertion of the engaging part 64a of the manual basic shaft 64 and the inserting hole 65b of the manual operation shaft 65 is released, and the actuator cover 61, the manual operation shaft 65, and the manual operation part 66 are enabled to be removed at the same time.

Thus, during the electric operation in which the engaging part 64a of the manual basic shaft 64 and the inserting hole 65b of the manual operation shaft 65 are not joined by insertion, the engaging part 64a of the hexagonal shape in planometric view of the manual basic shaft 64 and the inserting hole 65b in the dodecagonal shape in planometric view of the manual operation shaft 65 are not joined by insertion but are brought into an engaged state. During the electric operation in which the conducting period exists, therefore, the actuator cover 61.ought not be removed.

For the purpose of joining the engaging part 64a and the inserting part 65b, therefore, the union by insertion must be implemented manually. The removal of the actuator cover 61 is not accomplished during the existence of the state of manual operation, namely the state in which the supply of electric power is suspended.

In the case of setting the actuator cover 61 in position, the inserting hole 65b of the manual operation shaft 65 having the axial center thereof retained fast by the inserting hole 61a of the actuator cover 61 and the engaging part 64a of the manual basic shaft 64 are joined by insertion and the actuator cover 61 is then attached to the base body 2 through the fitting member, such as a bolt.

The actuator 1 of this invention for a valve is furnished with the manual operation mechanism 62 which comprises a manual basic shaft 64 furnished with a gear part 64 meshed with the input gear 6 forming the gear speed reducing mechanism, a manual operation shaft 65 supported vertically movably by an insertion hole 61a formed in the actuator cover 62, and a manual operation part 66 disposed on the upper terminal part of the manual operation shaft 65. During the electric operation, the engaging part 64a of the manual basic shaft 64 and the inserting hole 65b of the manual operation shaft 65 are not joined by insertion and the manual basic shaft 64 contained in the cylindrical part 65a formed in the lower part of the manual operation shaft 65 is rotated idly in the cylindrical part 65a in consequence of the transmission of the turning power from the electric motor 3. The manual operation shaft 65 and the manual operation part 66 are not accidentally rotated because of the absence of the transmission of the turning power and, therefore, are enabled to secure the safety of operation.

In the case of performing the manual operation, when the manual operation shaft 65 is pulled up through the manual operation part 66, the projected part 65c of the manual operation shaft 65 and the operating lever 21c of the interlock switch 21 retained theretofore in the depressed state (power source on) are separated to relieve the depressed state, the supply of electric power from the power source is suspended (power source off), and at the same time, the engaging part 64a of the manual basic shaft 64 and the inserting hole 65b of the manual operation shaft 65 are joined by insertion to effectuate the manual operation, all in response to the pull.

As a result, the safety of the operation can be secured further because the switch from the power operation to the manual operation can be performed easily and further because the supply of electric power from the electric source can be infallibly suspended (power source off) as interlocked with the switch from the electric operation to the manual operation.

Since the retention of the manual operation shaft 65 in position is attained by inserting the split ring 67 disposed on the outer peripheral surface of the manual operation shaft 65 into the groove part 61c formed on the inner peripheral surface of the inserting hole 61a of the actuator cover 61, the state of union by insertion between the engaging part 64a of the manual basic shaft 64 and the inserting hole 65b of the manual operation shaft 65 is not broken accidentally.

The efficiency of the operation is good because the actuator cover 61, the manual operation shaft 65 and the manual operation part 66 can be simultaneously removed without entailing separation. Moreover, the supply of electric power from the power source is infallibly retained in the suspended state (power source off) while the actuator cover 61 remains in the removed state. Thus, the operator is enabled to perform the work of maintenance very safely without incurring electric shock.

Since the manual operation mechanism 62 is disposed separately of the output shaft 8, the necessity of changing the component members of the manual operation mechanism 62 is obviated even when the diameter of the output shaft must be changed by reason of the diameter of the valve. Since the input gear 6 is so constructed as to operate manually, it is made possible to dispose the manual operation shaft 65 as projected toward the upper side of the actuator while the increase of the size of the actuator in the lateral direction is suppressed.

INDUSTRIAL APPLICABILITY

This invention concerns an actuator to be mounted on the rotary valve, such as a ball valve or a butterfly valve. Particularly, it is directed toward an actuator so constructed as to use an electric motor as the motive power source and impart a rotation to the valve shaft of the rotary valve, such as a ball valve or a butterfly valve, through a speed reducing mechanism, which enables accurate control of the angle of the valve during an electric operation and a manual operation, allows common use of valve opening-detecting members, such as a limit switch and a potentiometer and other component members, irrespectively of the magnitude of the output torque, permits accurate detection of the switching position of the valve, and enjoys a compact construction and excellent economy.

It can be applied to devices used for rotary drive besides the rotary valve.

The invention claimed is:

1. An actuator for a valve using a speed reducing gear mechanism capable of regulating vibration rotation of an outer gear that produces the vibration rotation in response to eccentric rotation from an eccentric body synchronized with a rotary drive source including a motor to produce the eccentric rotation, and emitting a component of rotation of the outer gear from an output shaft, wherein the speed reducing mechanism is incorporated in a base body to which a supporting plate for bearing a controlling shaft extended from the output shaft is anchored, the supporting plate has a bearing region for the controlling shaft, in which region a valve opening-detecting part is disposed, and has a fitting plate carrying a valve opening-detecting member including a limit switch fixed in position thereto.

2. An actuator for a valve according to claim 1, further comprising a planar mounting part formed above the base body and wherein the supporting plate is fixed in position on the planar mounting part.

3. An actuator for a valve according to claim 1, wherein the fitting plate is fixed in position on the supporting plate by using a roller bearing for the valve opening-detecting part and, at the same time, fitting an inner periphery of a controlling shaft inserting hole of the fitting plate on an outer periphery of the roller bearing.

4. An actuator for a valve according to claim 1, wherein the controlling shaft has a smaller diameter than the output shaft and is extended above the output shaft, and the valve opening detecting member comprises various kinds of valve opening detecting members that are disposed above the gear speed reducing mechanism.

5. An actuator for a valve according to claim 1, wherein the valve opening detecting members are imposed within a surface area in planometric view of the gear speed reducing mechanism.

6. An actuator for a valve according to claim 1, wherein the controlling shaft has an outer peripheral region to which a limit switch operating cam member is disposed as fixed, the cam member has an inner peripheral region in which a circumferential groove is formed and the circumferential groove has an annular spring member having resilient force that is energized in a radial direction inserted therein.

7. An actuator for a valve according to claim 1, further comprising a motive power transmitting shaft and wherein an annular spring member having resilient force energized in a radial direction is interposed between at least one of gears of the gear speed reducing mechanism and the motive power transmitting shaft to which the at least one gear is disposed as fixed.

8. An actuator for a valve according to claim 1, further comprising a manually operating shaft that has a manual operation-transmitting gear disposed as fixed thereto.

9. An actuator for a valve, that is provided in a cover with a rotary drive source, a gear speed reducing mechanism for reducing a speed of rotation from the rotary drive source and transmitting the reduced rotation and an output shaft emitting rotation from the gear speed reducing mechanism, wherein a valve body is opened and closed by rotation through the output shaft and a valve stem; a manually operating shaft capable of manually operating the valve body is interlocked with the gear speed reducing mechanism and formed as projected to an upper side of the cover; and the gear speed reducing mechanism comprises an input gear rotated as synchronized with the rotary drive source, an intermediate gear meshed with the input gear, an eccentric body producing an eccentric rotation synchronously with rotation of the input gear, an outer gear producing an eccentric rotation in response to the eccentric rotation from the eccentric body, a frame body meshed or engaged with the outer gear and regulating vibrating rotation of the outer gear, and an output shaft interlocked with me outer gear and enabled to emit a component of rotation of the outer gear.

10. An actuator for a valve according to claim 9, wherein the gear speed reducing mechanism has a portion that minimizes backlash, and the portion is manually operated.

11. An actuator for a valve according to claim 9, wherein the eccentric body and the input gear receiving the rotation from the rotary drive source are integrally formed, and the input gear is manually operated.

12. An actuator for a valve according to claim 9, wherein the manually operating shaft is disposed coaxially with a rotating shaft of the intermediate gear.

13. An actuator for a valve according to claim 10, wherein the eccentric body and the input gear receiving the rotation from the rotary drive source are integrally formed, and the input gear is manually operated.

14. An actuator for a valve according to claim 10, wherein the manually operating shaft is disposed coaxially with a rotating shaft of the intermediate gear.

15. An actuator for a valve according to claim 11, wherein the manually operating shaft is disposed coaxially with a rotating shaft of the intermediate gear.

* * * * *